(12) United States Patent
Wirtz et al.

(10) Patent No.: US 12,190,852 B2
(45) Date of Patent: *Jan. 7, 2025

(54) PLAYBACK, RECORDING, AND ANALYSIS OF MUSIC SCALES VIA SOFTWARE CONFIGURATION

(71) Applicant: NUTUNE MUSIC, INC., San Diego, CA (US)

(72) Inventors: Cameron Michael Joyce Wirtz, San Diego, CA (US); Matthew Joseph Joyce Wirtz, San Diego, CA (US); Sharon Aline Joyce, San Diego, CA (US)

(73) Assignee: Nutune Music, Inc., San Diego, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/749,633

(22) Filed: May 20, 2022

(65) Prior Publication Data

US 2022/0277715 A1 Sep. 1, 2022

Related U.S. Application Data

(63) Continuation of application No. 17/290,975, filed as application No. PCT/US2020/018696 on Feb. 18, 2020, now Pat. No. 11,341,944.

(Continued)

(51) Int. Cl.
*G10H 1/00* (2006.01)
*G09B 15/02* (2006.01)
*G09B 15/04* (2006.01)

(52) U.S. Cl.
CPC ......... *G10H 1/0016* (2013.01); *G09B 15/023* (2013.01); *G09B 15/04* (2013.01);
(Continued)

(58) Field of Classification Search
CPC .. G06N 20/00; G10H 2220/015; G10H 1/365; G10H 2220/106; G10H 2220/126;
(Continued)

(56) References Cited

U.S. PATENT DOCUMENTS 6,066,791 A * 5/2000 Renard ................ G09B 15/003
84/649
8,907,195 B1 * 12/2014 Erol ....................... G10H 1/361
84/649

(Continued)

FOREIGN PATENT DOCUMENTS

WO WO-2020172196 A1 * 8/2020 ............. G09B 15/00

OTHER PUBLICATIONS

International Search Report and Written Opinion dated May 22, 2020 for related International Application No. PCTUS2020018696, in 17 pages.

(Continued)

*Primary Examiner* — Marlon T Fletcher
(74) *Attorney, Agent, or Firm* — Procopio, Cory, Hargreaves & Savitch LLP

(57) ABSTRACT

Playback, recording, and analysis of music scales via software configuration. In an embodiment, a graphical user interface is generated with staff and keyboard canvases, visually representing a music staff and keyboard, respectively, a scale input, parameter input(s), and a play input. In response to selection of a scale, the staff canvas is updated to visually represent the notes in the scale. In response to the selection of a musical parameter, the staff canvas and/or keyboard canvas are updated to reflect the musical parameter. In response to selection of the play input, a soundtrack of the scale is output, while simultaneously highlighting the note, being played, on the staff canvas and the key, associated with the note being played, on the keyboard canvas.

20 Claims, 51 Drawing Sheets

Related U.S. Application Data

(60) Provisional application No. 62/941,165, filed on Nov. 27, 2019, provisional application No. 62/807,573, filed on Feb. 19, 2019.

(52) U.S. Cl.
CPC . *G10H 2210/091* (2013.01); *G10H 2220/096* (2013.01); *G10H 2220/241* (2013.01); *G10H 2230/015* (2013.01)

(58) Field of Classification Search
CPC ........... G10H 2210/091; G10H 1/0025; G10H 2220/241; G10H 1/368; G10H 1/0016; G10H 2240/131; G10H 1/18; G10H 1/0033; G10H 2210/101; G10H 2220/026; G10H 2220/121; G10H 2220/091; G10H 2220/111; G10G 1/00; G10G 1/02
See application file for complete search history.

(56) References Cited

U.S. PATENT DOCUMENTS

| | | | |
|---|---|---|---|
| 2001/0029829 A1* | 10/2001 | Moe | G09B 15/08 |
| | | | 84/478 |
| 2003/0151628 A1 | 8/2003 | Salter | |
| 2007/0089590 A1* | 4/2007 | Katou | G10H 1/0016 |
| | | | 84/609 |
| 2008/0271591 A1 | 11/2008 | Lemons | |
| 2008/0289477 A1 | 11/2008 | Salter | |
| 2009/0301287 A1* | 12/2009 | Harvey | G10H 1/0025 |
| | | | 84/609 |
| 2010/0011938 A1* | 1/2010 | Adams | G09B 15/00 |
| | | | 84/470 R |
| 2010/0095828 A1* | 4/2010 | Adams | G09B 15/00 |
| | | | 84/470 R |
| 2011/0083544 A1 | 4/2011 | Rogitz | |
| 2011/0247479 A1* | 10/2011 | Helms | G10H 1/0016 |
| | | | 84/613 |
| 2013/0239779 A1* | 9/2013 | Cooper | G09B 15/04 |
| | | | 84/475 |
| 2014/0041512 A1* | 2/2014 | Mastran | G09B 15/023 |
| | | | 84/483.2 |
| 2014/0260898 A1* | 9/2014 | Bales | G09B 15/003 |
| | | | 84/479 A |
| 2018/0137425 A1 | 5/2018 | D'Alo'et al. | |
| 2018/0174559 A1* | 6/2018 | Elson | G10H 1/20 |
| 2018/0182362 A1 | 6/2018 | Li | |
| 2019/0348015 A1* | 11/2019 | Kubita | G09B 15/00 |
| 2021/0358460 A1* | 11/2021 | Wirtz | G09B 15/00 |

OTHER PUBLICATIONS

International Preliminary Report on Patentability dated Apr. 14, 2021 for related International Application No. PCTUS2020018696, in 40 pages.

* cited by examiner

FIG. 3F

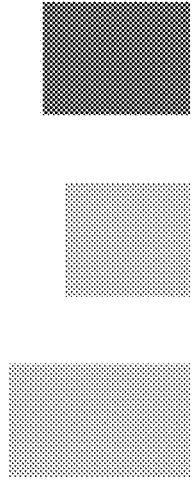
FIG. 3G

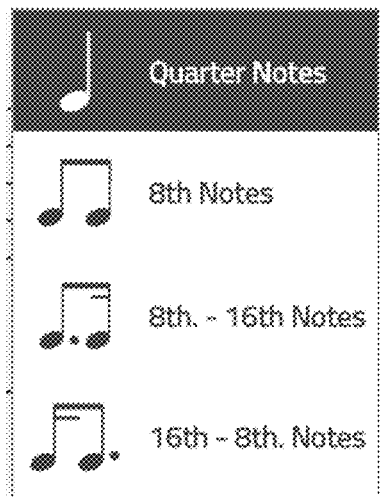
FIG. 4H
FIG. 4I
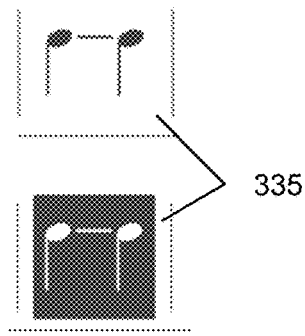
335
FIG. 4J
345
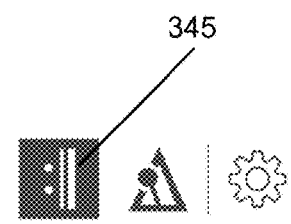
FIG. 4K
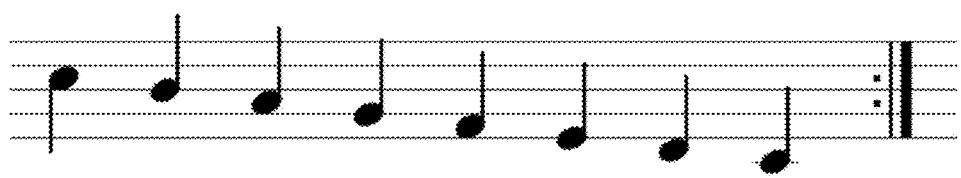

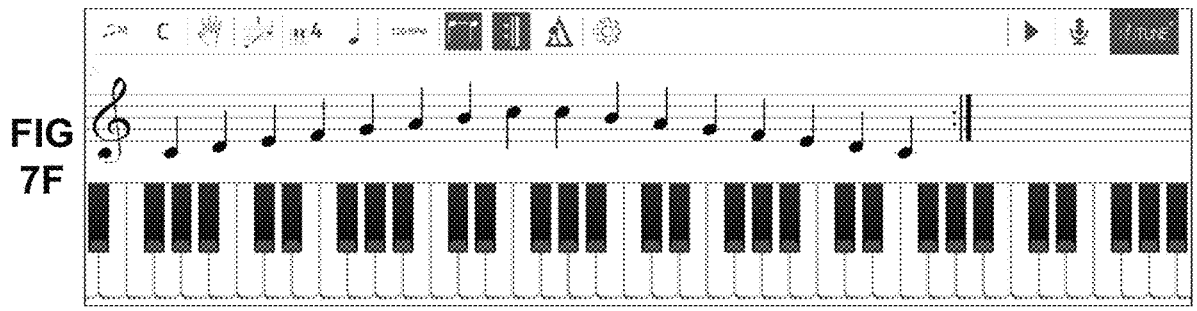

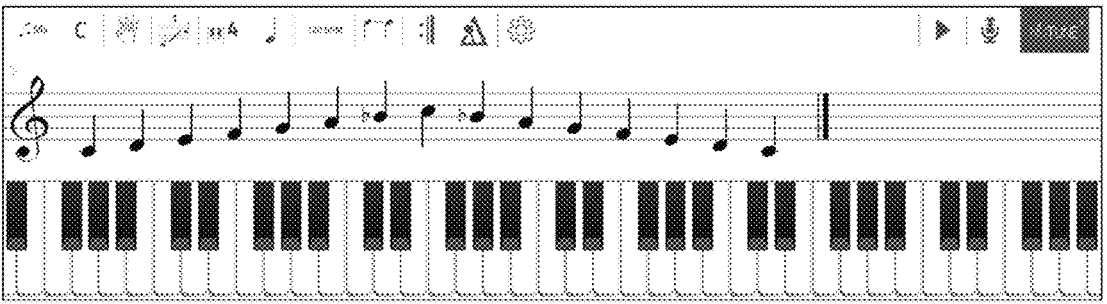
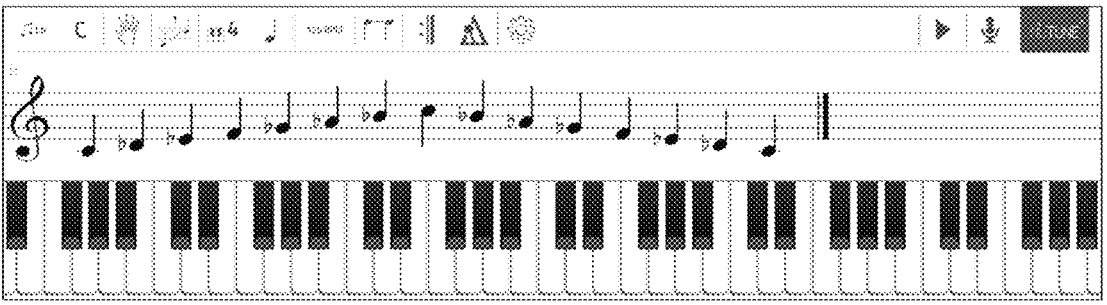
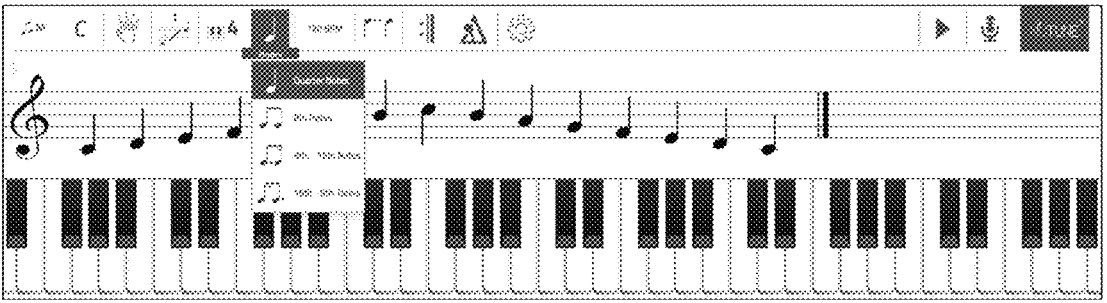
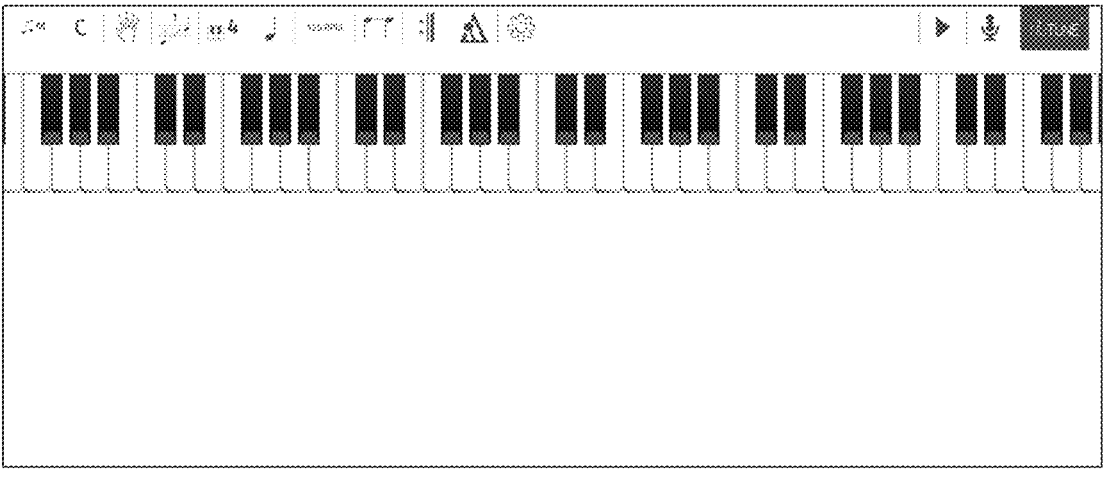
FIG 7O
FIG 7P
FIG 7Q
FIG 7R
FIG 7S FIG. 10
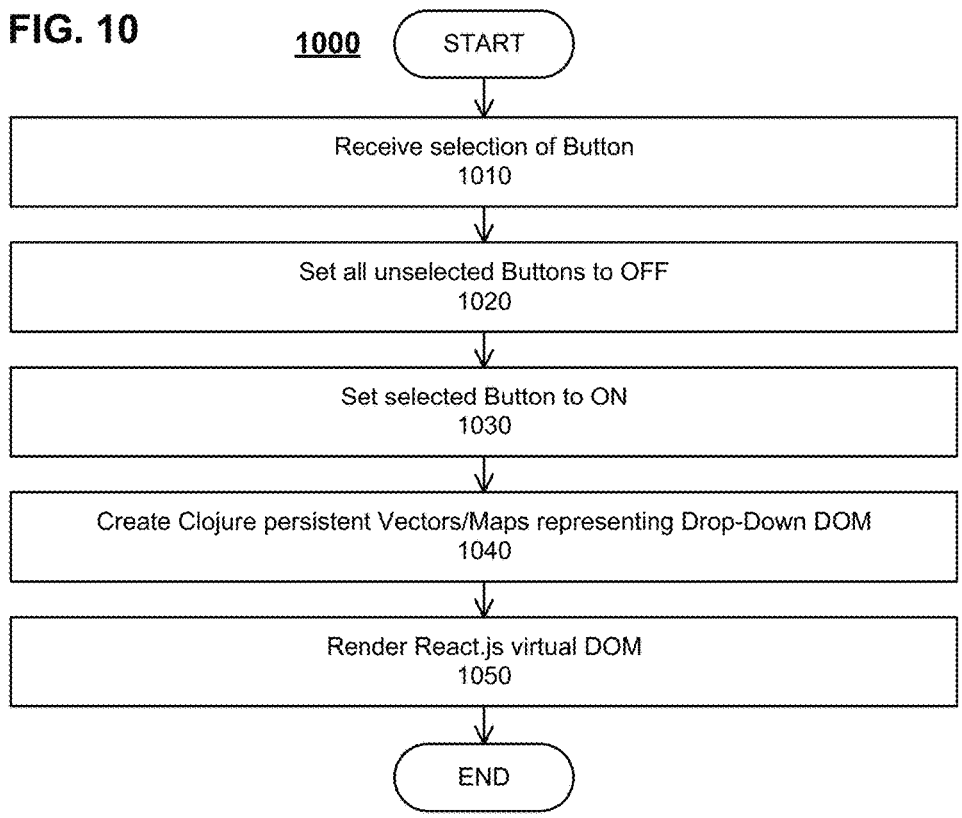
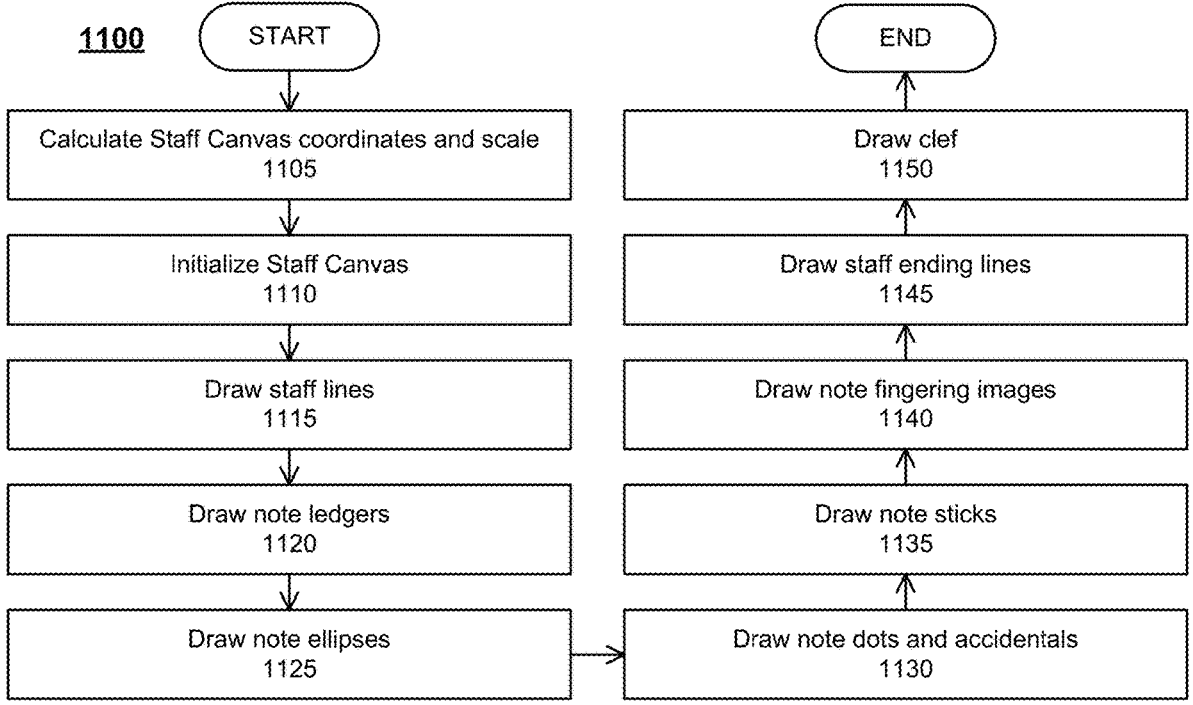
FIG. 11

START
↓
Read external JavaScript resource
1410
↓
Embed JavaScript resource into output HTML during HTML generation
1420
↓
Send output HTML as string to client application using Ring/Compojure
1430
↓
END

1500

START
↓
Define CSS for selector and screen mode using optional theme keyword(s)
1510
↓
Server restart?
1520 — No ↺
↓ Yes
Convert theme keyword(s) into corresponding theme values
1530
↓
Convert screen modes into CSS media query clauses
1540
↓
Generate CSS files for all themes
1550

FIG. 15

PLAYBACK, RECORDING, AND ANALYSIS OF MUSIC SCALES VIA SOFTWARE CONFIGURATION

CROSS-REFERENCE TO RELATED APPLICATIONS

This application claims priority to U.S. Non-Provisional patent application Ser. No. 17/290,975, filed on May 3, 2021, which is the U.S. national stage of International Patent App. No. PCT/US2020/018696, filed on Feb. 18, 2020, which claims priority to U.S. Provisional Patent App. No. 62/807,573, filed on Feb. 19, 2019, and U.S. Provisional Patent App. No. 62/941,165, filed on Nov. 27, 2019, which are both hereby incorporated herein by reference as if set forth in full.

BACKGROUND

Field of the Invention

The embodiments described herein are generally directed to technology for music education, and, more particularly, to a technological interface, with backend functionality, to facilitate the learning of music scales.

Description of the Related Art

The fundamental building blocks for playing any piece of music is mastering music scales. Specifically, knowledge of music scales enables a musician to play any song with precision. Thus, it would be beneficial if technology could be used to help musicians and prospective musicians pinpoint their exact weaknesses in mastering music scales. It would also be helpful if such technology could enable such users to repetitively practice, pinpoint, and change their practice selections, while providing continual feedback for all selected practice sessions.

SUMMARY

Accordingly, systems, methods, and non-transitory computer-readable media are disclosed to provide a technological interface for facilitating the learning of music scales.

In an embodiment, a method is disclosed that comprises using at least one hardware processor to: generate a graphical user interface comprising a staff canvas, a keyboard canvas, a scale input, at least one parameter input, and a play input, wherein the staff canvas comprises a visual representation of a music staff, wherein the keyboard canvas comprises a visual representation of at least a portion of a music keyboard, wherein the scale input is configured to receive a selection of one of a plurality of music scales from a user, and wherein the at least one parameter input is configured to receive a selection of one of a plurality of options for a musical parameter from the user; in response to the selection of one of the plurality of music scales, update the staff canvas to visually represent a plurality of notes from the selected music scale on the staff; in response to the selection of one of the plurality of options for the musical parameter, update one or both of the staff canvas and the keyboard canvas to reflect the selected option for the musical parameter; and, in response to selection of the play input, start playback of the selected music scale according to the selected option for the musical parameter, wherein the playback comprises outputting a soundtrack of the selected music scale by, for each note in the soundtrack, simultaneously outputting the note to a speaker, updating the staff canvas to highlight a visual representation of the note on the music staff, and updating the keyboard canvas to highlight a key, within the visual representation of the at least a portion of the music keyboard, that is associated with the note.

Highlighting the visual representation of the note may comprise changing a color of the visual representation of the note, and wherein highlighting the key comprises changing a color of the key. Starting playback of the selected music scale may comprise, for each note in the music scale: retrieving an audio file of each note in the selected music scale from a database; and constructing the soundtrack from the retrieved audio files and in accordance with the selected option for the musical parameter. Each audio file of each note may comprise a recording of a live performance of that note.

The graphical user interface may further comprise a metronome input for toggling a metronome option on and off, wherein starting playback of the selected music scale further comprises, when the metronome option is toggled on, playing a metronome soundtrack in parallel with the soundtrack of the selected music scale.

The musical parameter may comprise one of a starting note, a starting octave, a number of octaves, a rhythm, a tempo, a repeat of a top note in the selected music scale, and a repeat of the selected music scale.

The at least one parameter input may comprise a plurality of parameter inputs, wherein each of the plurality of parameter inputs is configured to receive a selection of one of a plurality of options for one of a plurality of musical parameters from the user, and wherein playback of the selected music scale is performed according to the selected options for all of the plurality of musical parameters. The method may further comprise, prior to generating the graphical user interface, providing prior usage data for the user to a machine-learning model, and receiving a configuration, comprising a recommended music scale and a recommended option for each of the plurality of musical parameters, as an output from the machine-learning model, wherein the graphical user interface is generated according to the recommended music scale and the recommended options for all of the plurality of musical parameters. The method may further comprise retraining the machine-learning model on prior usage data from a plurality of users, wherein the prior usage data comprises one or both of user-specified changes in configurations of the graphical user interface and assessments of a user's recorded performance of a music scale.

The graphical user interface may further comprise a record input, wherein the method further comprises, in response to selection of the record input, recording a user's performance of the selected music scale via a microphone. The method may further comprise assessing the user's recorded performance of the selected music scale by: generating a soundtrack of the selected music scale according to the selected option for the musical parameter; comparing the generated soundtrack to the user's recorded performance; and generating a score for the user's recorded performance based on the comparison of the generated soundtrack to the user's recorded performance. The method may further comprise, in response to the selection of the record input, for each note in the selected music scale, simultaneously, without outputting any audio of the note: updating the staff canvas to highlight a visual representation of the note on the music staff; and updating the keyboard canvas to highlight a key, within the visual representation of the at least a portion of the music keyboard, that is associated with the note. The method may further comprise, in response to the selection of the play input and the record input, for each note in the selected music scale, simultaneously with outputting the note: updating the staff canvas to highlight a visual representation of the note on the music staff; and updating the keyboard canvas to highlight a key, within the visual representation of the at least a portion of the music keyboard, that is associated with the note.

The graphical user interface may further comprise a fingering canvas that comprises, for each of the plurality of notes visually represented on the staff canvas, an associated fingering representation that identifies a fingering to be used to play the note. The graphical user interface may further comprise a fingering-setting input for selecting an instrument and a fingering variant for the selected instrument, wherein the method further comprises, in response to the selection of an instrument and fingering variant, updating the fingering canvas to comprise, for each of the plurality of notes visually represented on the staff canvas, a fingering representation that identifies a fingering to be used to play the note for the selected instrument and the selected fingering variant. The graphical user interface may further comprise an input associated with each fingering representation, wherein the method further comprises, in response to selection of an input associated with a fingering representation, updating the fingering representation to represent a different available fingering option. The method may further comprise, in response to the user changing one or more fingering representations on the fingering canvas, updating the graphical user interface to comprise a save input that is configured to save current fingering representations displayed on the fingering canvas as a new customized fingering variant that is selectable via the fingering-setting input. The method may further comprise in response to the user changing a fingering representation, associated with one note in the selected music scale, on the fingering canvas, constraining available fingering options associated with notes in the selected music scale that follow the one note associated with the changed fingering representation. The soundtrack of the selected music scale may comprise audio of the plurality of notes in the selected music scale played by the selected instrument.

The plurality of music scales comprise a major scale, a natural minor scale, a harmonic minor scale, a melodic minor scale, a Dorian mode scale, a Phrygian mode scale, a Lydian mode scale, a Mixolydian mode scale, and a Locrian mode scale. The plurality of music scales may also comprise other scales, including, without limitation, the Octatonic and whole tone scales.

These methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A-3H illustrate examples of a graphical user interface, according to embodiments;

FIG. 10 illustrates an example process for the selection of a button that produces a drop-down, according to an embodiment;

FIG. 11 illustrates an example process for rendering a staff canvas, according to an embodiment;

FIG. 14 illustrates an example process for adding JavaScript elements to a graphical user interface by a server application, according to an embodiment;

FIG. 15 illustrates an example process for creating CSS files for a graphical user interface by a server application, according to an embodiment;

DETAILED DESCRIPTION

Figure 1A:
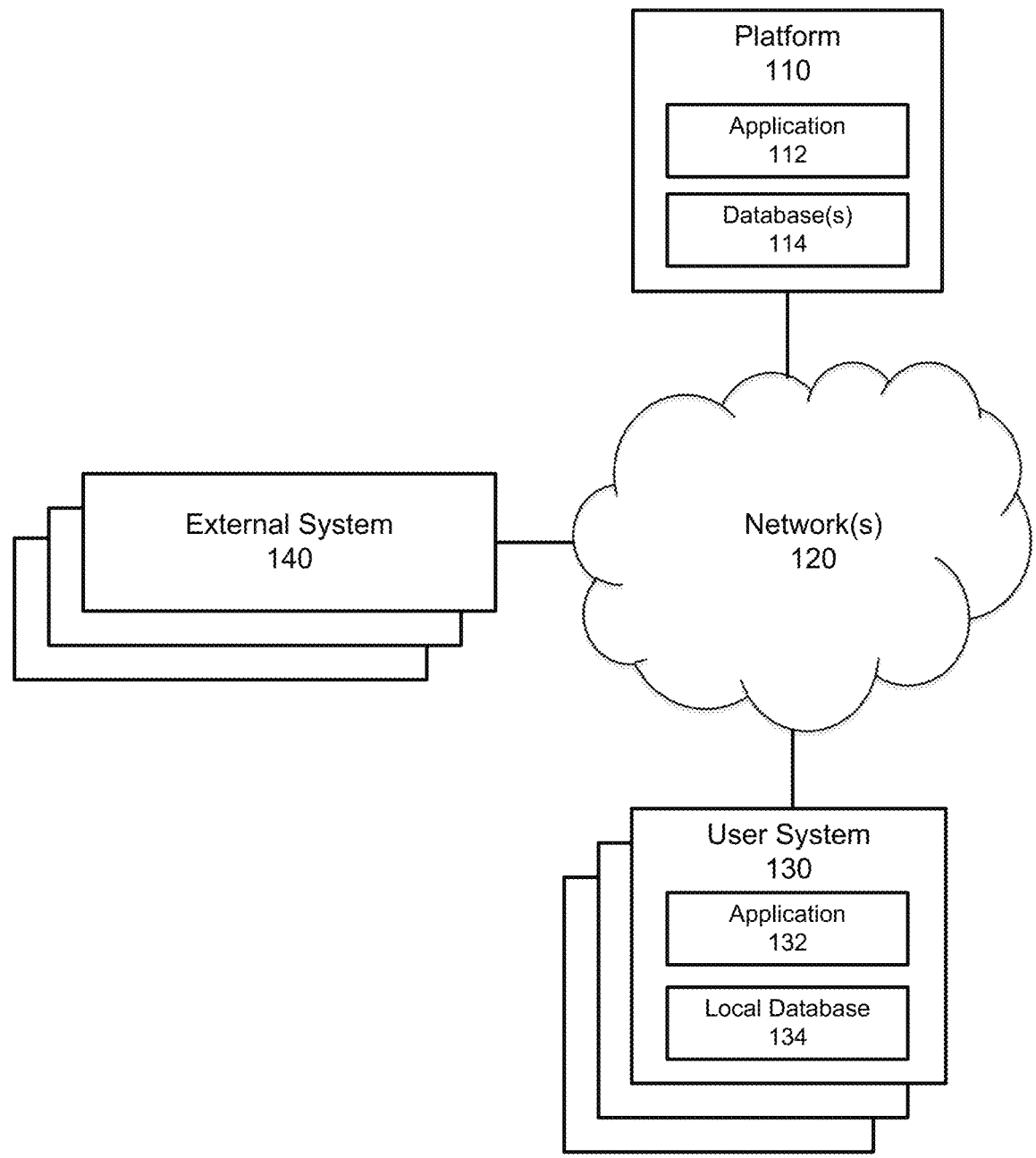
FIGS. 1A and 1B illustrate example infrastructures, in which one or more of the processes described herein, may be implemented, according to an embodiment.

In an embodiment, systems, methods, and non-transitory computer-readable media are disclosed to provide a technological interface for facilitating the learning of music scales. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In an embodiment, the technological interface comprises an application, with a graphical user interface (GUI) and underlying functionality, that implements an innovative training methodology. The application may be provided by a web-based and mobile platform (e.g., for usage on mobile and other wireless devices that utilize the iOS™ and/or Android™ operating systems). In an embodiment, each user may choose between a guided, step-by-step process or a flexible, customized approach that pinpoints the precise learning focus needed to master music scales. The application may provide self-learning without the requirement of a teacher to check accuracy in intonation, rhythm, and tempo, and may allow for a combination of more than 100,000 learning selections.

The application may be configured to maximize the rapid mastery of music scales by tailoring the learning methodology to each user's particular learning needs. Specifically, the application may be designed to help users master the pitch, rhythm, and tempo of any scale through self-assessment, computer-generated assessment, and/or pre-recorded guidance from credentialed music educator(s). Self-assessment can be achieved by comparing the pitch, rhythm, and/or tempo of a scale to be learned to the user's own performance of that scale. The application can record each user's performance of a scale and provide the user with a score for each recorded performance, based on accuracy in pitch, rhythm, and/or tempo. The user can identify errors, based on these comparisons and/or scores, so that corrections may be made. Artificial intelligence (AI) may also be used to assess, determine, and provide the optimal next step (e.g., configuration, lesson, etc.) in learning a particular scale. In addition, the application may provide step-by-step tutorials on key learning elements for mastering and progressing through the entire set of music scales provided by the application. These instructional step-by-step tutorials may comprise pre-recorded video pop-up lectures by one or more credentialed music educators. When a user has finished a session with the application, the user's progress, recordings, and/or scores can be stored and linked to a user account associated with that user. The application may enable music teachers to assign scales and/or tutorials from the application to their student-users, and see their student-users' scores, progress, and/or errors and/or hear their student-users' recordings and/or errors through the application.

In an embodiment, each user of the application may customize a configuration of one of a plurality of available music scales. The available music scales may include, without limitation, all major, minor (e.g., natural, harmonic, and/or melodic), and/or church mode (e.g., Ionian, Dorian, Phrygian, Locrian, Mixolydian, and/or Lydian) scales, configured by note type (A through G). The available music scales may also comprise other scales, including, without limitation, the Octatonic, whole tone scales, and/or any other known music scale, even if not specifically mentioned herein. Each configuration may include adjustable parameters, such as starting octave, pitch, number of octaves, tempo, rhythmic pattern (e.g., quarter notes, eighth notes, dotted eighth sixteenth notes, and/or sixteenth dotted eighth notes), and/or the like. Each user may adjust such parameters to satisfy his or her particular learning need. In addition, the application may allow users to configure the repetition of the top note of the scale being learned, enable and disable a metronome feature, and repeat the entire scale being learned.

1. System Overview

1.1. Infrastructure

FIG. 1A illustrates an example system in which a technological interface, for facilitating the learning of music scales, may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, in a preferred embodiment, user system 130 is a smartphone or tablet computer with a touch panel display, and configured to detect contact with particular physical points on the touch panel display, and associate those contact points with visual elements being displayed on the touch panel display, to thereby identify user interactions with and operations on those visual elements.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other types of requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation, PostgreSQL™, MySQL™, Oracle™ IBM™, Microsoft SQL™, Access™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a web browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

Figure 1B:
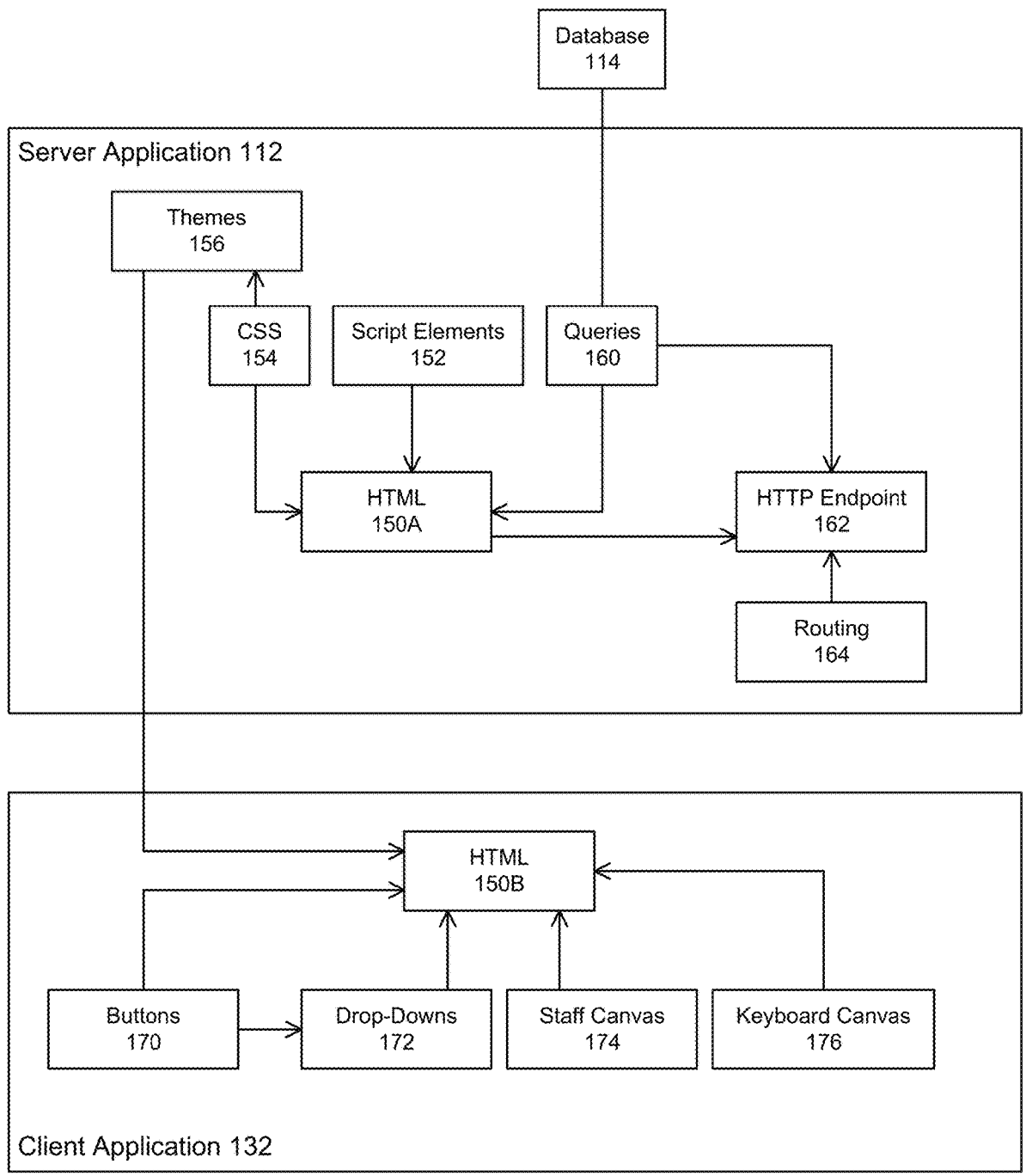

FIG. 1B illustrates one implementation of the disclosed application, according to an embodiment. Specifically, server application 112 may generate a graphical user interface 150A. In the illustrated embodiment, graphical user interface 150 comprises webpages generated in HTML (e.g., HTML5). However, graphical user interface 150 may be implemented using any well-known alternative means.

Graphical user interface 150 may comprise script elements (e.g., variables, functions, etc.), including references to external script elements 152. These script elements may be implemented in any suitable language (e.g., JavaScript in the case that graphical user interface 150 comprises webpages). In addition, in the event that graphical user interface 150 comprises webpages, the webpages may utilize cascading style sheets (CSS) 154, generated or otherwise provided by server application 112. CSS 154 may enable one or more themes 156. For example, a user may select a particular theme 156 from a plurality of themes 156, to be used for that user's particular instance of graphical user interface 150. A theme 156 may comprise a particular combination of colors (e.g., background colors, text colors, icon colors, other feature colors, etc.), fonts, text sizes, and/or the like, to be used for rendering graphical user interface 150 by client application 132 (e.g., a web browser application).

Graphical user interface 150 may comprise data obtained via the execution of queries 160 on database 114 (e.g., via structured language query (SQL) statements on a PostgreSQL or other relational database). The data queried from database 114 and incorporated into graphical user interface 150 may comprise system-wide data, user-specific data, session-specific data, and/or the like.

In an embodiment, graphical user interface 150 may be provided to an HTTP endpoint 162. For example, graphical user interface 150 may be generated from static and/or dynamic elements in response to a user request to HTTP endpoint 162. Alternatively, graphical user interface 150 could comprise an entirely static webpage that is simply provided to HTTP endpoint 162 in response to the user request. In either case, the request and/or the response may arrive at HTTP endpoint indirectly via routing 164.

Client application 132 may generate the request to HTTP endpoint 162, and receive graphical user interface 150, in response to the request, from HTTP endpoint 162. It should be understood that graphical user interface 150B is simply the local copy (i.e., on the user system 130 that is executing client application 132) of graphical user interface 150A, which was generated and returned by server application 112 in response to the request from client application 132. Graphical user interface 150 may comprise one or more screens comprising one or more inputs, such as button(s) 170, drop-down menu(s) 172, and other input elements (e.g., textboxes, etc.), with which the user may interact. Graphical user interface may also comprise a staff canvas 174, visually representing a music staff, and a keyboard canvas 176, visually representing a musical keyboard (e.g., a full set or relevant subset of piano keys), as described in more detail elsewhere herein. It should be understood that each canvas is simply a region of graphical user interface 150 dedicated to a particular function, and can be implemented as a frame or other element within graphical user interface 150 using any standard programming means.

It should be understood that the various elements in FIG. 1B may interact dynamically as a user interacts with graphical user interface 150. For example, as a user selects options from a drop-down 172, interacts with buttons 170, and/or completes teaching modules, queries 160 may be generated and executed, options may be updated in other drop-downs 172, themes 156 may be changed, staff canvas 174 and/or keyboard canvas 176 may be toggled on and off, graphical user interface 150 may be otherwise updated, and/or the like. In other words, graphical user interface 150 is configured to pivot in real time based on a user's selections, the application's analysis of the user's performance, the current teaching module, and/or the like. In this manner, graphical user interface 150 is multi-dimensional and fluidly response to the user's precise learning needs. For example, by mixing and matching the various inputs described herein, a user of graphical user interface 150 can custom build over 100,000 different configurations of the available music scales, thereby allowing the user to target any particular learning needs or desires (e.g., by following the application's training methodology, following another training methodology, or not following any training methodology at all).

1.2. Example Processing Device

Figure 2:
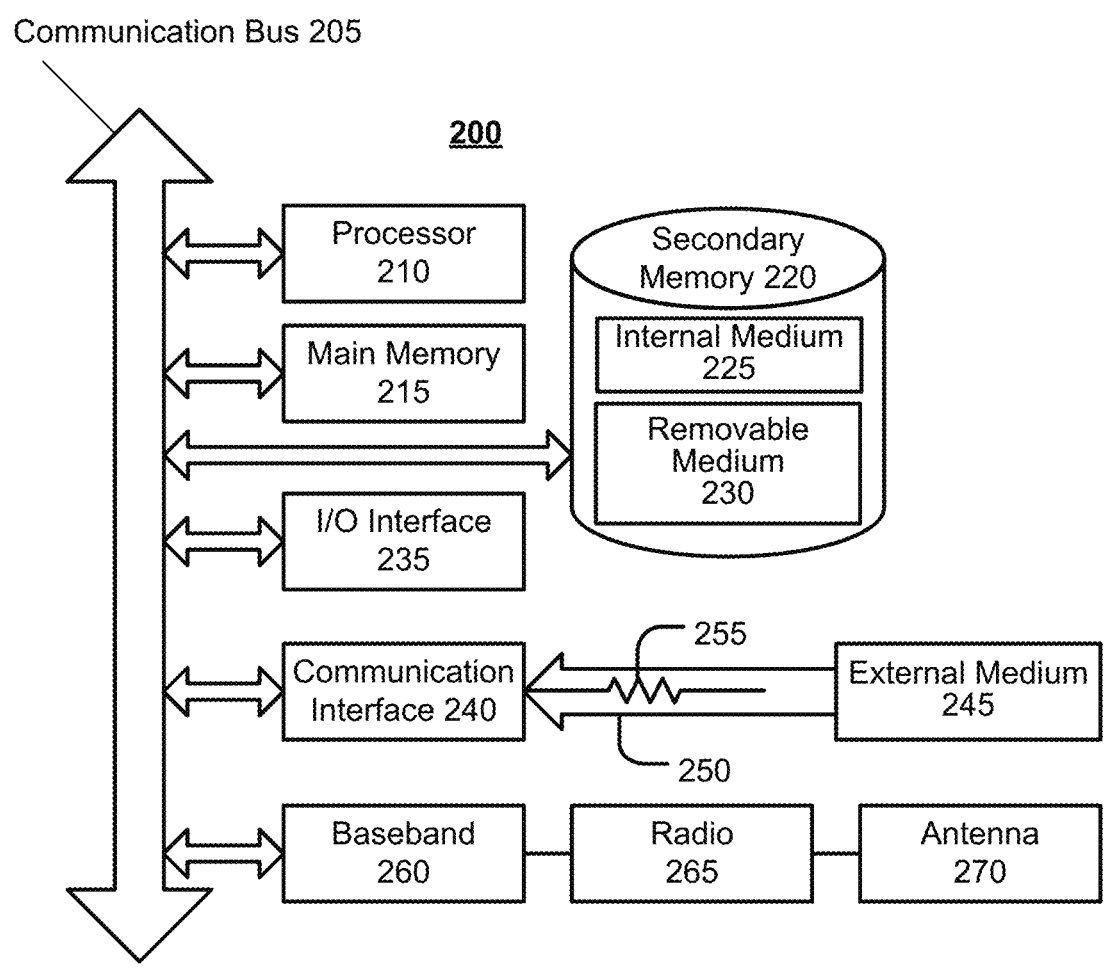
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device). The touch panel display is capable of detecting contact at particular physical points on the display. Each contact may be associated with a visual element being displayed at the corresponding physical point on the display at the time of contact. In this manner, a user may interact with system 200 by touching visual elements, representing inputs, on the touch panel display to perform various operations.

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Graphical User Interface

Figure 3A:
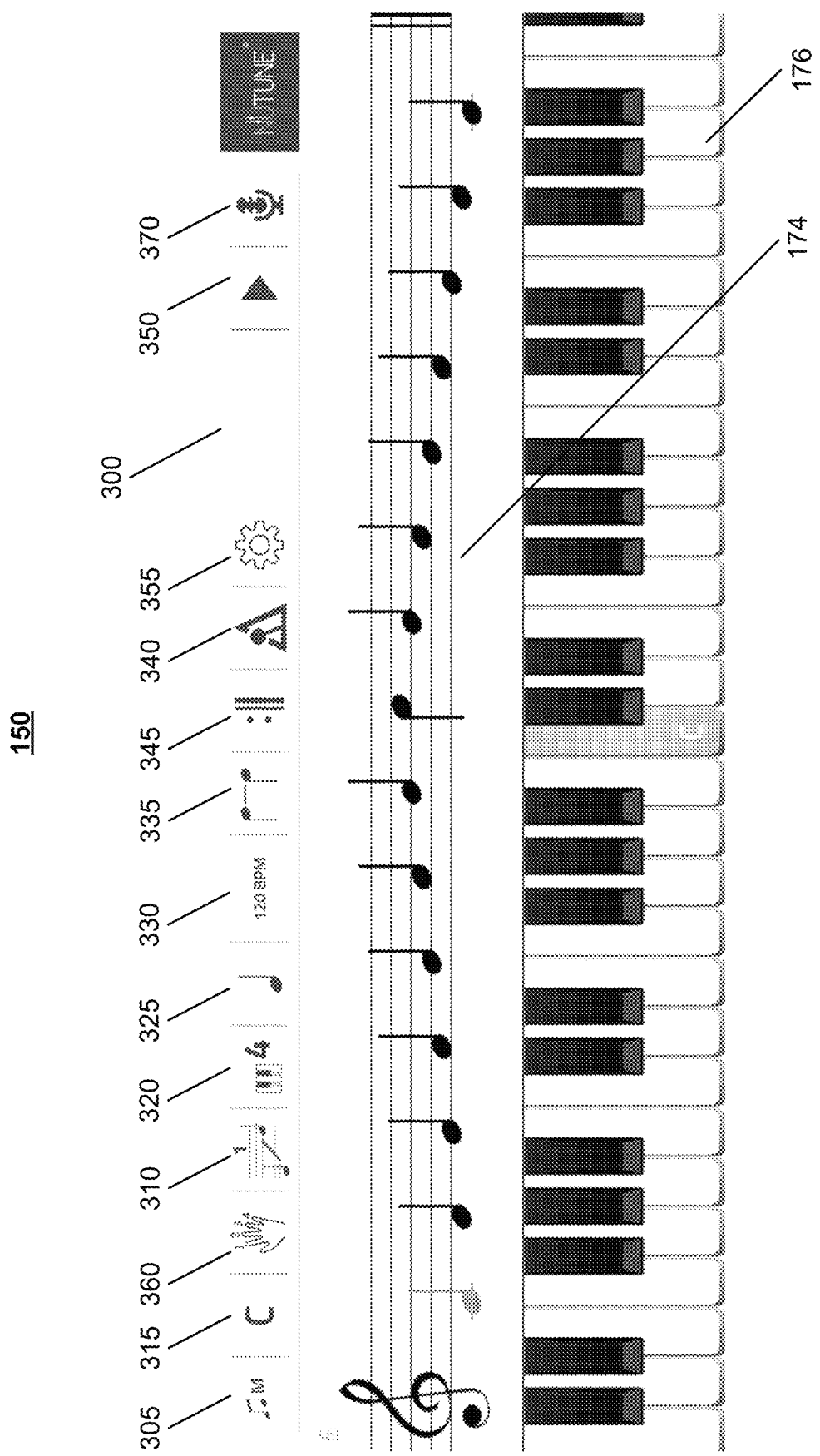
Figure 3B:
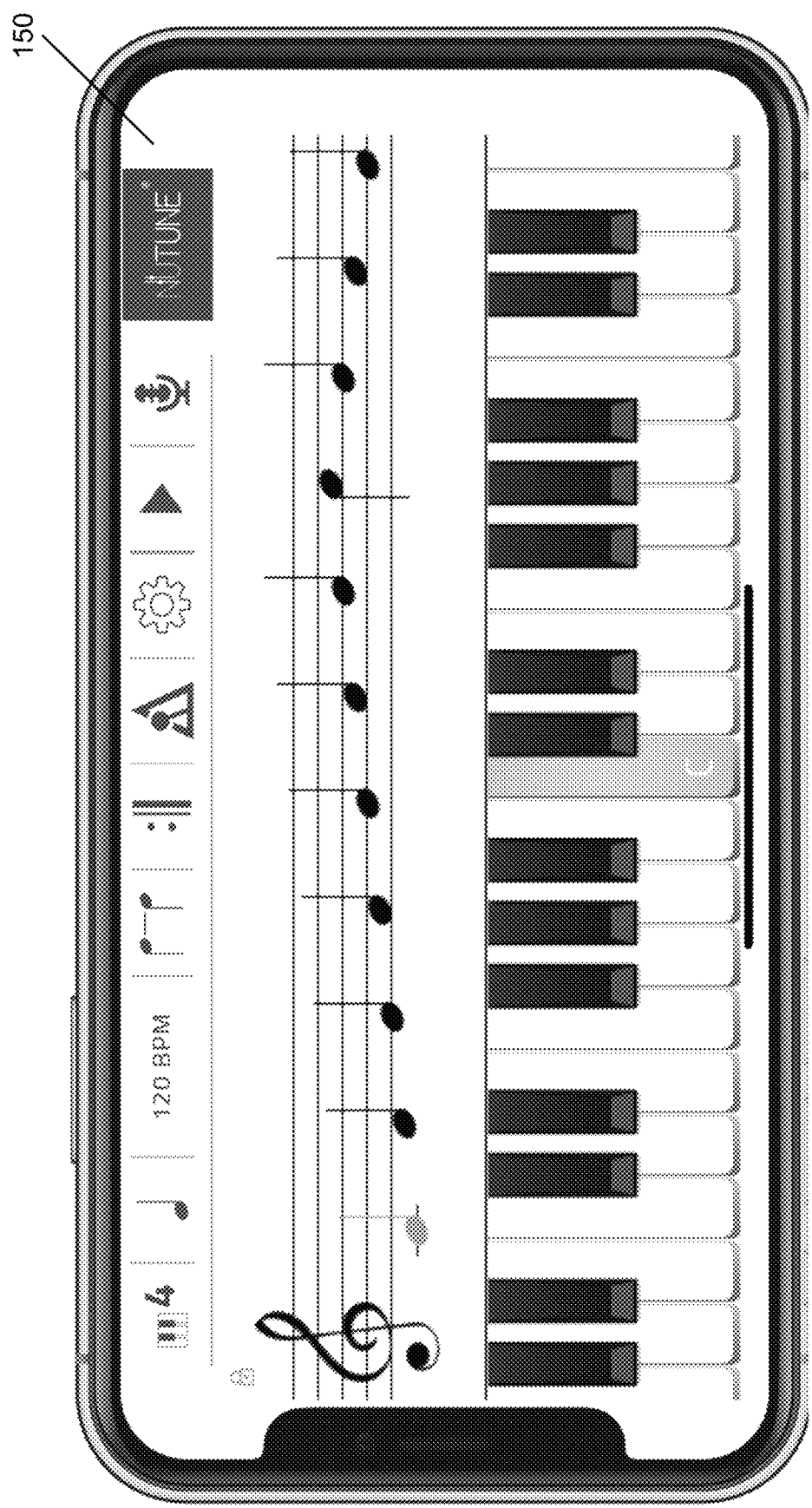
Figure 3C:
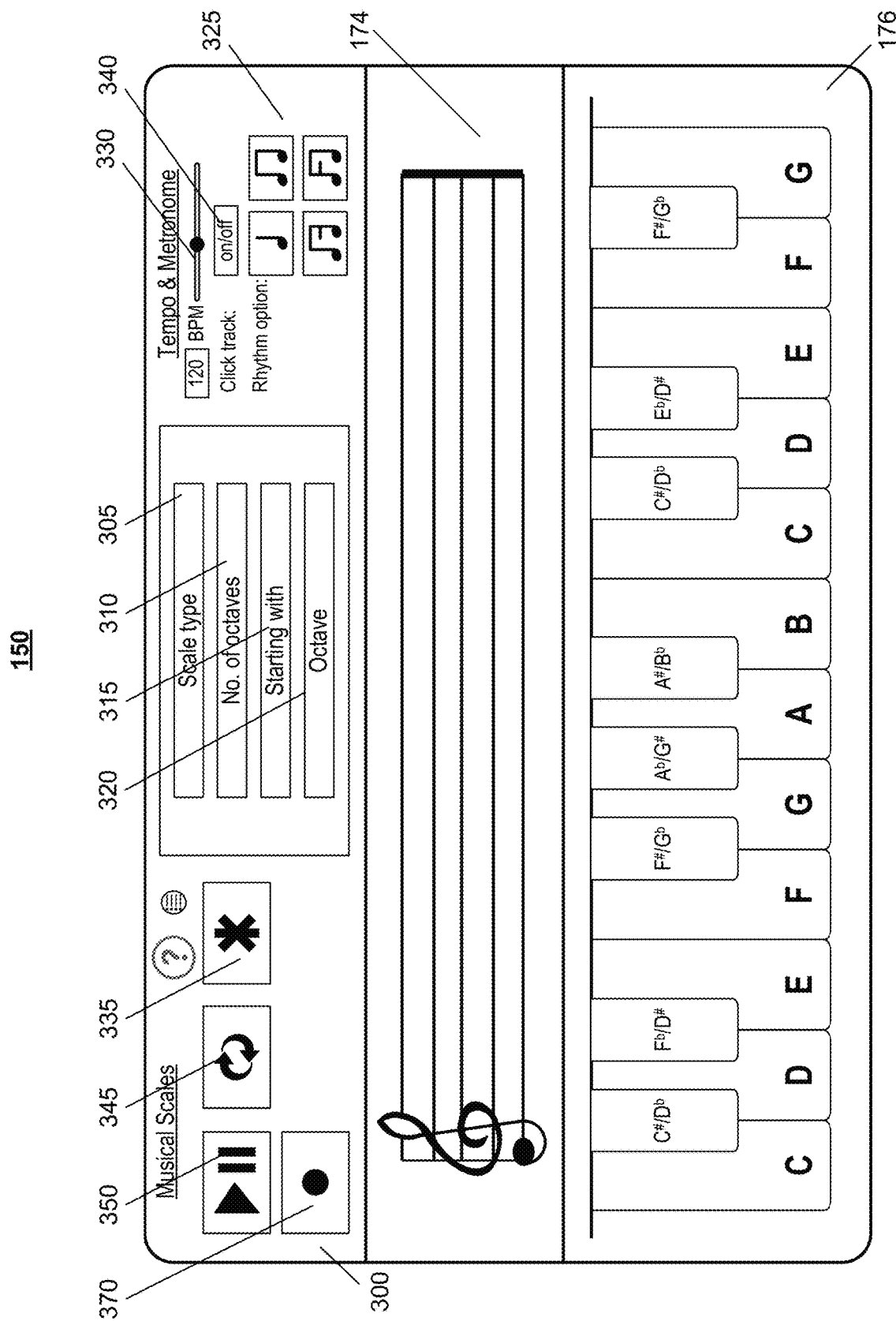
Figure 3D:
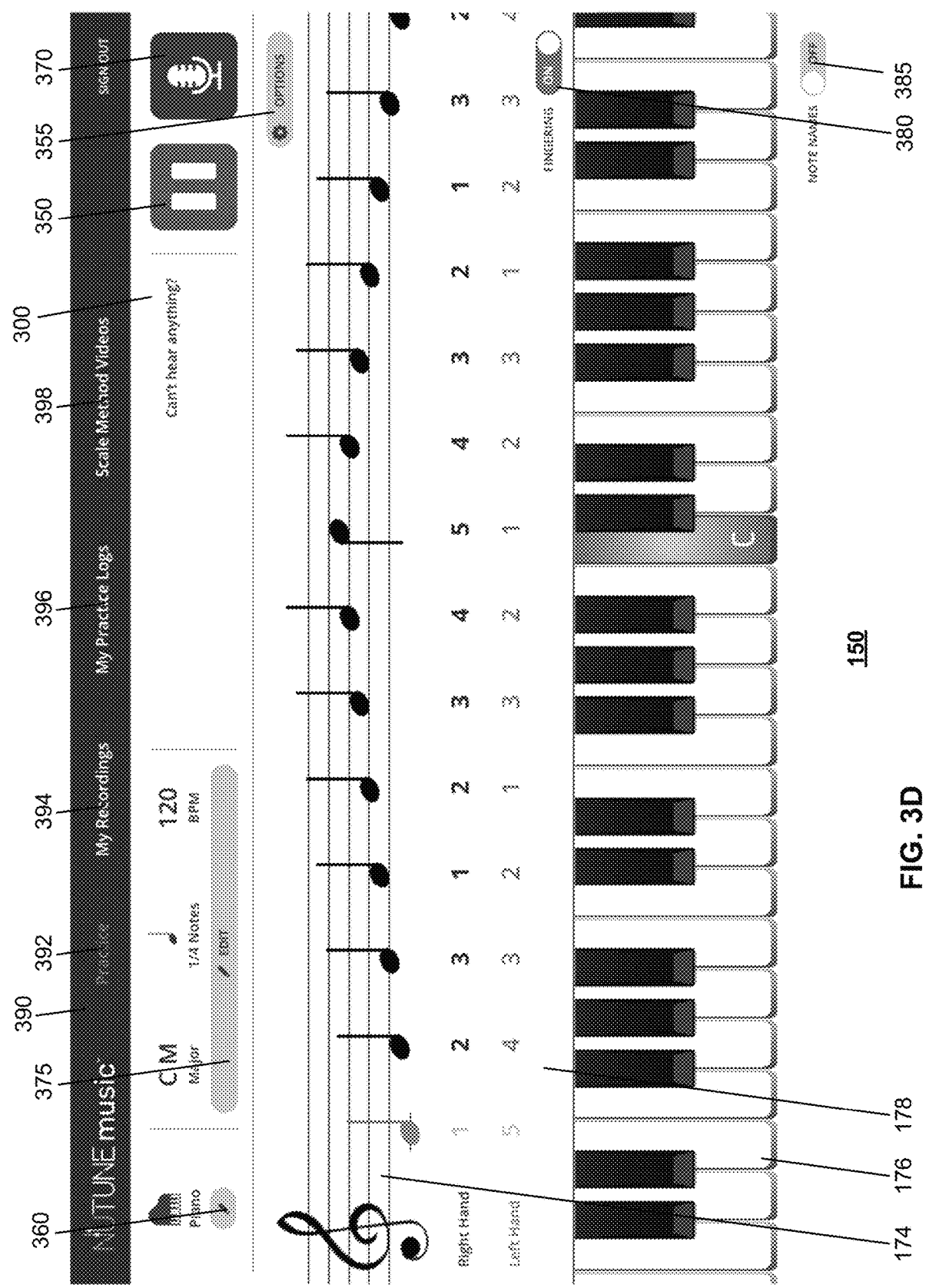

FIG. 3A illustrates an example of graphical user interface 150, according to an embodiment. FIG. 3B illustrates an example of the same graphical user interface 150 within the display of a smartphone, according to an embodiment. FIGS. 3C and 3D illustrate examples of graphical user interface 150, according to alternative embodiments.

As illustrated, graphical user interface 150 may comprise staff canvas 174, keyboard canvas 176, fingering canvas 178, and a toolbar 300. Toolbar 300, staff canvas 174, keyboard canvas 176, and fingering canvas 178 can be arranged in any manner. However, in a preferred embodiment, toolbar 300 is arranged in an upper portion of graphical user interface 150, staff canvas 174 is arranged in the middle portion of graphical user interface 150, keyboard canvas 176 is arranged in the bottom portion of graphical user interface 150, and fingering canvas 178 is arranged between staff canvas 174 and keyboard canvas 176. In an embodiment, each of staff canvas 174, keyboard canvas 176, and fingering canvas 178 may be toggled on and off.

Toolbar 300 may comprise one or more inputs (e.g., drop-down menus, icon buttons, etc.) for setting a user-specific configuration of the application. For example, toolbar 300 may comprise a scale input 305 for selecting a music scale to be learned, a number-of-octaves input 310 for selecting a number of octaves, a note input 315 for selecting a starting note, an octave input 320 for selecting a starting octave, a rhythm input 325 for selecting a rhythm, a tempo input 330 for selecting a tempo, a note-repeat input 335 for selecting whether or not to repeat the top note of the selected scale, a metronome input 340 for toggling a metronome on and off, a scale-repeat input 345 for selecting whether or not to repeat the selected scale, a play input 350 for starting the performance of a scale, a settings input 355 for modifying personalized settings, a fingering input 360 for selecting an instrument and/or fingering variant, and/or a record input 370 for recording the user's performance of a scale. Advantageously, toolbar 300 enables a user to precisely target an area of learning, by selecting a particular configuration of parameters for a music scale, in coordination with the application's training methodology.

2.1. Primary Canvases

In an embodiment, graphical user interface 150 comprises staff canvas 174 and/or keyboard canvas 176. Staff canvas 174 and keyboard canvas 176 may highlight the note and key, respectively, that is currently being played, in real time, as the application performs a music scale. Graphical user interface 150 may provide the user with one or more inputs for changing the size of staff canvas 174 and/or keyboard canvas 176, the size of notes on staff canvas 174, the volume of a metronome, a theme 156 (e.g., color layout), and/or other parameters of graphical user interface 150. The user-specified parameters for staff canvas 174 and/or keyboard canvas 176 may be maintained within graphical user interface 150 across sessions, restarts, and the modifications of other parameters.

Figure 4A:
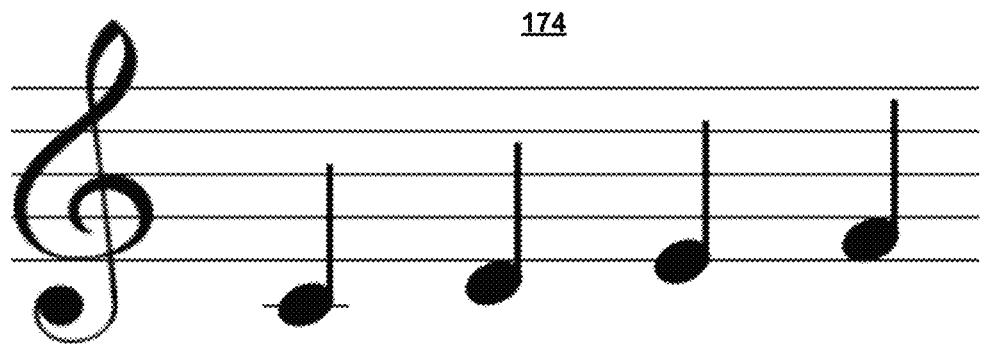
FIGS. 4A-4P illustrate components of a graphical user interface, according to embodiments.

FIG. 4A illustrates an example of a portion of staff canvas 174, according to an embodiment. Staff canvas 174 comprises a musical staff that comprises a visual representation of each note in the music scale to be learned (e.g., a particular music scale selected by a user), including, for example, accidentals, rhythmic variations, starting note, octave placement, number of octaves, and clef and repeat signs. In addition, a current note (i.e., currently being played by the application) may be highlighted.

When discussed herein with respect to any visual element, highlighting may include a different color (e.g., blue instead of a default black font color), different weighting (e.g., bold instead of a default standard font weight), and/or some other distinguishing characteristic (e.g., bounding box, underlining, etc.) from the non-highlighted elements.

If the entire staff is unable to be viewed within a display at one time (e.g., due to screen size, user-specified scale height, scale length, etc.), graphical user interface 150 may enable the user to scroll the staff left and right to see all notes in the scale. This scrolling may be enabled while the scale is being performed, when the performance is paused, or both during the performance and when the performance is paused. To scroll, the user may touch the staff within graphical user interface 150 (e.g., using a finger or stylus) and maintain contact while sliding the touch point left (e.g., to scroll right) or right (e.g., to scroll left). Alternatively, a double tap operation (i.e., a touch followed by a release and immediate retouch) may be required to enable scrolling (e.g., unfreeze and unlock the staff for scrolling using a slide input), and optionally, another double tap operation may be used to disable scrolling (e.g., freeze or lock the staff). In an alternative or additional embodiment, graphical user interface 150 may automatically scroll the staff to center the current note or otherwise scroll the staff to keep the current note within the region of graphical user interface 150 that is currently being displayed.

When discussed herein with respect to any visual element (e.g., a canvas, input, available option for a parameter, etc.), it should be understood that touching or selecting the visual element may comprise physically contacting a point on a touch sensor display at which the visual element is currently being displayed, as well as virtually selecting a point (e.g., using an input device, such as a mouse or other pointing device) on a display at which the visual element is currently being displayed.

Figure 4B:
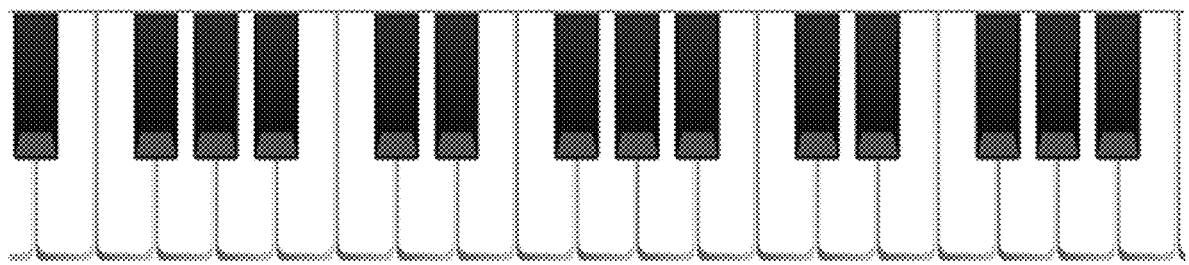

FIG. 4B illustrates an example of a portion of keyboard canvas 176, according to an embodiment. As illustrated, keyboard canvas 176 comprises a visual representation of four or more piano keys of a keyboard. A current piano key (i.e., currently being played by the application) may be highlighted, for example, similarly or identically to how the current note in staff canvas 174 is highlighted (e.g., colored in blue). Thus, in an embodiment, the current note and the current piano key are simultaneously highlighted to emphasize the connection between the note and key in the user's mind. The highlighted notes and piano keys visually show the user the notes that are being performed in real time.

If the entire keyboard is unable to be viewed within a display at one time (e.g., due to screen size, user-specified keyboard height, keyboard length, etc.), graphical user interface 150 may automatically scroll the keyboard to center the current piano key or otherwise scroll the keyboard to keep the current piano key within the region of graphical user interface 150 that is currently being displayed. Alternatively or additionally, graphical user interface 150 may allow the user to scroll the keyboard left and right, for example, in a similar or identical manner as described with respect to the staff (e.g., in response to a tap or double tap in conjunction with a slide).

2.2. Parameter Selection

The application may enable the user to select a number of different parameters to customize the user's learning session. In an embodiment, these selections may be implemented as frames that are overlaid within graphical user interface 150 in response to selections of an input corresponding to the parameter. Each frame may comprise a drop-down menu that comprises a list of all options available for the respective parameter. Specifically, each list may comprise a selectable representation (e.g., unique icon and/or textual description) for each available option. In the event that not all of the option representations can be displayed at one time (e.g., due to display size, font size, etc.), the frame may be scrollable (e.g., vertically, so that the user can scroll down and up) in any well-known manner. While each parameter will be described herein as having particular options, it should be understood that fewer, more, and/or different options may be used than those illustrated herein. In addition, each parameter may have a default option (e.g., the first option in each list) that is used when a user does not specify a particular option. This enables the user to begin practicing without much setup time.

Figure 4C:
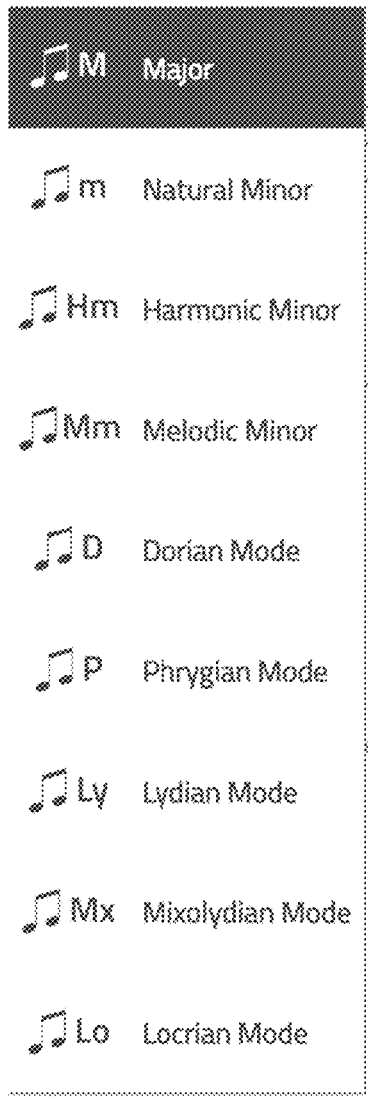

FIG. 4C illustrates an example frame for selecting a music scale to be learned, according to an embodiment. The frame may be displayed in response to the user selecting scale input 305. As illustrated, the available music scales include, without limitation, the major, natural minor, harmonic minor, melodic minor, Dorian mode, Phrygian mode, Lydian mode, Mixolydian mode, Locrian mode, Blues, and Pentatonic scales. Once a music scale is selected, graphical user interface 150 may update staff canvas 174 and/or keyboard canvas 176 to reflect the notes in the selected music scale.

Figure 4D:
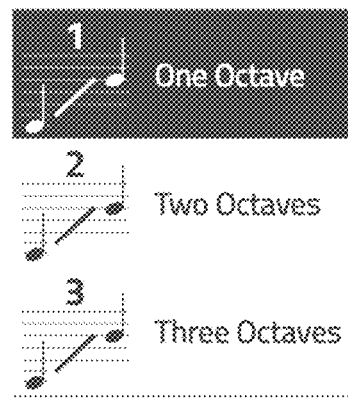

FIG. 4D illustrates a frame for selecting a number of octaves, according to an embodiment. The frame may be displayed in response to the user selecting number-of-octaves input 310. As illustrated, the available number of octaves include, without limitation, one octave, two octaves, and three octaves. Once a number of octaves is selected, graphical user interface 150 may update staff canvas 174 and/or keyboard canvas 176 to reflect the selected number of octaves. For example, staff canvas 174 and/or keyboard canvas 176 may be updated to reflect eight notes if the user selects one octave, sixteen notes if the user selects two octaves, and twenty-four notes if the user selects three octaves.

Figure 4F:
Figure 4E:

FIG. 4E illustrates a frame for selecting a starting note, according to an embodiment. The frame may be displayed in response to the user selecting note input 315. As illustrated, the available starting notes include, without limitation, C, $C^{\#}/D^{b}$, D, $D^{\#}/E^{b}$, E, F, $F^{\#}/G^{b}$, G, $G^{\#}/A^{b}$, A, $A^{\#}/B^{b}$, and B. Once a starting note is selected, graphical user interface 150 may update staff canvas 174 and/or keyboard canvas 176 to reflect the selected starting note (e.g., by aligning staff canvas 174 and/or keyboard canvas 176 with the starting note).

Figure 4G:
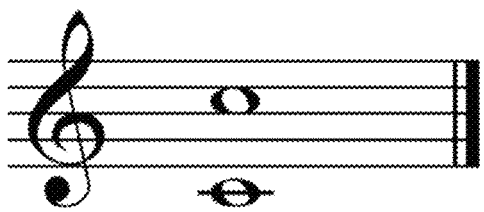

FIG. 4F illustrates a frame for selecting a starting octave for the selected scale, according to an embodiment. The frame may be displayed in response to the user selecting octave input 320. As illustrated, the available starting octaves include, without limitation, the zero register, first register, second register, third register, fourth register, fifth register, sixth register, and seventh register. In an embodiment in which the user may select a particular instrument, the available starting octaves may be filtered to remove octaves, if any, from the frame of starting octaves, that are not available for the selected instrument. Once a starting octave is selected, graphical user interface 150 may update staff canvas 174 and/or keyboard canvas 176 to reflect the selected starting octave. For example, if a user selects the C note as the starting note (e.g., using note input 315) and then selects the fourth register as the starting octave (e.g., using octave input 320), graphical user interface 150 would update staff canvas 174 and/or keyboard canvas 176 to start the pitch at note C4. More generally, when a starting octave is selected, the application updates staff canvas 174 and/or keyboard canvas 176 to align with the starting octave. In an alternative embodiment, selectable starting octaves may be displayed on the staff of staff canvas 174, as illustrated in FIG. 4G, and the user may select the starting octave by selecting one of the selectable starting octaves on the staff.

FIG. 4H illustrates a frame for selecting a rhythm for the selected scale, according to an embodiment. The frame may be displayed in response to the user selecting rhythm input 325. As illustrated, the available rhythms include, without limitation, quarter notes, eighth notes, eighth notes tied to sixteenth notes, and sixteenth notes tied to eighth notes. Once a rhythm is selected, graphical user interface 150 may update staff canvas 174 to reflect the selected rhythm. For example, the notes on the staff in staff canvas 174 may be updated to reflect the selected rhythm. In addition, the selected rhythm will be reflected in the auditory playback of the music scale.

FIG. 4I illustrates a frame for selecting a tempo for the selected scale, according to an embodiment. The frame may be displayed in response to the user selecting tempo input 330. As illustrated, the available tempos include, without limitation, any integer between ten and two-hundred-forty beats per minute. Once a tempo is selected, the selected tempo will be reflected in the auditory playback of the music scale.

FIG. 4J illustrates operation of note-repeat input 335, according to an embodiment. As shown at the top of FIG. 4J, if note-repeat input 335 is toggled off, the top note of the selected scale is only played once and shown once in staff canvas 174. However, if note-repeat input 335 is toggled on, the top note of the selected scale is played twice, and both notes are represented in staff canvas 174. For example, if the top note of the selected scale is C, the C note would be repeated twice before descent.

In an embodiment, graphical user interface 150 comprises a metronome input 340, which toggles a metronome on and off. When the user selects metronome input 340 to toggle the metronome on, a metronome is played in the background during performance of the selected scale. The metronome follows the selected tempo (e.g., selected using tempo input 330). Specifically, the application may retrieve an audio file (e.g., from local database 134) that comprises a click sound, and continually play the retrieved audio file at the selected tempo for the length of the performance. When the user selects metronome input 340 to toggle the metronome off, the metronome is not played during performance of the selected scale.

In an embodiment, graphical user interface 150 comprises a scale-repeat input 345, which toggles a repeat option on and off. When the user selects scale-repeat input 345 to toggle the repeat option on, the application performs the scale repeatedly from beginning to end until the performance is stopped (e.g., by the user). Thus, graphical user interface 150 may update staff canvas 174 such that a repeat sign appears at the end of the scale on the staff, as illustrated in FIG. 4K, according to an embodiment. When the user selects scale-repeat input 345 to toggle the repeat option off, the scale is not repeated, such that the application only performs the scale once, and the repeat sign is not shown on staff canvas 174.

2.3. Performance

In an embodiment, graphical user interface 150 comprises a play input 350, which toggles performance of the selected scale on and off. When performance is toggled off, play input 350 may comprise the standard "play" icon, and, when the performance is toggled on, play input 350 may comprise the standard "pause" icon or "stop" icon. When the user selects play input 350 to toggle the performance on, the application will retrieve the requisite audio file(s) and play the selected scale, in accordance with all of the selected parameters (e.g., with the selected number of octaves, starting with the selected starting note and selected starting octave, with the selected rhythm, at the selected tempo, with or without a repeat of the top note, with or without the metronome, with or without a scale repeat, etc.). If the metronome is toggled on (e.g., via metronome input 340), the application plays the metronome at the selected tempo in the background as the application and/or user performs the selected scale. If the metronome is toggled off, the application does not play the metronome during the performance.

In an embodiment, the application stores a sound in association with each note and each instrument available in the application. Each sound may be stored as an audio file in local database 134 and/or remote database 114. Each sound represents the sound that its associated instrument would make if that instrument played the associated note. The sound for each note on each instrument may be recorded in a professional recording studio (e.g., using a Steinway Model D Concert Grand Piano from 1980 or other piano for the piano notes) to produce the associated audio file. Whenever a particular note is performed by the application, the application retrieves and plays the audio file, associated with that note, via a speaker integrated into or connected to user system 130.

If the user selects play input 350 during performance of the selected scale, to thereby toggle performance off, the performance may be paused. If the user then selects play input 350 again, to thereby toggle performance back on, the performance, including recordation of the performance, may be resumed.

In an embodiment, graphical user interface 150 may also comprise a record input 370 that can be toggled on and off. When user selects record input 370 to toggle it on, the application may record the user's performance as an audio file (e.g., in local database 134 and/or remote database 114) while the user plays the selected scale (e.g., on an external instrument). The user's performance may be recorded by recording the sound received by a microphone, integrated into or otherwise connected to user system 130, as the user performs the scale on his or her instrument. When the user selects record input 370 to toggle it off, the application may stop recording the user's performance and store the audio file in persistent memory for future playback and/or analysis.

In an embodiment, during recording of the user's performance (e.g., when record input 370 is toggled on), the application may silently perform the selected scale. In other words, the application may highlight the notes and keys in staff canvas 174 and keyboard canvas 176, respectively, but not output the sound of any of the notes in the selected scale. Essentially, the application plays back the scale on mute, so that the user can see the current notes and keys being performed by the application while the user performs the scale on his or her instrument. However, if the user has toggled the metronome on (e.g., via metronome input 340), the application may still output the sound of the metronome (e.g., through the speakers of user system 130), so that the user can hear the metronome during his or her performance of the scale. In this case, the application can record both the sound of the user's instrumental performance and the sound of the metronome.

2.4. Other Settings

Figure 4L:

In an embodiment, graphical user interface 150 comprises a settings input 355, which enables the user to change secondary parameters (e.g., related to the user interface itself, rather than musical parameters for a music scale). For example, when the user selects settings input 355, the application may overlay a settings frame within graphical user interface 150. FIG. 4L illustrates one example of such a settings frame, according to an embodiment. As illustrated, the settings frame comprises inputs that enable the user to set secondary parameters, such as volume, view, vertical, and/or theme settings.

For example, the volume settings may include the volume of the metronome and/or the volume of played notes. Each volume may be set using a slider input, which provides a range from no sound (mute) to full volume. The user may slide an input tab along the slider input to position the input tab at any position or one of a plurality of indexed positions along the slider input. The volume is set in proportion to the position of the input tab on the slider input, within the range of possible volumes represented by the slider input. In addition, the volume settings may comprise an input for toggling an aspect ratio option on or off. When the aspect ratio option is toggled on, the existing ratio of the metronome volume to the notes volume may be maintained. Thus, when the user changes the value of the metronome volume, while the aspect ratio option is toggled on, the application automatically changes the value of the notes volume to maintain the current ratio between the two volumes. Similarly, when the user changes the value of the notes volume, while the aspect ratio option is toggled on, the application automatically changes the value of the metronome volume to maintain the current ratio between the two volumes. Conversely, when the aspect ratio option is toggled off, a change in the value of either volume does not affect the value of the other volume (i.e., the volumes may be set independently from each other).

The view settings may include a staff view and keyboard view. Each view may be toggled on or off using a toggle input. When the staff view is toggled on, staff canvas 174 is included in graphical user interface 150. Conversely, when the staff view is toggled off, staff canvas 174 is excluded (e.g., hidden, not displayed, etc.) from graphical user interface 150. Similarly, when the keyboard view is toggled on, keyboard canvas 176 is included in graphical user interface 150. Conversely, when the keyboard view is toggled off, keyboard canvas 176 is excluded from graphical user interface 150. Thus, the user may configure graphical user interface 150 to include only staff canvas 174, only keyboard canvas 176, or both staff canvas 174 and keyboard canvas 176.

The vertical settings may include a height of staff canvas 174 and/or keyboard canvas 176. Each height may be set using a slider input, which provides a range from the shortest available height to the tallest available height. The user may slide an input tab along the slider input to position the input tab at any position or one of a plurality of indexed positions along the slider input. The height is set in proportion to the position of the input tab on the slider input, within the range of possible heights represented by the slider input. In addition, the vertical settings may comprise an input for toggling an aspect ratio option on and off. When the aspect ratio option is toggled on, the existing ratio of the height of staff canvas 174 to keyboard canvas 176 may be maintained. Thus, when the user changes the height of staff canvas 174, while the aspect ratio option is toggled on, the application automatically changes the height of keyboard canvas 176 to maintain the current ratio between the two canvas heights. Similarly, when the user changes the height of keyboard canvas 176, while the aspect ratio option is toggled on, the application automatically changes the height of staff canvas 174 to maintain the current ratio between the two canvas heights. Conversely, when the aspect ratio option is toggled off, a change in the height of either canvas does not affect the height of the other canvas (i.e., the canvas heights may be set independently from each other). It should be understood that any changes in the heights of staff canvas 174 and/or keyboard canvas 176 will be reflected in graphical user interface 150. Specifically, the application will update the height of the respective canvas within graphical user interface 150 to reflect the height set by the user in the vertical settings.

The theme settings may include one or more inputs for selecting among a plurality of themes. In the illustrated embodiment, there are four themes: a multicolored light theme; a multicolored dark theme; a monochromatic light theme; and a monochromatic dark theme. Thus, the theme settings include a toggle input that allows the user to toggle between the light theme and the dark theme, as well as a toggle input that allows the user to toggle between multicolored and monochromatic themes. The light theme, which may be the default them, may comprise a lighter color palette than the dark theme. It should be understood that other embodiments may comprise fewer or more than four themes and/or different themes than light and dark themes and multicolored and monochromatic schemes. In addition, in an alternative embodiment, the themes could be selected from a drop-down menu that lists each of the available themes, rather than toggle inputs. Themes may differ in any number of design features, such as color, font, size, arrangement of elements, and/or the like.

In an embodiment, the settings frame or toolbar 300 may comprise one or more additional settings that are not illustrated in the figures. For example, graphical user interface 150 may comprises a toggle input for turning whole and half step markings on and off. In this case, when the user selects the toggle input to turn the step markings on, whole and half steps are marked to correspond with the selected scale, and, when the user selects the toggle input to turn the step markings off, whole and half steps are not marked.

As another example, graphical user interface 150 may comprise a toggle input for turning key signatures on and off. In this case, when the user selects the toggle input to turn the key signatures on, key signatures are indicated on the left-hand side of the music scales. Conversely, when the user selects the toggle input to turn the key signatures off, key signatures are not indicated.

As yet another example, graphical user interface 150 may comprise a toggle input for turning accidentals on and off. In this case, when the user selects the toggle input to turn accidentals on, accidentals may be shown. Conversely, when the user selects the toggle input to turn accidentals off, accidentals are not shown.

As a further example, graphical user interface 150 may comprise an input for receiving help or support (e.g., via a help dialog, indexed and searchable electronic document, etc.) and/or an input for changing a language used by graphical user interface 150. These inputs may be provided in toolbar 300, the settings frame (e.g., accessed by settings input 355), and/or anywhere else within graphical user interface 150. For example, the input for help may be provided in toolbar 300, and the input for selecting a language (e.g., via drop-down menu or other frame) may be provided in toolbar 300 or the settings frame.

2.5. Fingering Setting

Figure 4M:
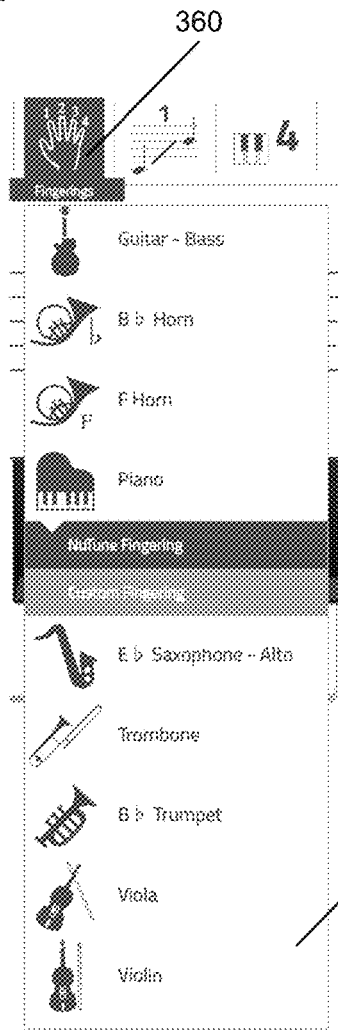

In an embodiment, graphical user interface 150 comprises a fingering-setting input. FIG. 4M illustrates an example of a fingering-setting input, according to an embodiment. Specifically, when a user selects fingering-setting input 360, the application overlays a fingering frame 365 within graphical user interface 150. As illustrated, fingering frame 365 comprises a list of all available instruments. Each instrument is represented by a unique icon (e.g., an image of the instrument or a silhouette of the instrument) and/or a textual name of the instrument. Each representation is selectable. In the event that not all of the instrument representations can be displayed at one time, fingering frame 365 may be scrollable (e.g., vertically, so that the user can scroll down and up) in any well-known manner. In the event that the user does not select a particular instrument via fingering-setting input 360, the default instrument may be the piano.

Figure 4N:
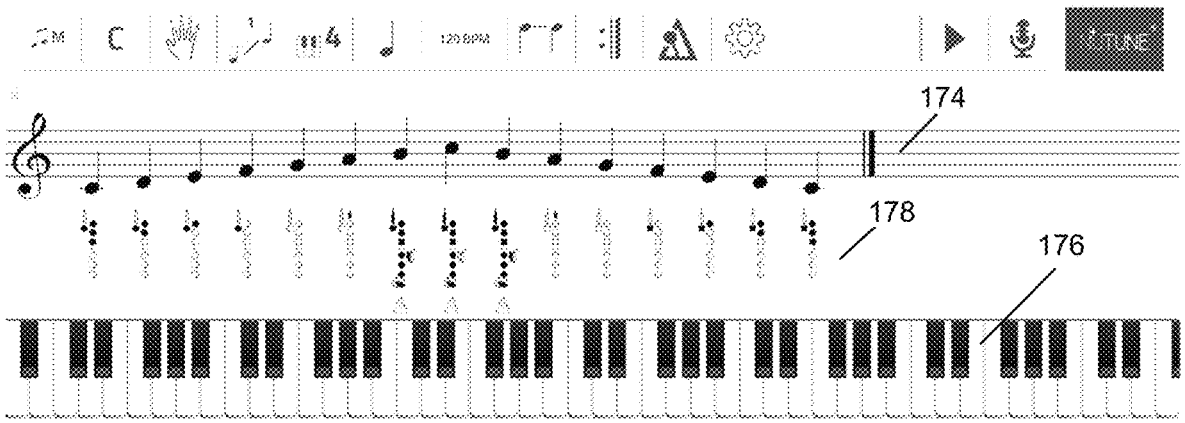

Once the user has selected a particular instrument from fingering frame 365, a fingering pattern or guide for the selected instrument may be displayed. For example, FIG. 4N illustrates a fingering canvas 178, according to an embodiment. As illustrated, fingering canvas 178 may be positioned below staff canvas 174 and above keyboard canvas 176. However, in alternative embodiments, staff canvas 174, keyboard canvas 176, and fingering canvas 178, may be arranged in any suitable manner. The arrangement may also be user configurable.

Ideally, fingering canvas 178 is positioned above or below staff canvas 174. For each note in staff canvas 174 for a selected scale, fingering canvas 178 may comprise a representation of the fingering for that note and specific to the instrument selected from fingering frame 365. For example, in the illustration of FIG. 4N, the user has selected the clarinet from fingering frame 365. Thus, under each note in staff canvas 174, a representation is provided of a clarinet fingering for playing that note on a clarinet. It should be understood that similar representations may be provided when other instruments are selected from fingering frame 365.

The application may provide a default fingering pattern for each scale. Each default fingering pattern may be an optimal fingering as determined by experts and/or technology for the particular instrument and notes. However, in an embodiment, the user may customize the fingering pattern for any scale, and save the customized fingering pattern (e.g., in local database 134 and/or remote database 114). Customized fingering patterns can enable the user to pinpoint a specific learning need.

Figure 4O:
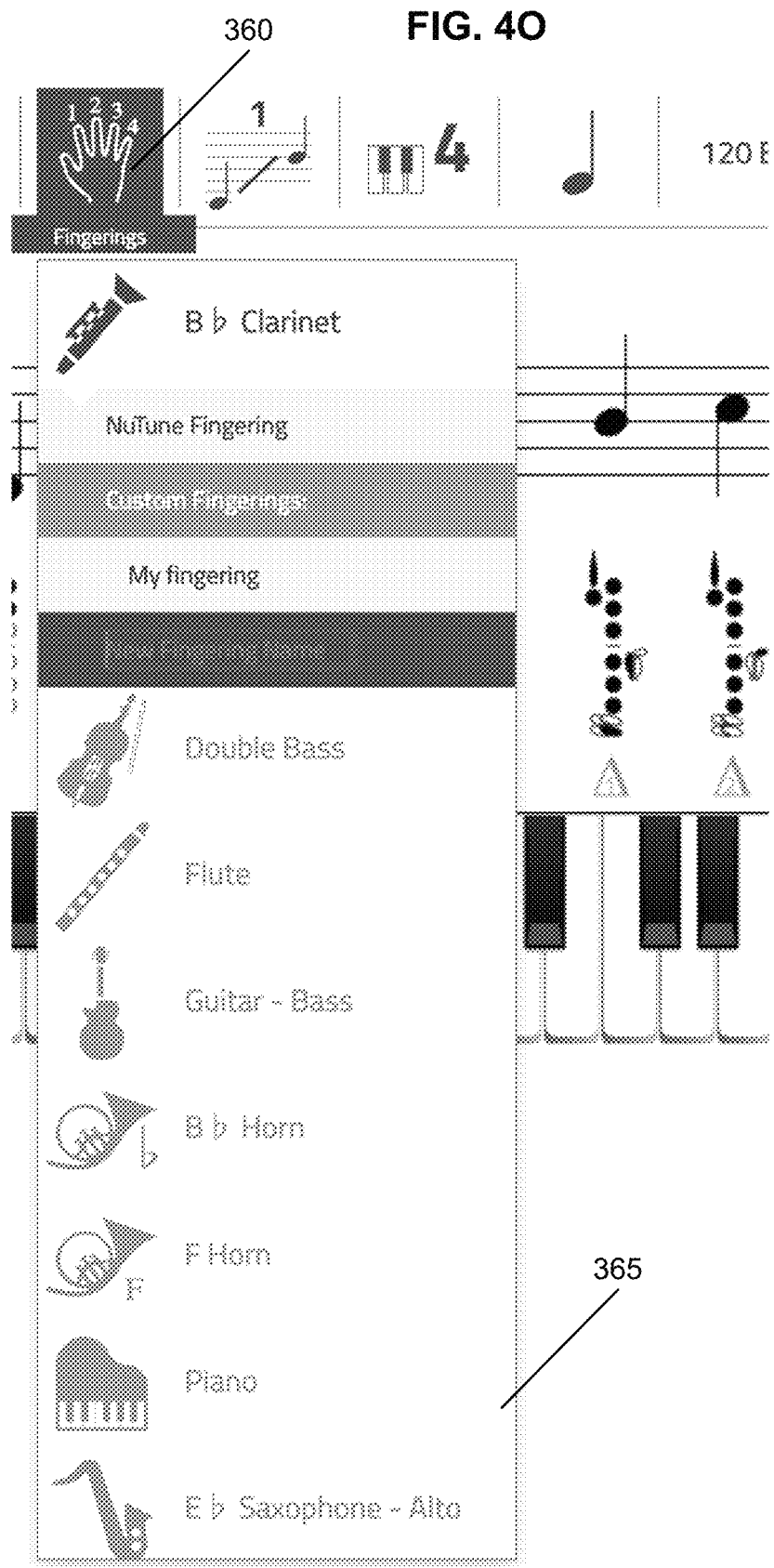

FIG. 4O illustrates how a user may save a customized fingering pattern, according to an embodiment. Specifically, the user may change the fingering for one or more notes in the selected scale and then save the customized fingering pattern under an editable name in fingering frame 365. The name of the customized fingering pattern may then be displayed in fingering frame 365 for future selection. Subsequently, the user can retrieve the customized fingering pattern by selecting the name of that customized fingering pattern in fingering frame 365. When the user selects the customized fingering pattern from fingering frame 365, the application may retrieve and display the customized fingering pattern, in place of the default fingering pattern for the selected scale, within fingering canvas 178 in graphical user interface 150.

Figure 4P:
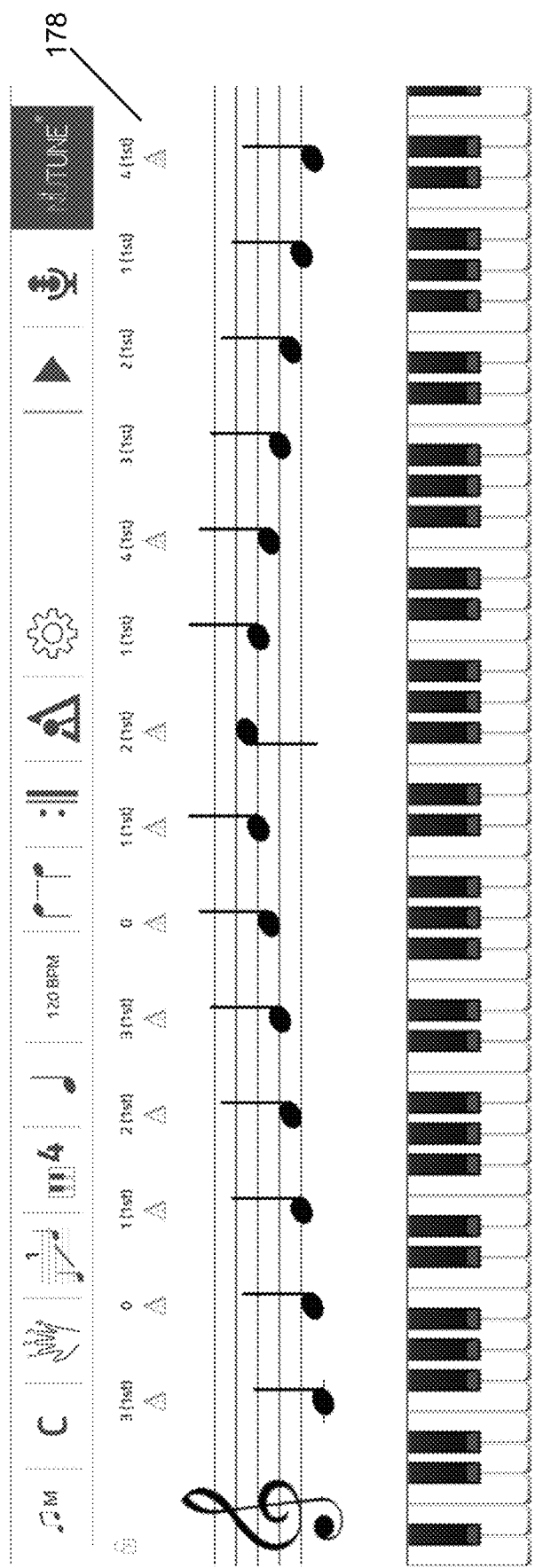

FIG. 4P illustrates fingering canvas 178 with respect to string instruments, according to an embodiment. If the user selects a string instrument (e.g., guitar, violin, etc.) from fingering frame 365, fingering canvas 178 displays the strings to be played for each note. Graphical user interface 150 may color code the different strings that can be used to play a single note, using any suitable coloring scheme. It should be understood that string patterns, whether they require literal fingering or not, may be customized and saved in the same manner as described above with respect to other fingerings. As used herein, the term "fingering" refers to any manner for playing a note on an instrument, whether it requires a literal fingering of the instrument, a bow of a string instrument, or any other direct or indirect means.

2.6. Alternative Embodiment

Figure 3E:
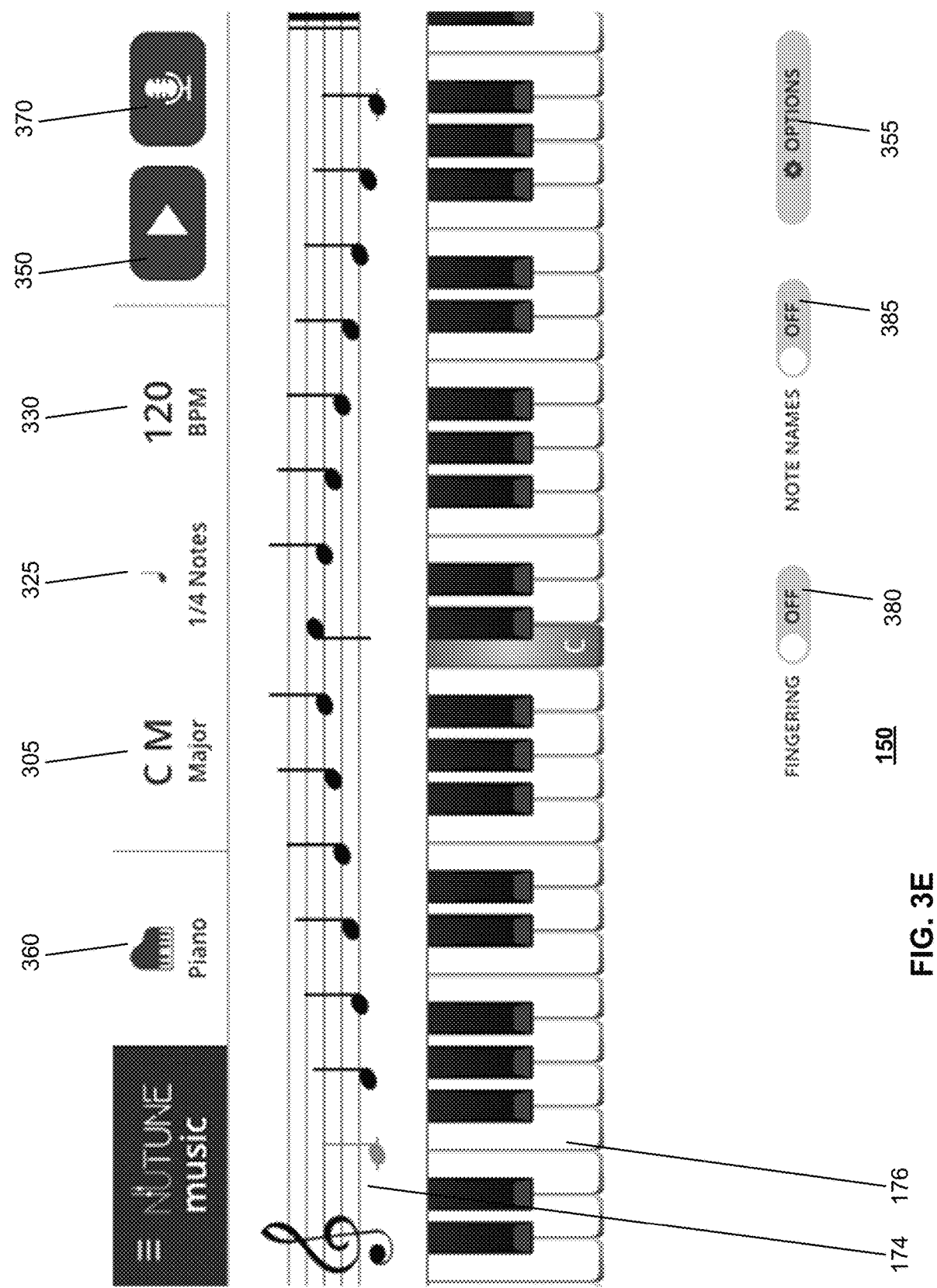

FIGS. 3D and 3E illustrate graphical user interface 150, according to alternative embodiments. In this embodiment, graphical user interface 150 comprises many of the same elements as the other embodiments. For the sake of conciseness, only the differences will be described.

In an embodiment, fingering-setting input 360 remains, but many of the other parameters are not directly editable from the main screen of graphical user interface 150. Rather, an edit input 375 may be provided within graphical user interface 150. In response to the user selecting edit input 375, the application may overlay a parameter frame within graphical user interface, which may comprise the inputs for editing one or more of the parameters. This parameter frame may be similar or identical to the wizard screen illustrated in FIG. 26C.

In an embodiment, graphical user interface 150 may also comprise a fingering toggle input 280, which toggles fingering canvas 178 (illustrated with piano fingerings) on and off. Thus, if the user selects fingering toggle input 380 to toggle fingering canvas 178 off, fingering canvas 178 will be hidden or otherwise removed from graphical user interface 150. In this case, keyboard canvas 176 may automatically shift up into the region vacated by fingering canvas 178, such that it becomes adjacent to staff canvas 174. Conversely, if the user selects fingering toggle input 380 to toggle fingering canvas 178 on, keyboard canvas 176 may be automatically shifted down, and fingering canvas 178 may be displayed within the region between staff canvas 174 and keyboard canvas 176.

In an embodiment, graphical user interface 150 may also comprise a notes-name toggle input 385, which toggles the names of the notes on keyboard canvas 176 on and off. Thus, if the user selects notes-name toggle input 385 to toggle the notes names on, the name of each note will be displayed on its associated key in keyboard canvas 176. Conversely, if the user selects notes-name toggle input 385 to toggle the notes names off, the name of each note will not be displayed on its associated key in keyboard canvas 176.

Figure 3F:
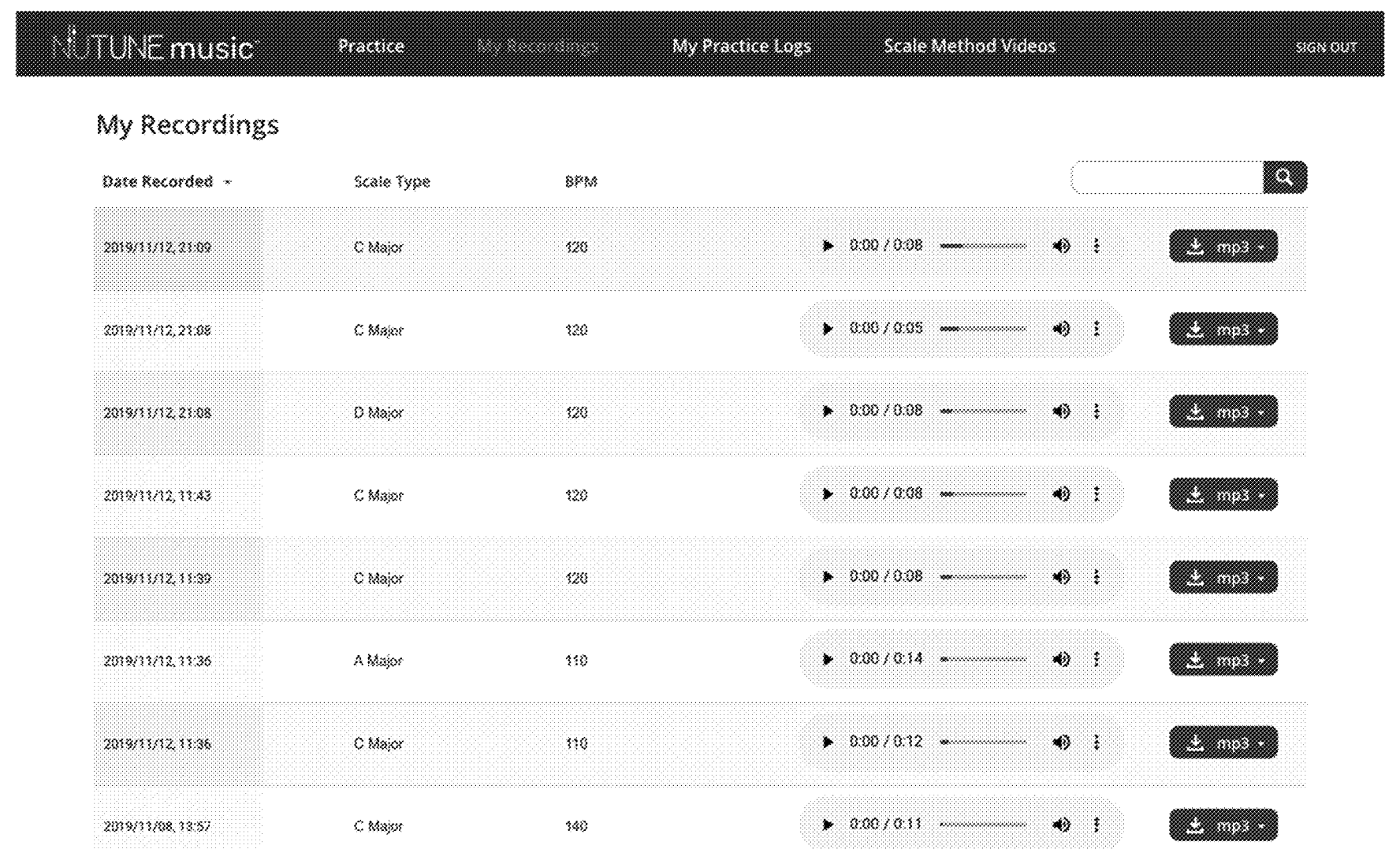
Figure 3H:
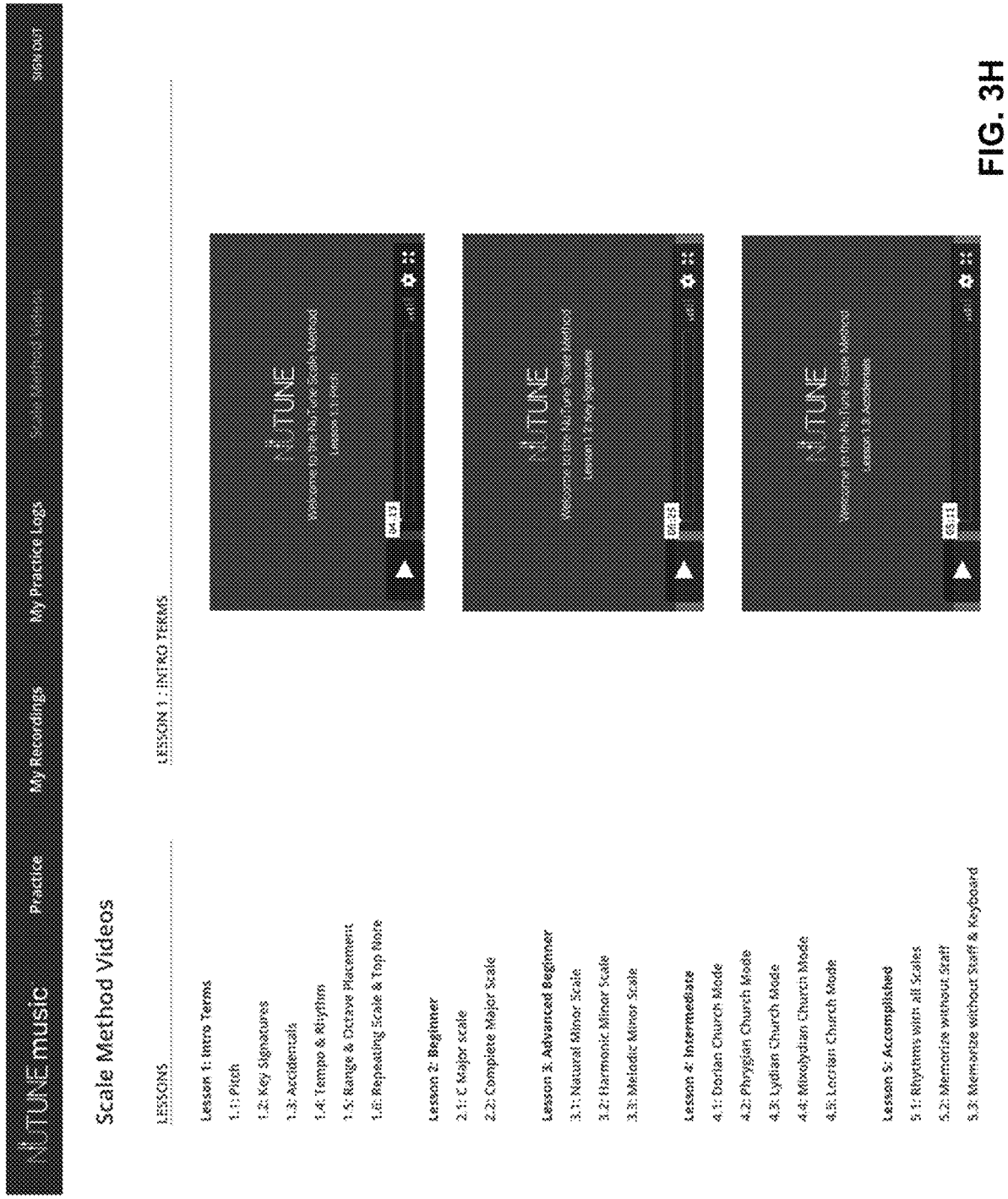

In an embodiment, graphical user interface 150 may also comprise a navigation bar 390 with links 392-398 to other screens of graphical user interface 150. For example, practice link 392 may provide access to the screen illustrated in FIG. 3D or 3E. Recordings link 394 may provide access to a screen that lists and provides access to (e.g., immediate playback of) all scale performances saved for the user (e.g., in local database 134 and/or remote database 114), as illustrated in FIG. 3F, according to an embodiment. Logs link 396 may provide access to practice logs (e.g., comprising statistics on lessons completed, day/times and durations of practices, software assessments, number of days of practice in a row, average duration of practice per day, a list of all practice sessions, with date, selected configuration, practice duration, and/or the like for each practice session, etc.), as illustrated in FIG. 3G, according to an embodiment. Videos link 398 may provide access to instructional videos, which are described elsewhere herein, as illustrated in FIG. 3H, according to an embodiment.

2.7. Software Assessment

In an embodiment, when a user records his or her performance of a music scale through the application (e.g., via record input 370 of graphical user interface 150), the application may analyze the recorded performance and provide feedback. For example, a software assessment module of the application may compare the recorded notes, pitch, intonation, timing, tempo, and rhythm from the user's performance to the known notes, pitch, intonation, timing, tempo, and rhythm for the configured music scale. Based on this comparison, the software assessment module may determine and output a score. The score may be a percentage representing how well the recorded performance matches the configured music scale, with 0% representing no similarity and 100% representing a perfect match. The score may be calculated based on the number and/or degree of errors or discrepancies between the recorded performance and the configured music scale. As an example, a score of 70% or greater may represent mastery of the configured music scale. However, it should be understood that the threshold representing mastery may be set to any appropriate percentage or other score. The user's score for each performance may be displayed in graphical user interface 150 (e.g., on a reporting screen) and/or a separate reporting user interface of the application.

Figure 5:
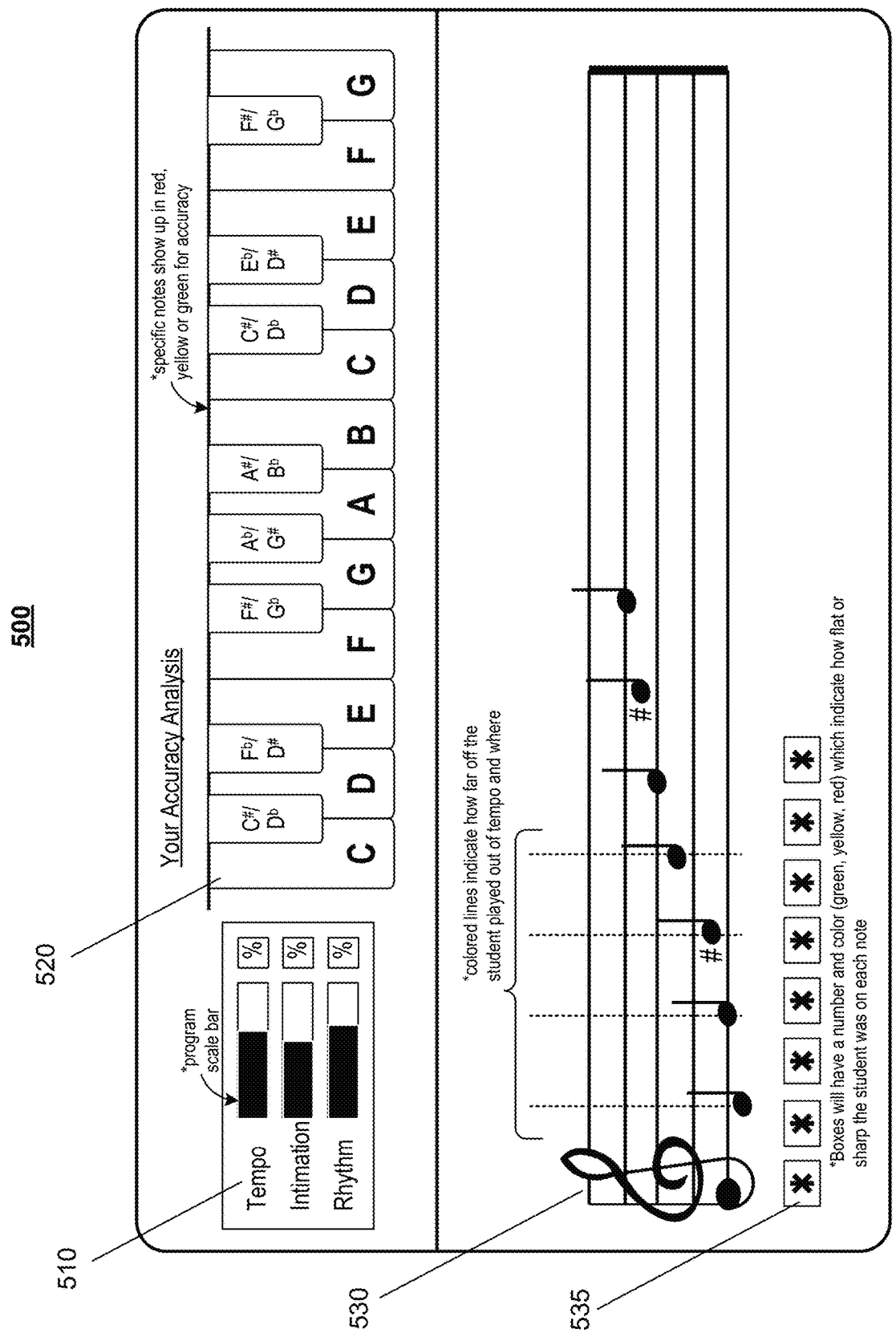
FIG. 5 illustrates a software assessment report, according to an embodiment.

In an embodiment, feedback may be provided within graphical user interface 150 as the user performs the selected music scale and/or after the user's performance is complete. The feedback may comprise the aforementioned overall score, note-specific scores, and/or other indicators. FIG. 5 illustrates one example of feedback, comprising a software assessment report 500, according to an embodiment. Software assessment report 500 may comprise one or more screens within graphical user interface 150. As illustrated, software assessment report 500 comprises a score panel 510, a keyboard panel 520 (e.g., similar or identical to keyboard canvas 176), and a staff panel 530 (e.g., similar or identical to staff canvas 174) with note-specific indications 535.

In an embodiment, score panel 510 indicates scores for one or more attributes of the user's recorded performance. For example, the scores may be represented in a progress bar that illustrates the user's mastery (e.g., as a percentage from 0% to 100%). There may be separate scores for tempo, intonation, and rhythm. Alternatively or additionally, there may be an overall score and/or one or more scores for more, fewer, or different attributes.

In an embodiment, keyboard panel 520 comprises a graphic of at least a portion of the keyboard that includes each note in the music scale that was performed by the user. The keys, representing the notes in the music scale, may be distinguished to visually reflect the accuracy with which the user played the note. For example, the keys, representing the notes in the music scale, may be colored green, yellow, or red, depending on the accuracy with which the corresponding note was played (e.g., with green representing good accuracy, yellow representing fair accuracy, and red representing poor accuracy).

In an embodiment, staff panel 530 comprises a staff with each of the notes of the music scale performed by the user, and an indication 535 associated with each note on the staff (e.g., below or above its associated note). As an example, each indication 535 may comprise a box which is colored green, yellow, or red to indicate the correctness of pitch (e.g., with green representing a good match, yellow representing a fair match, and red representing a poor match). In addition, within each box, a number may be provided to indicate the accuracy of the intonation (e.g., how far the user's intonation was off in cents). Optionally, the number in the box may also be colored indicate accuracy.

As another example, timing, tempo, and rhythm may be shown by a cursor on staff panel 730 that marks how early or late each note was performed for notes that were performed early or late. Specifically, for each performed note, a line may be added on the staff to indicate the timing position at which the note was performed by the user. The line may be colored green, yellow, or red to indicate how far off the timing of the note was (e.g., with green representing good timing, yellow representing fair timing, and red representing poor timing).

In an embodiment, the user can store his or her software assessment (e.g., score(s), graphic of the staff with boxes and timing lines, and/or the like), for example, in local database 134 and/or remote database 114. The application may enable the user to view his or her software assessments over time (e.g., graphing scores over time, juxtaposing graphics of staffs with boxes and timing lines over time, and/or the like), so that the user can track his or her progress.

In an embodiment, the user can share his or her software assessment with one or more recipients. For example, the user may identify one or more recipients (e.g., the user's music teacher) and contact information (e.g., mobile phone number, email address, etc.) for the recipient(s), and the application may send a message (e.g., text message, email message, in-app message, etc.) to the contact information for each of the one or more recipient(s). The message may comprise the software assessment and/or a link for accessing the software assessment. Thus, a recipient, such as the user's music teacher, may review the software assessment to track the user's progress, as well as formulate lesson plans and/or expectations.

In an embodiment, the application may utilize artificial intelligence to generate the software assessment and/or determine a next lesson based on the software assessment. For example, a machine-learning algorithm may be trained to receive an audio file of a user's recorded performance of a music scale and generate a score representing the user's mastery of that music scale. The training dataset may comprise audio files of recorded performances that have been annotated with scores supplied by musical experts. A single machine-learning algorithm may be used for all music scales or individual machine-learning algorithms may be used for each music scale. Alternatively to machine-learning, software assessments may be calculated based on a set of pre-programmed rules or mathematical expressions.

Additionally or alternatively, a machine-learning algorithm may be trained to receive a software assessment of a user's performance and identify a next lesson for the user to complete. For example, the training dataset may comprise software assessments that have been annotated with the recommended next lesson by experts in musical training methodologies. The trained machine-learning algorithm may be incorporated into the application, such that the application may identify the next lesson, as determined by the machine-learning algorithm from a software assessment of the user's latest recorded performance, to the user, via graphical user interface 150 or other means, and/or automatically set a reminder for the next lesson (e.g., via an API of a calendaring application or operating system executing on user system 130).

2.8. Preparation Assistant

In an embodiment, the application may comprise a software assistant module that preselects music scales, based on audition requirements, in order to maximize preparation and positive audition results. Specifically, graphical user interface 150 or another graphical user interface of the application may comprise one or more inputs for specifying audition requirements. The application may receive the user-specified audition requirements and/or an audition date. In addition, the application may record the user playing a baseline music test (e.g., one or more music scales), and analyze the rhythm, tempo, and/or intonation of the recorded baseline music test. Based on the received audition requirements and the analysis of the baseline music test, the application may then generate a practice plan that is designed to prepare the user for the audition by the audition date. In addition, the application may set reminders (e.g., via an API of a calendaring application or operating system executing on user system 130) for each lesson in the practice plan. Each reminder can be associated with a date and time and a lesson (e.g., a set of one or more configured music scales to practice and a duration to practice each configured music scale). At or near the date and time in each reminder, user system 130 will alert the user to complete the lesson associated with the reminder. Thus, the application can serve as an audition preparation assistant to facilitate scale training and self-assessment, as well as provide software assessment, to ensure the user's performances of music scales are at their highest levels by the time of an audition.

3. Training Methodology

In an embodiment, the application implements a unique training methodology to accelerate learning of a particular music scale and/or fingering pattern, in tempo, on pitch, and with rhythmic accuracy. The training methodology may include step-by-step instructional videos, to facilitate rapid mastery of the essential skills required to play music scales. The user may utilize the customizable parameters of the application to select from more than ninety-thousand iterations of scale sounds to pinpoint areas that strengthen specific scale skills, and/or follow instructional video modules (e.g., comprising five levels of learning and nineteen lessons). Users can begin the training methodology at any point along the spectrum from beginner to expert and can opt to customize areas for focused learning. The application may also provide a software assistant that preselects music scales based on a user's audition requirements to maximize preparation and positive audition results, as discussed elsewhere herein.

In an embodiment, the training methodology, implemented by the application, uses instructional videos to create an interactive user experience that accelerates learning. To create a hands-on learning approach, the instructional videos may include prompts for the user. Users may be provided with auditory instruction in conjunction with visuals that walk users through the learning process, step-by-step. While users are instructed through instructional video modules, they may have immediate access to a recording of the scale, being discussed in the instructional video module, through the application. Users may self-assess their ability to replicate the recording of the scale, or opt to record their performance of the scale and receive electronic feedback from the application. Users may work towards at least 70% mastery before progressing between lessons.

Learning scales is an important part of building musical skills so that users may become proficient in musical passages. In an embodiment, the application enables students to recognize patterns and acquire the coordination needed to play music in tempo, on pitch, and with the right rhythm. To ensure rapid mastery of essential music-scale skills, the training methodology may comprise five levels of learning: Level 1: Introduction; Level 2: Beginner; Level 3: Advanced Beginner; Level 4: Intermediate; and Level 5: Accomplished. The levels may be implemented as teaching modules representing tailored lessons. Each level is described in more detail below. Users may be prompted or instructed to perform certain actions, discussed herein, using instructional videos, graphical user interface 150 or another auditory or visual user interface of the application, an auditory or visual user interface of another application, and/or the like.

Figure 6:
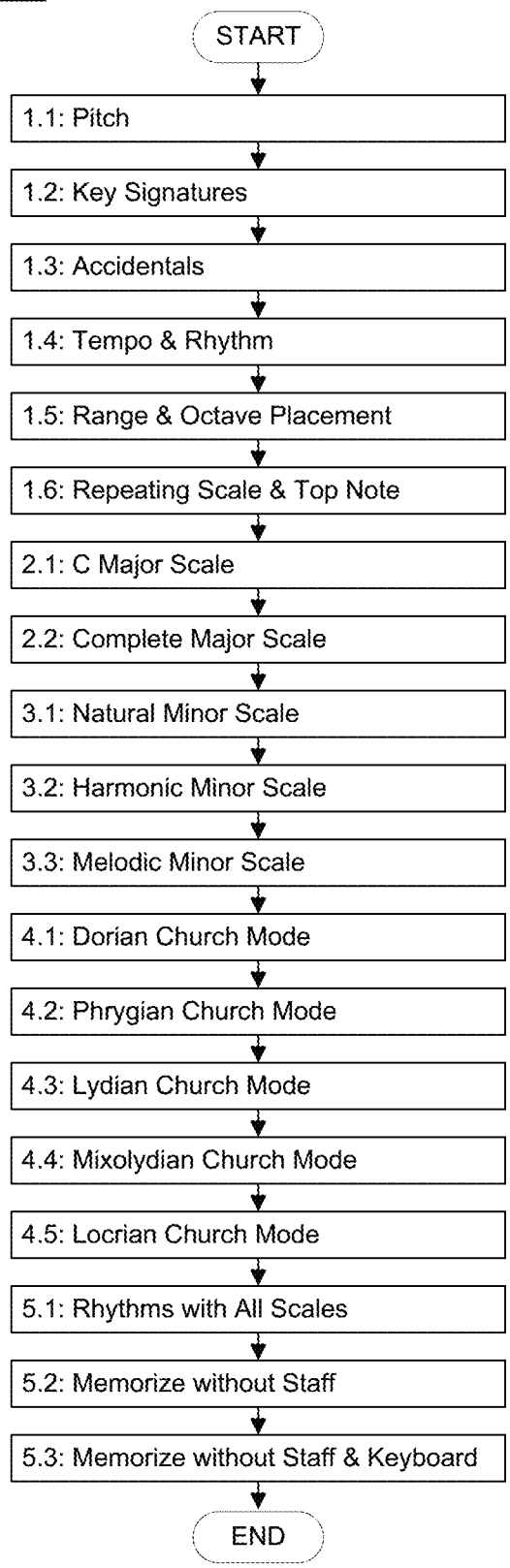
FIG. 6 illustrates a training methodology, according to an embodiment.

FIG. 6 illustrates an example of a training methodology 600, according to an embodiment. Training methodology 600 comprises five levels with a number of lesson within each level:
- in Lesson 1.1, the user is introduced to pitch;
- in Lesson 1.2, the use is introduced to key signatures;
- in Lesson 1.3, the user is introduced to accidentals;
- in Lesson 1.4, the user is introduced to tempo and rhythm;
- in Lesson 1.5, the user is introduced to range and octave placement;
- in Lesson 1.6, the user is introduced to repeating scales and the top note;
- in Lesson 2.1, the user masters the C Major Scale;
- in Lesson 2.2, the user masters the complete Major Scale;
- in Lesson 3.1, the user masters the Natural Minor Scale;
- in Lesson 3.2, the user masters the Harmonic Minor Scale;
- in Lesson 3.3, the user masters the Melodic Minor Scale;
- in Lesson 4.1, the user masters the Dorian Church Mode;
- in Lesson 4.2, the user masters the Phrygian Church Mode;
- in Lesson 4.3, the user masters the Lydian Church Mode;
- in Lesson 4.4, the user masters the Mixolydian Church Mode;
- in Lesson 4.5, the user masters the Locrian Church Mode;
- in Lesson 5.1, the user masters rhythms with all scales;
- in Lesson 5.2, the user memorizes all scales without the staff (e.g., without staff canvas 174); and
- in Lesson 5.3, the user memorizes all scales without the staff and keyboard (e.g., without staff canvas 174 and keyboard canvas 176).

Each level or lesson may be associated with a particular set of one or more teaching modules, and each teaching module may comprise an instructional video and/or user interaction (e.g., one or more prompts, questions, quiz, etc.). For example, these instructional videos may be accessible via videos link 398 of graphical user interface 150. Videos link 398 may provide access to an embedded video player and an ordered list of selectable instructional videos, as illustrated in FIG. 3H, according to an embodiment.

3.1. Level 1: Introduction to Terms

In an embodiment, Level 1 comprises a plurality of lessons that introduce the user to important concepts, including, without limitation, pitch, key signatures, accidentals, tempo, rhythm, range, octave placement, repeating the top note, and/or repeating the entire scale. Specifically, Level 1 may teach the user the basic terminology associated with performing a scale. Knowledge of this basic terminology facilitates usage of the application.

3.1.1. Lesson 1.1: Pitch

Figure 7A:
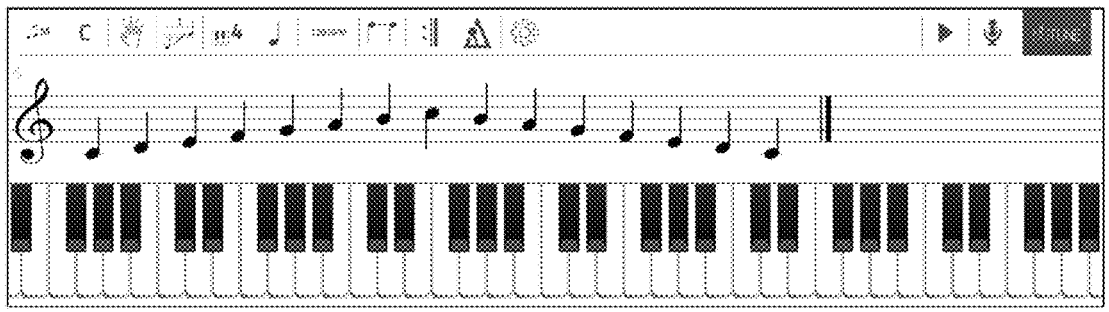
FIGS. 7A-7S illustrate configurations of a graphical user interface within a training methodology, according to embodiments.

An understanding of pitch is important, since the concept of pitch is foundational to musical learning. Thus, every musician should understand the concept of pitch. In addition, comfort with the concept of pitch will assist the user's understanding in future lessons and beyond. Thus, in an embodiment, the application may configure graphical user interface 150 for Lesson 1.1 as illustrated in FIG. 7A.

In an embodiment, Lesson 1.1 has two learning objectives. The first objective is for the user to understand the definition and use of the term "pitch." The application may determine that this first objective has been completed via the user's response to one or more questions (e.g., multiple choice) that assess the user's comprehension of the term "pitch." The second objective is for the user to master the skill of differentiating between multiple pitches. The application may determine that this second objective has been completed via the user's response to one or more questions (e.g., multiple choice) that involve a comparison between the pitches of two or more notes (e.g., which are played by the application).

3.1.2. Lesson 1.2: Key Signatures

Figure 7B:
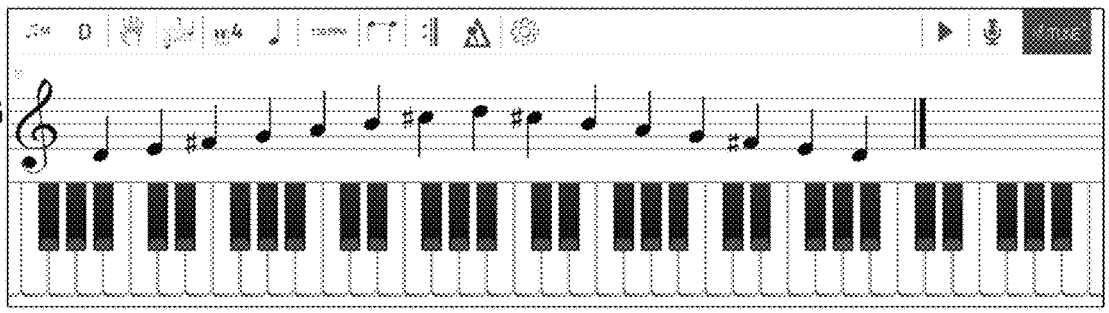

Key signatures are an important part of the musical learning process, since they set the mood for a musical piece and indicate how the musical piece will sound. Key signatures implement general rules to ensure that musicians can read a piece of music faster and easier. When key signatures are learned, the inner ear can be developed to allow musicians to read new music faster and easier. Thus, in an embodiment, the application may configure graphical user interface 150 for Lesson 1.2 as illustrated in FIG. 7B.

In an embodiment, Lesson 1.2 develops the user's understanding of the function of key signatures and how to read key signatures using the circle of fifths. The application may evaluate the user's understanding of key signatures by having the user label or match a set of key signatures with key names.

3.1.3. Lesson 1.3: Accidentals

Figure 7C:
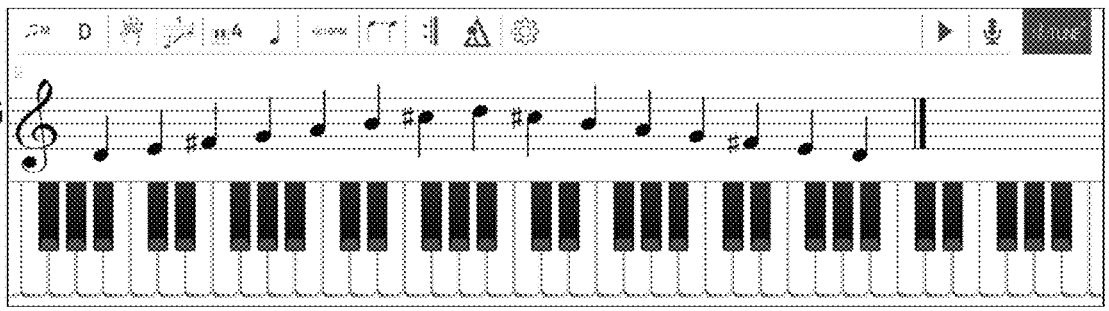

If a musical composer wants to break the rules of a key signature, to change the style of a phrase, the musical composer can do so through the manipulation of accidentals. Without accidentals, there would not be any surprises in a musical piece, and it would be impossible to move smoothly from one key to another. Thus, in an embodiment, the application may configure graphical user interface 150 for Lesson 1.3 as illustrated in FIG. 7C.

In an embodiment, Lesson 1.3 develops the user's understanding of the function of accidentals and how to read accidentals. The application may evaluate the user's understanding of the concept of accidentals by having the user raise or lower certain notes by a variation of half and whole steps. In addition, the application may evaluate the user's understanding of the definition of the term "accidental" by having the user recognize accidentals and note how the original note was altered.

3.1.4. Lesson 1.4: Tempo and Rhythm

Figure 7D:
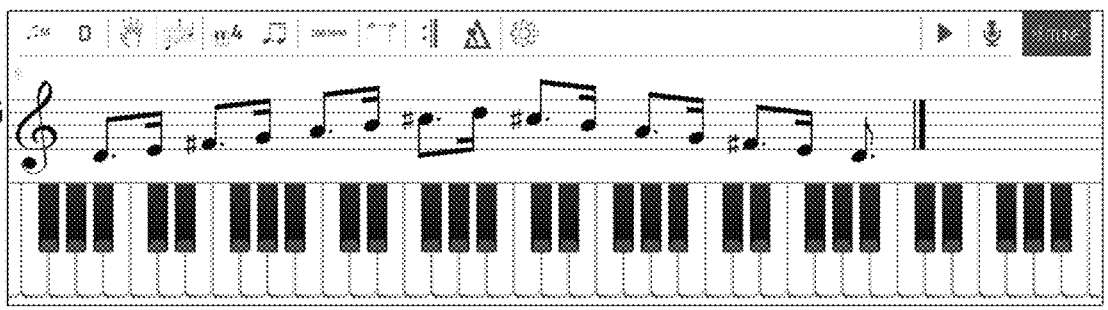

In an embodiment, Lesson 1.4 develops the user's understanding of the definition of tempo and how tempo can be used in a musical piece. The application may evaluate the user's understanding of the concept of tempo by having the user clap a series of rhythms at varying speeds. The application may record the series of claps and compare it to a reference audio file, representing an expected series of claps. If the comparison results in a bad match, the application can repeat or continue the lesson. Otherwise, if the comparison results in a good match, the application can determine that the user understands the concept of tempo. Thus, in an embodiment, the application may configure graphical user interface 150 for Lesson 1.4 as illustrated in FIG. 7D.

In an embodiment, Lesson 1.4 also develops the user's understanding of different rhythmic patterns, including, without limitation, quarter notes, eighth notes, dotted eighth sixteenth notes, and sixteenth note dotted eighth rhythms. The application may evaluate the user's understanding of the concept of rhythm by having the user clap and speak different rhythms at slow, medium, and fast tempos. Again, the application may record the user-created set of sounds and compare it to a reference audio file, representing an expected set of sounds. If the comparison results in a bad match, the application can repeat or continue the lesson. Otherwise, if the comparison results in a good match, the application can determine that the user understands the concept of rhythm.

3.1.5. Lesson 1.5: Range and Octave Placement

Figure 7E:
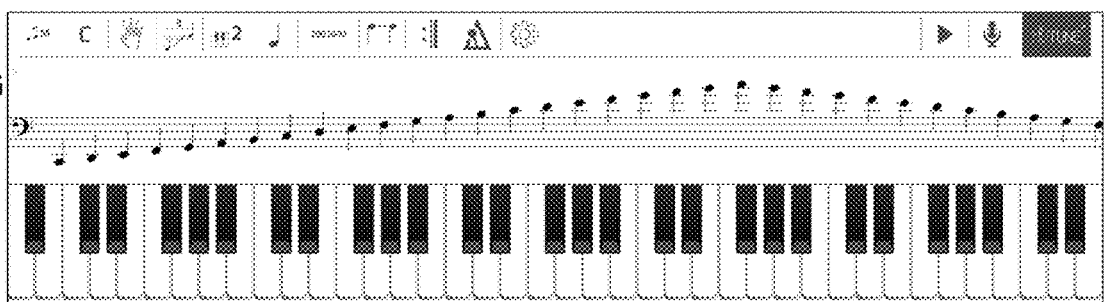

Knowing the octave ranges for different instruments is essential to an understanding of how a particular instrument fits with other instruments. For orchestral and group ensemble work, different ranges of instruments create the varying timbres and musical feelings to which audiences are accustomed. Thus, in an embodiment, the application may configure graphical user interface 150 for Lesson 1.5 as illustrated in FIG. 7E.

In an embodiment, Lesson 1.5 develops the user's understanding of instrument range. The application may evaluate the user's understanding of the concept of range by having the user select an appropriate octave range for a set of instruments.

In an embodiment, Lesson 1.5 also develops the user's understanding of the importance of octave placement as it relates to an instrument's range and playing a scale. The application may evaluate the user's understanding of the concept of octave placement by having the user select an appropriate octave placement for the user's instrument.

3.1.6. Lesson 1.6: Repeating Scale and Top Note

Identifying "road signs" in music is an essential skill for any musician. For instance, identifying repeat signs and double bar lines can save a musician from an awkward solo or being left behind in chamber music. By integrating an extra top note into practice scales, a user can create different slurring combinations for memorizing patterns in music. Thus, in an embodiment, the application may configure graphical user interface 150 for Lesson 1.6 as illustrated in FIG. 7F.

In an embodiment, Lesson 1.6 develops a user's ability to identify double bar lines and repeat signs, as well as their use and effectiveness in practice. The application may evaluate the user's ability to identify these signs by having the user differentiate between a repeat sign and a double bar line in musical pieces.

In an embodiment, Lesson 1.6 also develops a user's understanding of the importance of repeating the top note while practicing ties and slurs in a musical scale. The application may evaluate the user's understanding of this concept by having the user select the appropriate time to repeat the top note based upon a random assortment of slurs and ties.

3.2. Level 2: Beginner

In an embodiment, Level 2 comprises a plurality of lessons that teach the major scales to the user. Specifically, Level 2 may lead beginning users through mastery of the basic components of playing major and natural minor scales.

3.2.1. Lesson 2.1: C Major Scale

In an embodiment, Lesson 2.1 instructs the user that the major scale is composed of a pattern of half and whole steps. All major scales are composed of the pattern whole, whole, half, whole, whole, whole, half.

Starting with a C4 major one-octave scale, the user is instructed to set up the application in the C4 major one-octave scale configuration, as shown in FIG. 7G. The user may then be prompted to play along with the configured scale, as it is performed by the application (e.g., with sound by selecting play input 350 or without sound by selecting record input 370). The user may be instructed to use self-assessment or a software assessment (e.g., pitch/note recognition software included in the application), until a minimum score (e.g., 70% or higher) has been achieved in performing the scale. Once the C4 major one-octave scale has been mastered, the user may be instructed to repeat the process for all major one-octave scales until a minimum score (e.g., 70% or higher) is achieved for all major one-octave scales.

3.2.2. Lesson 2.2: Complete Major Scale

In an embodiment, in Lesson 2.2, after a user has mastered the C major scale, the user is instructed to continue with the G, D, and A major scales. Thus, in an embodiment, the application may configure graphical user interface 150 for Lesson 2.2 as illustrated for the D major scale in FIG. 7H. Since C major has no sharps or flats, the pattern is quite simple. However, when applying the pattern of whole and half steps to different key signatures, learning generally becomes more difficult. The user may be instructed to start with G major. G major has one sharp, $F^\#$. The user may be alerted to how the application has added the sharp on staff canvas 174, and may be reminded that the pattern of whole and half steps does not change. The user may be instructed to click play input 350 or record input 370, and play along with the G major scale. Then, the user may be instructed to similarly play the D and A major scales. D major has two sharps, $F^\#$ and $C^\#$, while A major has three sharps, $F^\#$, $C^\#$, and $G^\#$. The user can be instructed to apply these concepts to the rest of the major scales using any tempo, any starting pitch, and any octave range. The user may be instructed to follow the circle of fifths, and determine which major scale has how many sharps. The user may be instructed to check the tempo, intonation, and/or rhythmic accuracy, and then self-assess or use software assessment until a minimum score (70% or higher) has been achieved. Once mastered, the user can be instructed to learn the natural minor scale.

3.3. Level 3: Advanced Beginner

In an embodiment, Level 3 comprises learning the natural minor, harmonic minor and melodic minor scales. Specifically, Lesson 3 teaches advanced beginning users to master the basic components of playing a natural, harmonic and melodic minor scale.

3.3.1. Lesson 3.1: Natural Minor Scale

In an embodiment, in Lesson 3.1, after mastering the major scale, the user is instructed on the natural minor scale. The user may be instructed that natural minor scales are formed with a pattern of whole and half steps, just like a major scale. In a natural minor scale, the pattern is whole, half, whole, whole, half, whole, whole. The natural minor scale, just like every other scale, is composed of a different combination of whole and half steps. The user may be instructed to set up the application on the A4 natural minor scale, as shown in FIG. 7I.

The user may be prompted to notice that the A4 natural minor scale has no sharps or flats, and shares the same key signature as the C major scale. The A natural minor and C major scales are relative to one another, but the patterns between the two scales remain different. The user may be asked to listen to the A4 natural minor scale and notice how the sound is "sadder." The user may be taught that this "sadder" sound occurs because the third, sixth, and seventh notes are lowered relative to the parallel major scale. The user may be instructed to test this concept with a C natural minor scale and observe the pattern. The user may be guided to understand how these concepts apply to every type of natural minor scale. The user may be continually reminded to check his or her tempo, intonation, and/or rhythmic accuracy.

The user may be instructed to determine his or her progress and mastery through self-assessment or software assessment, until a minimum score (e.g., 70% or higher) has been achieved. Once the A4 natural minor one-octave scale has been mastered, the user may be instructed to repeat the process for all natural minor one-octave scales until a minimum score (e.g., 70% or higher) has been achieved on all natural minor one-octave scales.

3.3.2. Lesson 3.2: Harmonic Minor Scale

Figure 7J:
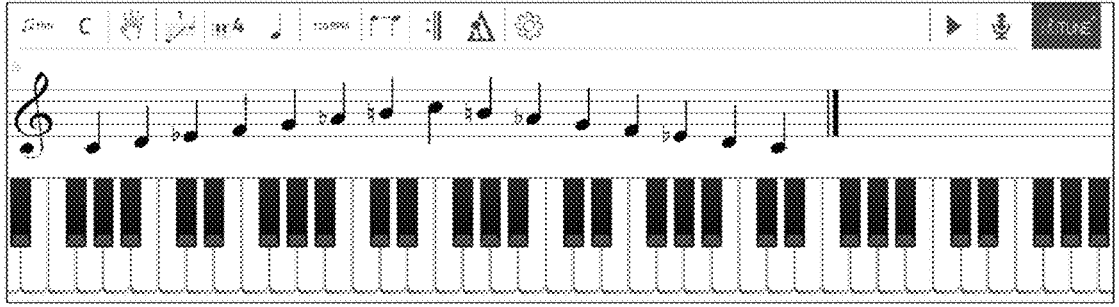

In an embodiment, in Lesson 3.2, after mastering the natural minor scale, the user is instructed to learn the harmonic minor scale. The user may be instructed that harmonic minor scales are formed with a pattern of whole and half steps, just like major and natural minor scales. In a harmonic minor scale, the pattern is whole, half, whole, whole, half, whole, and a half, half step. The user may be instructed to set up the application on an A4 harmonic minor scale, as shown in FIG. 7J.

The user may be instructed to listen to a C harmonic minor scale to become familiar with the sound. It sounds Egyptian or Middle Eastern. When the natural minor scale is compared to the harmonic minor scale, the only difference between the two is the seventh scale degree or the seventh note. Instead of lowering the seventh scale degree, the seventh scale degree is raised one half step from the original natural minor scale. The pattern of whole and half steps is whole, half, whole, whole, half, whole and a half, and half step. Returning to the C harmonic minor scale, the scale can be built with this pattern of whole and half steps or by referencing the natural minor scale and raising the seventh scale degree by a half step. The user may be instructed to select play input 350 or record input 370 to perform along with the application and build mastery in the harmonic minor scale.

The user may then be instructed to apply the learned concepts to the A harmonic minor scale. Using the application, the user may be instructed to listen to the scale on repeat at least two times to build recognition of the sound intervals. The user may then be instructed to put his or her listening skills to the test by matching the user's performance to the application's performance. The user may be reminded to observe his or her tempo, intonation, and/or rhythmic accuracy.

In an embodiment, once the A4 harmonic minor one-octave scale has been mastered by the user, the user is instructed to repeat the process for all harmonic minor one-octave scales. The user may be instructed to determine his or her progress and mastery through self-assessment or software assessment, until a minimum score (e.g., 70% or higher) has been achieved.

3.3.3. Lesson 3.3: Melodic Minor Scale

Figure 7K:
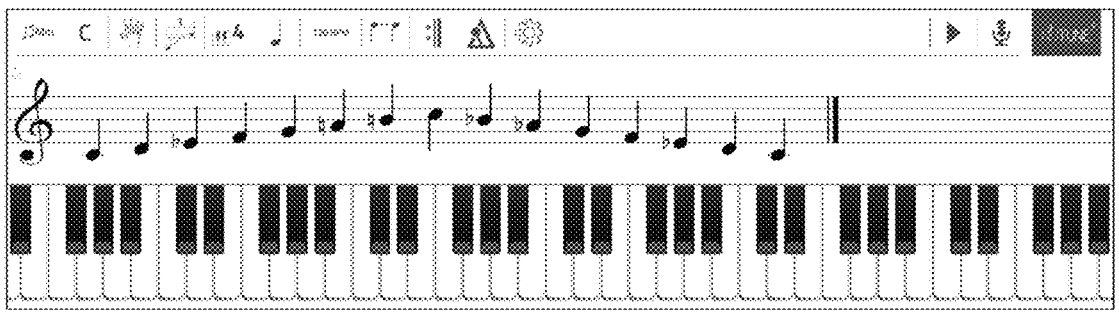

In an embodiment, in Lesson 3.2, after mastering the harmonic minor scale, the user is instructed on the melodic minor scale. The user may be instructed that melodic minor scales are formed with a pattern of whole and half steps, just like the major, natural, and harmonic minor scales. In a melodic minor scale, the pattern is whole, half, whole, whole, whole, whole, half, on the way up, and whole, whole, half, whole, whole, half, whole, on the way down. The user may be instructed to note how the pattern going up is different than the pattern going down for melodic minor scales. To begin, the user may be instructed to set up the application on a C4 melodic minor scale, as shown in FIG. 7K.

The melodic minor scale combines new concepts and old concepts learned for the natural minor scale. The user may be instructed to listen to the melodic minor scale on the application (e.g., via play input 350), as it ascends and descends, and prompted to notice similarities to other scales. The melodic minor scale can be thought of as a natural minor scale with a few changes. On the way up the scale, the third scale degree is lowered, but the sixth and seventh scale degrees are naturalized, meaning that they follow the original key of the scale. On the way down the scale, the melodic minor scale is the same as the natural minor scale. The user may be instructed to perform the melodic minor scale starting on C. The user can be encouraged to practice and select the next teaching module when ready.

After learning a general C melodic minor scale, the user may be instructed to perform G, D, and A melodic minor scales. The user may be prompted, when ready, to put his or her skills to the test by trying to match the application's performance of these scales. The user may be reminded to observe his or her tempo, intonation, and/or rhythmic accuracy while practicing.

In an embodiment, once the C4 melodic minor one-octave scale has been mastered by the user, the user is instructed to repeat the process for all melodic minor one-octave scales. The user may be instructed to determine his or her progress and mastery through self-assessment or software assessment, until a minimum score (e.g., 70% or higher) has been achieved.

3.4. Level 4: Intermediate

In an embodiment, Level 4 comprises learning the church modes. Specifically, Level 4 teaches intermediate users to master the components of playing the church modes.

3.4.1. Lesson 4.1: Dorian Church Mode

Figure 7L:
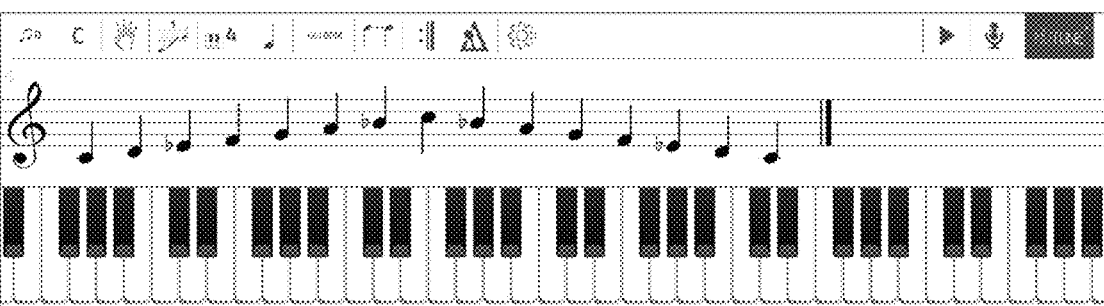

In an embodiment, in Lesson 4.1, the user is instructed to begin with Dorian mode. The Dorian mode starts on the second scale degree of the major scale. The pattern is whole, half, whole, whole, whole, half, whole. There are always half steps between the second and third scale degrees and the sixth and seventh scale degrees. The user may be instructed to set up the application to perform the D Dorian scale, which sounds similar to the natural minor scale, but with a raised sixth note. The user may be instructed to listen for sound patterns. After discussing the general concepts of a D Dorian scale, the user may be instructed to use note input 315 in graphical user interface 150 of the application to change the starting note of the Dorian scale and attempt to match the user's performance to the application's performance, for example, in the configuration shown in FIG. 7L.

3.4.2. Lesson 4.2: Phrygian Church Mode

Figure 7M:
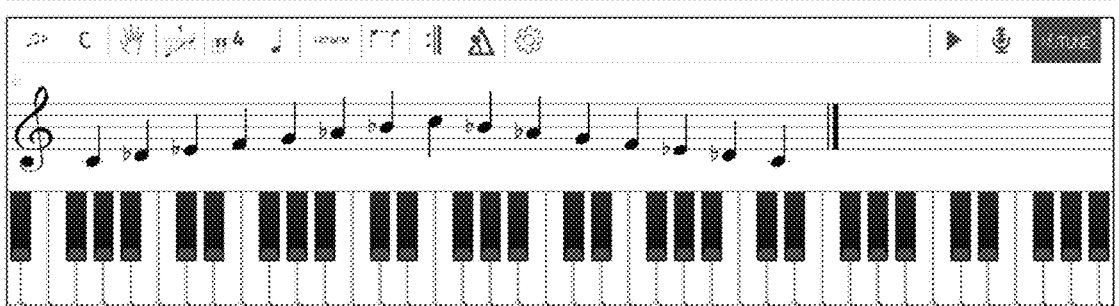

In an embodiment, in Lesson 4.2, the user is instructed to set up the application for the Phrygian mode. The Phrygian mode begins on the third scale degree of the major scale. There are half steps between the first and second scale degrees and the fifth and sixth scale degrees. The pattern is half, whole, whole, whole, half, whole, whole. The Phrygian scale can be thought of as a natural minor scale with the second degree lowered by a half step. The user may be instructed to use the application to set up the E Phrygian scale, as shown in FIG. 7M. The user may be instructed to determine his or her progress and mastery through self-assessment or software assessment, until a minimum score (e.g., 70% or higher) has been achieved.

3.4.3. Lesson 4.3: Lydian Church Mode

Figure 7N:
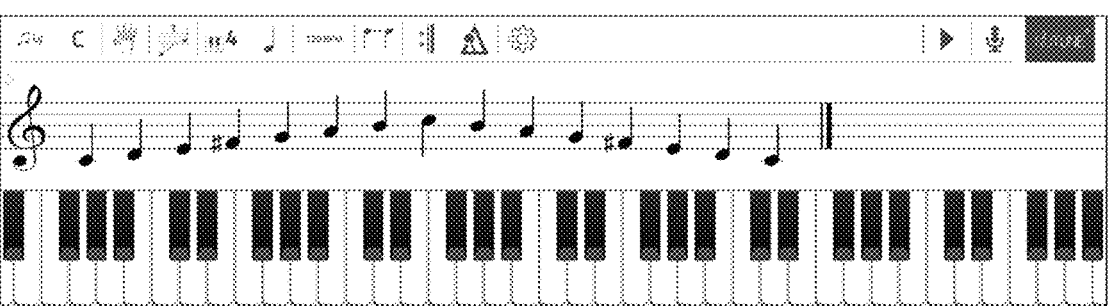

In an embodiment, in Lesson 4.3, after mastering the Dorian and Phrygian modes, the user is instructed on the Lydian mode. The Lydian mode begins on the fourth scale degree or F natural. The Lydian mode has naturally occurring half steps between the fourth and fifth scale degrees, as well as the seventh and eighth scale degrees. For clarity, the user may be instructed to set up the application to visualize the half-step markers and observe the pattern of whole and half steps. The pattern is whole, whole, whole, half, whole, whole, half. The user may be instructed to listen to the scale starting on F, as performed by the application. The user may be instructed to notice the patterns. The Lydian mode is a major scale with the fourth scale degree raised by a half step. The user may be instructed to listen to an F Lydian scale, performed by the application, and look for half steps and intervals that make the Lydian scale unique. The user may be instructed to set up an F Lydian scale configuration, as shown in FIG. 7N.

3.4.4. Lesson 4.4: Mixolydian Church Mode

In an embodiment, in Lesson 4.4, the user is instructed on the Mixolydian mode. The Mixolydian mode starts on the fifth scale degree of a major scale. There are naturally occurring half steps between the third and fourth scale degrees and the sixth and seventh scale degrees. The Mixolydian mode uses a pattern of whole, whole, half, whole, whole, half, whole. The user may be instructed to listen to the G Mixolydian scale, as performed by the application, and reminded to pay attention to the naturally occurring half steps and whole and half step patterns. The user may also be instructed to think of the Mixolydian scale as a major scale with a flatted seventh scale degree. Next, the user may be instructed to set up a G Mixolydian scale configuration, as shown in FIG. 7O. The user may be instructed to determine his or her progress and mastery through self-assessment or software assessment, until a minimum score (e.g., 70% or higher) has been achieved.

3.4.5. Lesson 4.5: Locrian Church Mode

In an embodiment, in Lesson 4.5, after mastering the Lydian and Mixolydian modes, the user is instructed on the Locrian mode. The Locrian mode begins on the seventh scale degree or B. The Locrian mode uses a pattern of half, whole, whole, half, whole, whole, whole. The Locrian mode also has half-step intervals between the first and second scale degrees and the fourth and fifth scale degrees. The user may be instructed to listen to the B Locrian scale, as performed by the application, and listen for the whole and half-step patterns. The user may also be reminded to think of the Locrian mode as ending on the same leading tone of a major scale. The user may be instructed to set up a B Locrian scale configuration, as shown in FIG. 7P. The user may be instructed to determine his or her progress and mastery through self-assessment or software assessment, until a minimum score (e.g., 70% or higher) has been achieved.

3.5. Level 5: Accomplished

In an embodiment, Level 5 instructs expert users to master changing rhythms and memorization techniques to maintain accuracy of intonation.

3.5.1. Lesson 5.1: Rhythms with All Scales

In an embodiment, in Lesson 5.1, after mastering tempo in major, minor, and church mode scales, the user is instructed on four different rhythms: quarter notes, eighth notes, eighth-sixteenth notes, and sixteenth-eighth notes. Through performances by the application, the user can be shown how changing between these four rhythms influences pattern and speed.

The user may be instructed to set up the application for eighth notes, followed by eighth-sixteenth notes, followed by sixteenth-eighth notes, to build mastery of rhythms. The user may then be instructed to switch between the fourth rhythms, which can be a crucial element in scale mastery, since it tricks the brain into a different way of thinking of the scale. The user may be instructed how to set up the four rhythm configurations with the nine scale types in the application, for a total of thirty-six training scenarios. One example of a training scenario is illustrated in FIG. 7Q. The user may be instructed to determine his or her progress and mastery through self-assessment or software assessment, until a minimum score (e.g., 70% or higher) has been achieved.

3.5.2. Lesson 5.2: Memorize without Staff

In an embodiment, in Lesson 5.2, after mastering rhythm, the user is instructed to memorize the scales. When scales are memorized, the user is able to quickly recall patterns for new music that is being learned. The user may be instructed to access the settings frame (e.g., via settings input 355, and illustrated in an embodiment in FIG. 4L) to toggle the staff view off. In response to the user toggling the staff view off, the application removes or hides staff canvas 174. Keyboard canvas 176 may remain visible in graphical user interface 150, so that the user can still see the keys being performed, but does not see the notes on the staff, as illustrated in FIG. 7R. This enables the user to perform the scales without seeing the notes on the staff. The user may be instructed to determine his or her progress and mastery through self-assessment or software assessment, until a minimum score (e.g., 70% or higher) has been achieved.

3.5.3. Lesson 5.3: Memorize without Staff and Keyboard

In an embodiment, in Lesson 5.3, after memorizing the scales without the staff, the user is instructed to develop skills for memorizing scales using neither the staff nor the keyboard. Thus, the user may be instructed to access the settings frame (e.g., via settings input 355, and illustrated in an embodiment in FIG. 4L) to toggle the keyboard view off, in addition to the staff view being off. In response to the user toggling the keyboard view off, the application removes or hides keyboard canvas 176. Thus, neither staff canvas 174 nor keyboard canvas 176 is visible in graphical user interface 150, as illustrated in FIG. 7S. Only tool bar 300 is visible. The user is left to perform the scales based only on his or her memory and/or the sound performed by the application. The user may be instructed to determine his or her progress and mastery through self-assessment or software assessment, until a minimum score (e.g., 70% or higher) has been achieved.

4. Process Overview

Embodiments of processes for the disclosed technological interface will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated herein in a particular order.

It should be understood that the various processes described herein implement various functions of the graphical user interface 150. Thus, these processes may be executed in any order and in any combination, depending upon a user's particular choices of inputs during any given session, thereby providing an infinite potential of customized sessions. For example, using the various processes, underlying the functions of graphical user interface 150, described herein, a user can custom build over 100,000 different configurations of the available music scales, and utilize different configurations in any sequence and at any time to target the user's particular learning needs or desires (e.g., by following the application's training methodology, following another training methodology, or not following any training methodology at all).

4.1. GUI Rendering

Figure 8:
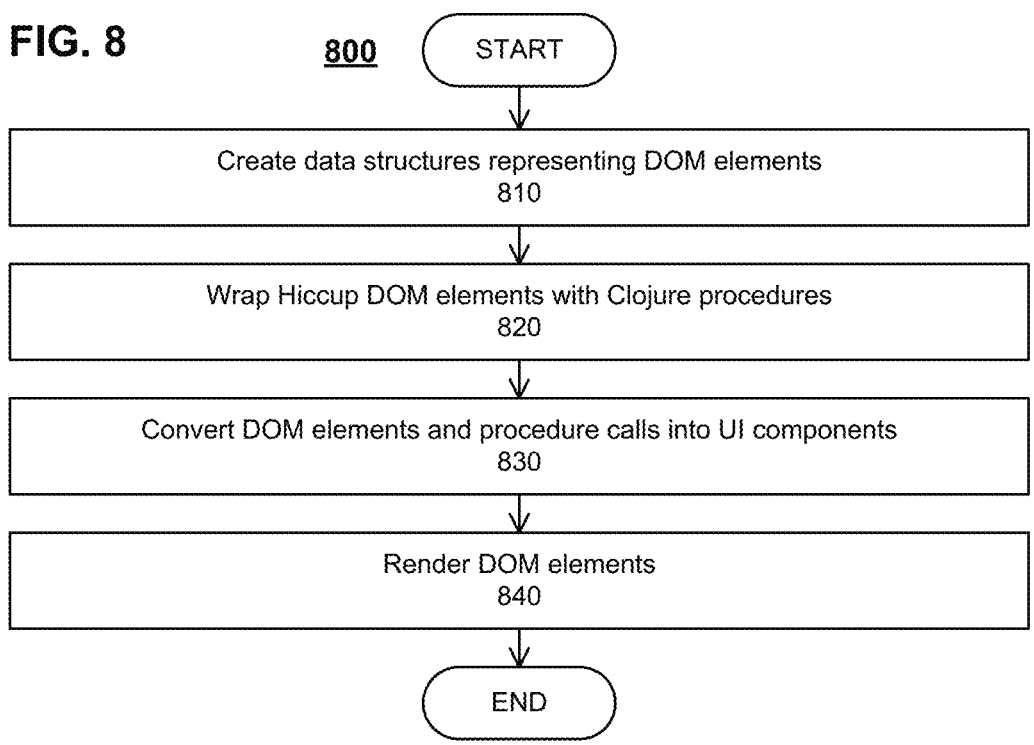
FIG. 8 illustrates an example process for rendering a graphical user interface by a client application, according to an embodiment.

FIG. 8 illustrates an example process 800 for rendering graphical user interface 150 by client application 132, according to an embodiment. In step 810, data structures representing the Document Object Model (DOM) elements are created. In an embodiment, these data structures comprise persistent vectors and/or maps in the Clojure™ programming language, and are created using the Hiccup approach. The Hiccup approach represents elements as a nested Clojure™ vector. In step 820, the DOM elements, created in step 810, are wrapped in procedures. In an embodiment, Hiccup DOM elements are wrapped in Clojure™ procedures. In step 830, the DOM elements and procedure calls are converted into user interface components. In an embodiment, the DOM elements and procedure calls are converted into components that are compatible with the JavaScript React™ library. In step 840, the user-interface components are rendered by client application 132. In an embodiment, the Reach-compatible components, created in step 830, are rendered into the React.js virtual DOM.

4.2. Buttons

Figure 9:
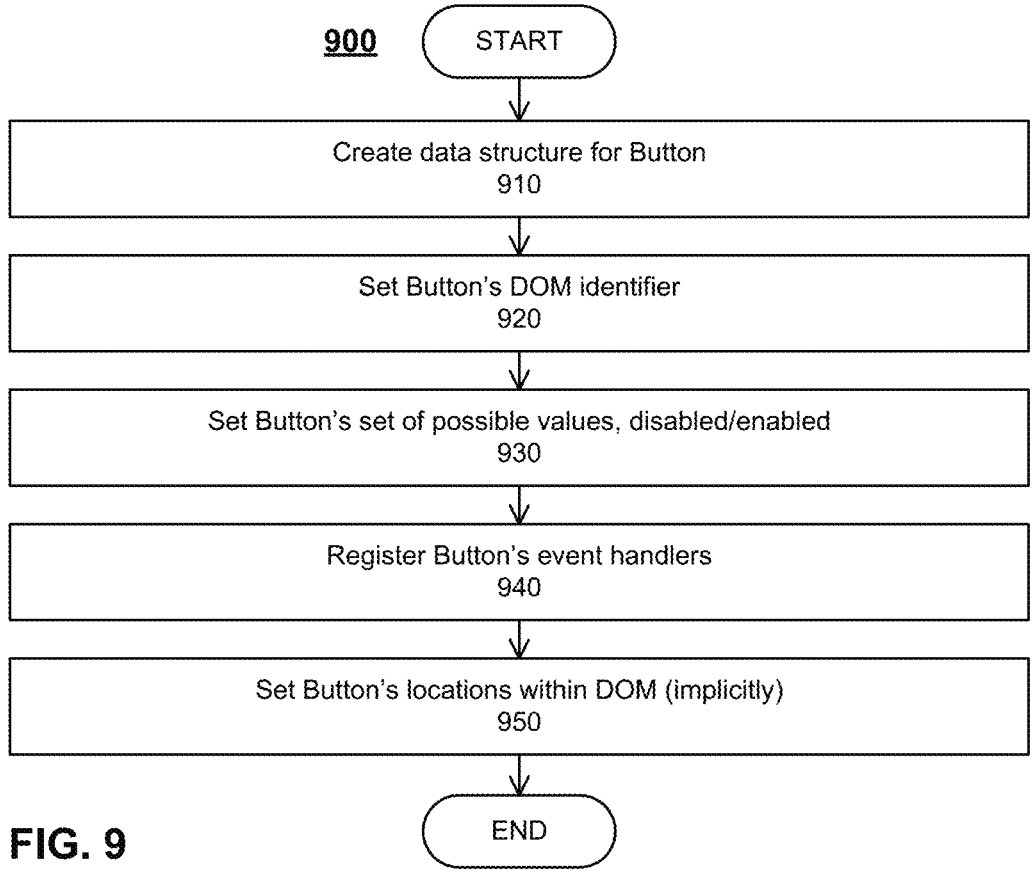
FIG. 9 illustrates an example process for creating buttons, according to an embodiment.

FIG. 9 illustrates an example process 900 for creating buttons, according to an embodiment. Process 900 may be used to create buttons 170 for graphical user interface 150. In step 910, the data structure for the button is created. In an embodiment, the data structure is a Reagent™ atom. Reagent™ is a ClojureScript™ wrapper around React™, and Reagent™ atoms are similar to the atom reference type in Clojure™. In steps 920, 930, and 940, the DOM identifier for the button is set, the possible values for the button are set, and the event handlers for the button are set, respectively. Finally, in step 950, the location of the button within the DOM is set implicitly.

FIG. 10 illustrates an example process 1000 for the selection of a button that produces a drop-down, according to an embodiment. Process 1000 may be used to display drop-down menus 172. In step 1010, a selection of the button is received via a user's interaction (e.g., click or touch) within graphical user interface 150. In step 1020, all unselected buttons are turned off. For example, the Reagent™ atoms for the unselected buttons may be set to off, to thereby close any drop-down menus associated with those buttons. In step 1030, the selected button is turned on. For example, the Reagent™ atom for the selected button may be set to on. Thus, in step 1040, the data structure (e.g., persistent vector and/or map in Clojure™), representing the drop-down menu in the DOM, is created, and, in step 1050, the drop-down menu is rendered (e.g., via the React.js virtual DOM).

4.3. Canvas Rendering

FIG. 11 illustrates an example process 1100 for rendering staff canvas 174, according to an embodiment. In step 1105, the coordinates and scale of staff canvas 174 are calculated. For example, the coordinates and scale of staff canvas 174 may depend on the vertical settings (e.g., height) for staff canvas 174 specified by the user (e.g., via the settings frame). In step 1110, staff canvas 174 is initialized or cleared. In step 1115, the staff lines are drawn. In step 1120, the note ledgers are drawn. In step 1125, the note ellipses are drawn. In step 1130, the note dots and accidentals are drawn. In step 1135, the note sticks are drawn. In step 1140, the fingering images are drawn for each note. In step 1145, the staff ending lines are drawn. In step 1150, the clef is drawn. It should be understood that the elements of staff canvas 174 do not have to be drawn in the particular order that has been illustrated. Rather, these elements may be drawn in any order, including in parallel.

Figure 12:
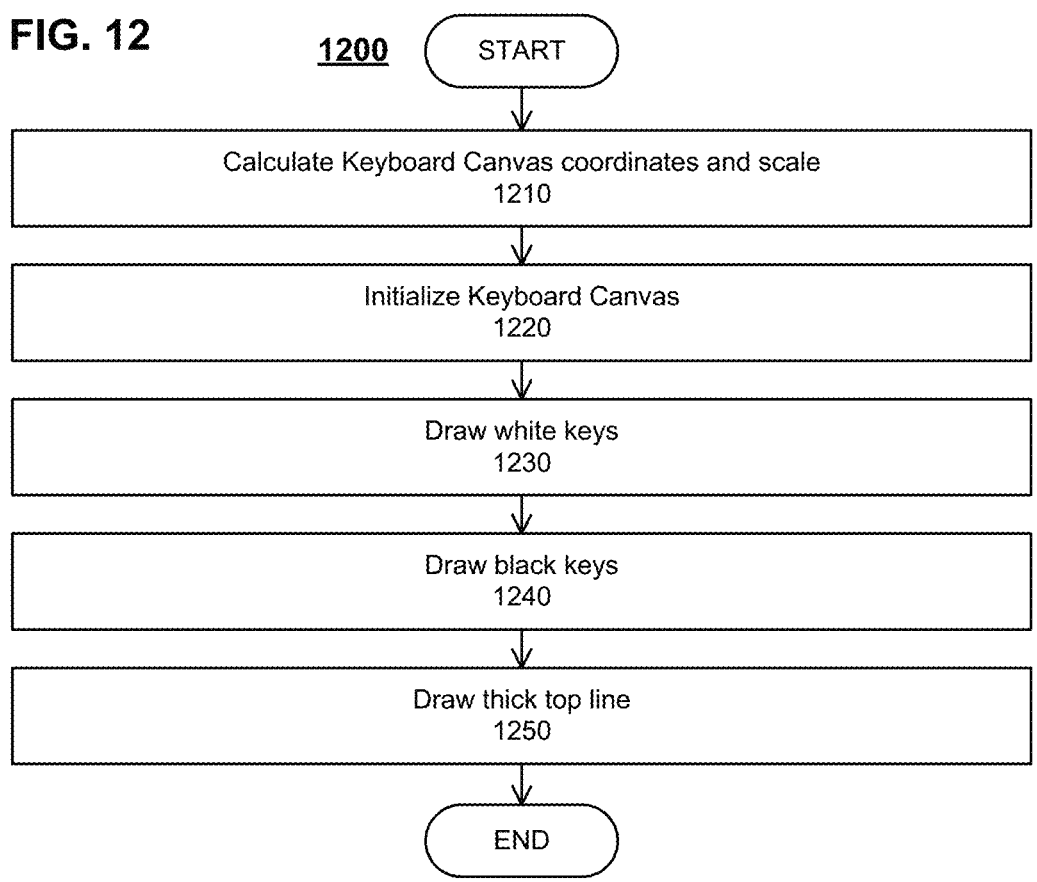
FIG. 12 illustrates an example process for rendering a keyboard canvas, according to an embodiment.

FIG. 12 illustrates an example process 1200 for rendering keyboard canvas 176, according to an embodiment. In step 1210, the coordinates and scale of keyboard canvas 176 are calculated. For example, the coordinates and scale of keyboard canvas 176 may depend on the vertical settings (e.g., height) for keyboard canvas 176 specified by the user (e.g., via the settings frame). In step 1220, keyboard canvas 176 is initialized or cleared. In step 1230, the white keys are drawn. In step 1240, the black keys are drawn. In step 1250, the thick top line is drawn. It should be understood that the elements of keyboard canvas 176 do not have to be drawn in the particular order that has been illustrated. Rather, these elements may be drawn in any order, including in parallel.

In an embodiment, the rendering of fingering representations within fingering canvas 178 may be interweaved in the rendering of the notes in staff canvas 174 (e.g., according to process 1100 in FIG. 11). For example, in between the drawing of adjacent notes on staff canvas 174, the fingering representation for the preceding or subsequent note, among the adjacent notes, may be drawn on fingering canvas 178.

4.4. GUI Generation

Figure 13:
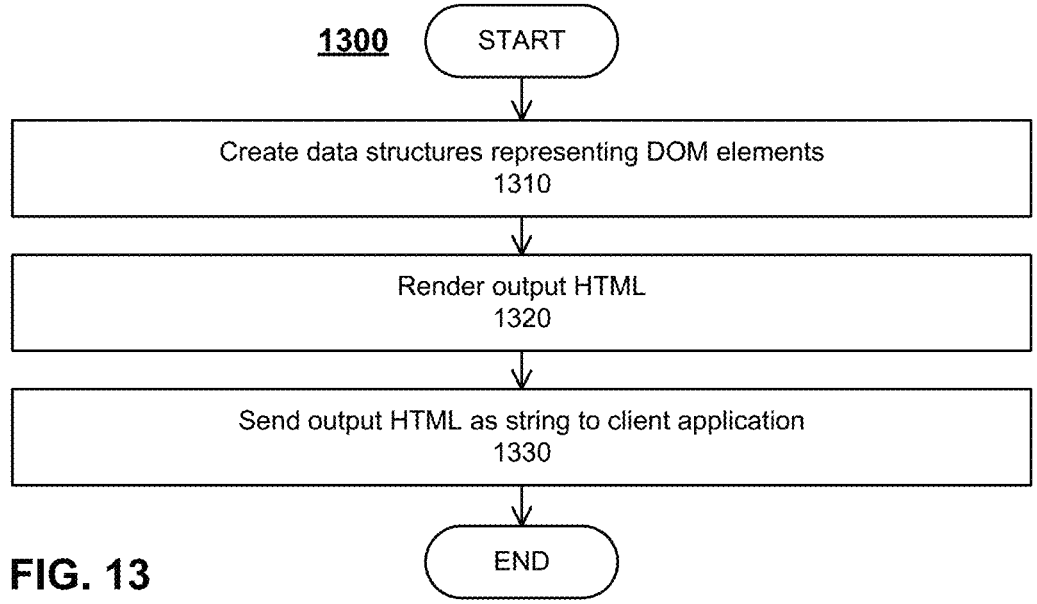
FIG. 13 illustrates an example process for creating a graphical user interface by a server application, according to an embodiment.

FIG. 13 illustrates an example process 1300 for creating graphical user interface 150 by server application 112, according to an embodiment. In step 1310, data structures representing the Document Object Model (DOM) elements are created. In an embodiment, these data structures comprise persistent vectors and/or maps in the Clojure™ programming language, and are created using the Hiccup approach. In step 1320, the HTML to be output is rendered (e.g., using Hiccup). In step 1330, the output HTML is sent as a string to client application 132. For example, the HTML output may be sent using the Ring™ and Compojure™ libraries of Clojure™.

4.5. JavaScript Elements

FIG. 14 illustrates an example process 1400 for adding JavaScript elements 152 to graphical user interface 150 by server application 112, according to an embodiment. In step 1410, the external JavaScript resource is read (e.g., as a delayed string). In step 1420, the JavaScript resource is embedded into the HTML to be output during HTML generation (e.g., process 1300). For example, the JavaScript may be embedded between the "<script> . . . </script>" tags within the output HTML. In step 1430, the output HTML is sent to client application 132 (e.g., using the Ring™ and Compojure™ libraries of Clojure™). It should be understood that step 1430 may be the same as step 1330 in process 1300.

4.6. CSS Generation

FIG. 15 illustrates an example process 1500 for creating CSS files 154 for graphical user interface 150 by server application 112, according to an embodiment. In step 1510, the CSS for selector and screen modes are defined using one or more theme keywords. Then, each time server application 112 is started or restarted, CSS files 154 are generated. Specifically, if server application 112 is started or restarted (i.e., "Yes" in step 1520), the theme keyword(s) are converted into corresponding theme values in step 1530, the screen modes are converted into CSS media query clauses in step 1540, and CSS files 154 are generated for all themes (e.g., using the Clojure Garden™ CSS Engine) in step 1550.

4.7. Theme Selection

Figure 16:
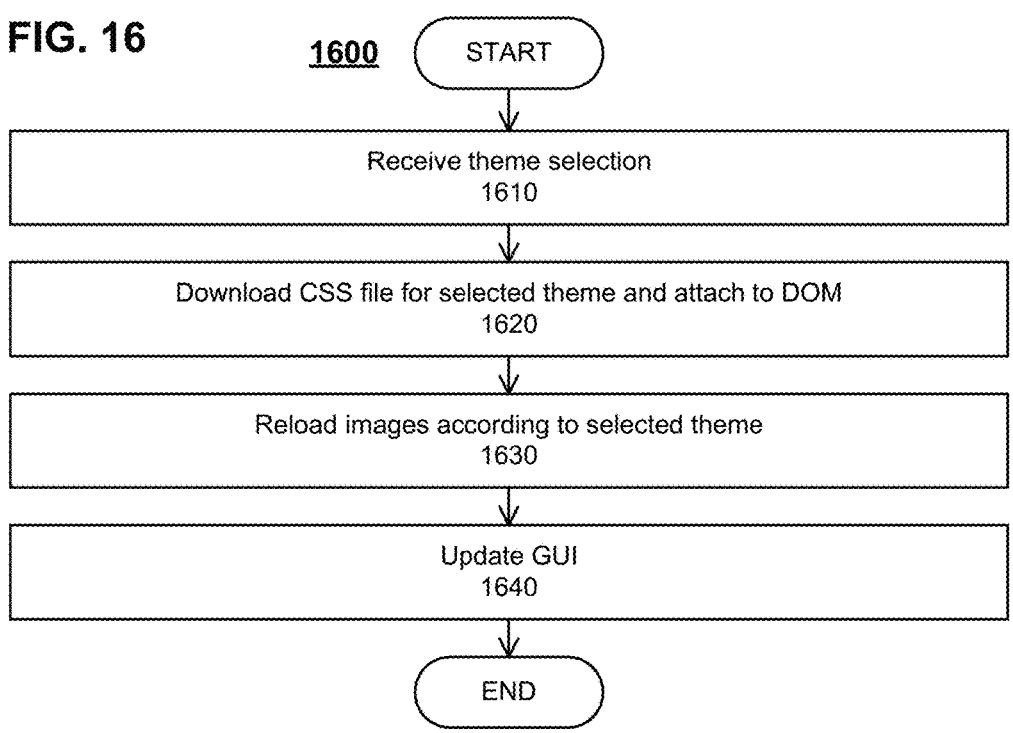
FIG. 16 illustrates an example process for changing a theme for a graphical user interface by a client application, according to an embodiment.

FIG. 16 illustrates an example process 1600 for changing a theme 156 for graphical user interface 150 by client application 132, according to an embodiment. In step 1610, a theme 156 is selected. For example, the user may select a new theme 156 (e.g., via the settings frame). In step 1620, the CSS file for the theme 156, selected in step 1610, is downloaded and attached to the DOM. In step 1630, images in graphical user interface 150 are reloaded according to the selected theme 156. Then, in step 1640, graphical user interface 150 is updated. For example, the HTML5 canvas, including staff canvas 174 and keyboard canvas 176, is repainted.

4.8. Database Queries

Figure 17:
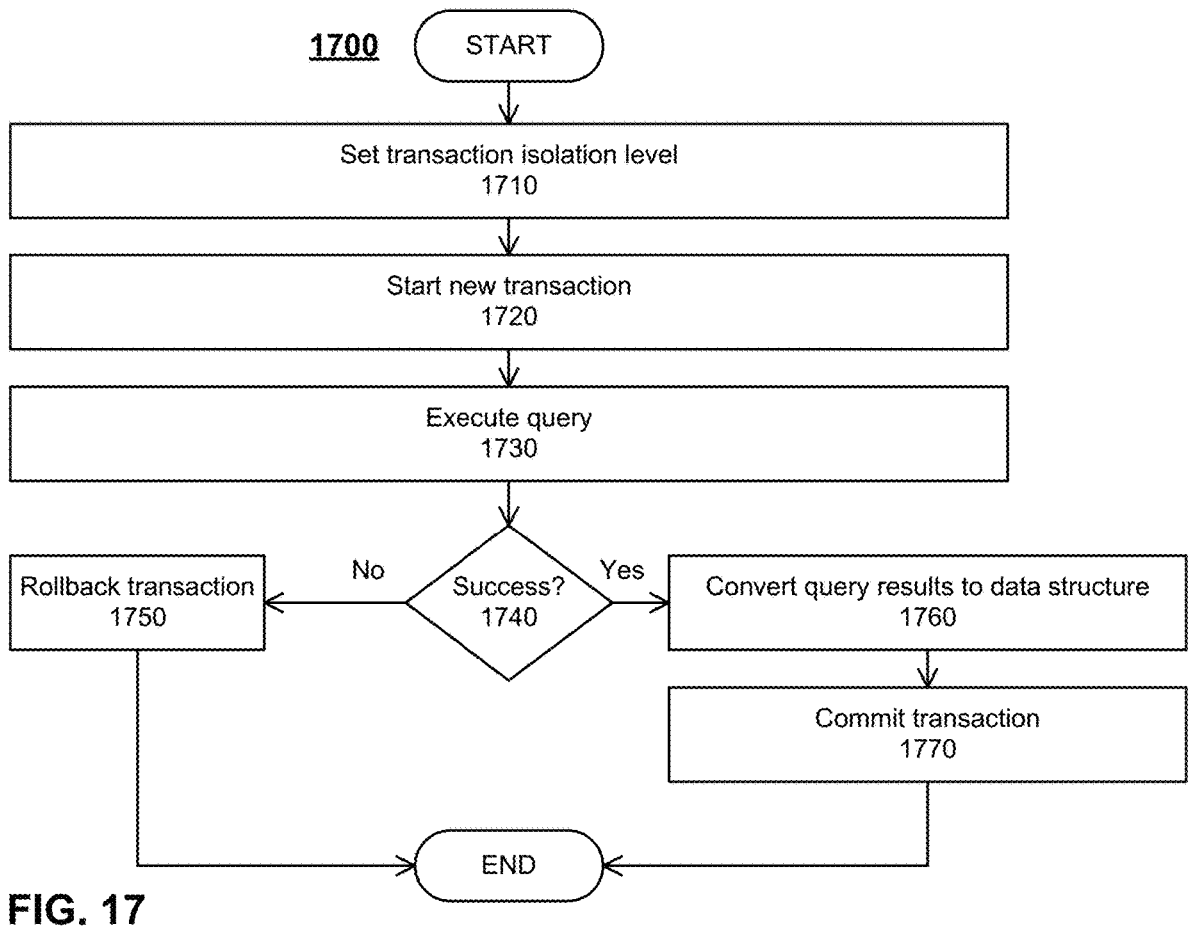
FIG. 17 illustrates an example process for executing database queries by a server application, according to an embodiment.

FIG. 17 illustrates an example process 1700 for executing database queries 160 by server application 112, according to an embodiment. In step 1710, the isolation level (e.g., serializable or read-committed) is set for the transaction. In step 1720, a new transaction is started. In step 1730, the transaction query (e.g., SQL query) is executed. If the query is not successfully executed (i.e., "No" in step 1740), the transaction is rolled back in step 1750. On the other hand, if the query is successfully executed (i.e., "Yes" in step 1740), the query results are converted to a data structure (e.g., Clojure™ vector or map) in step 1760, and the transaction is committed in step 1770.

4.9. HTTP End Points

Figure 18:
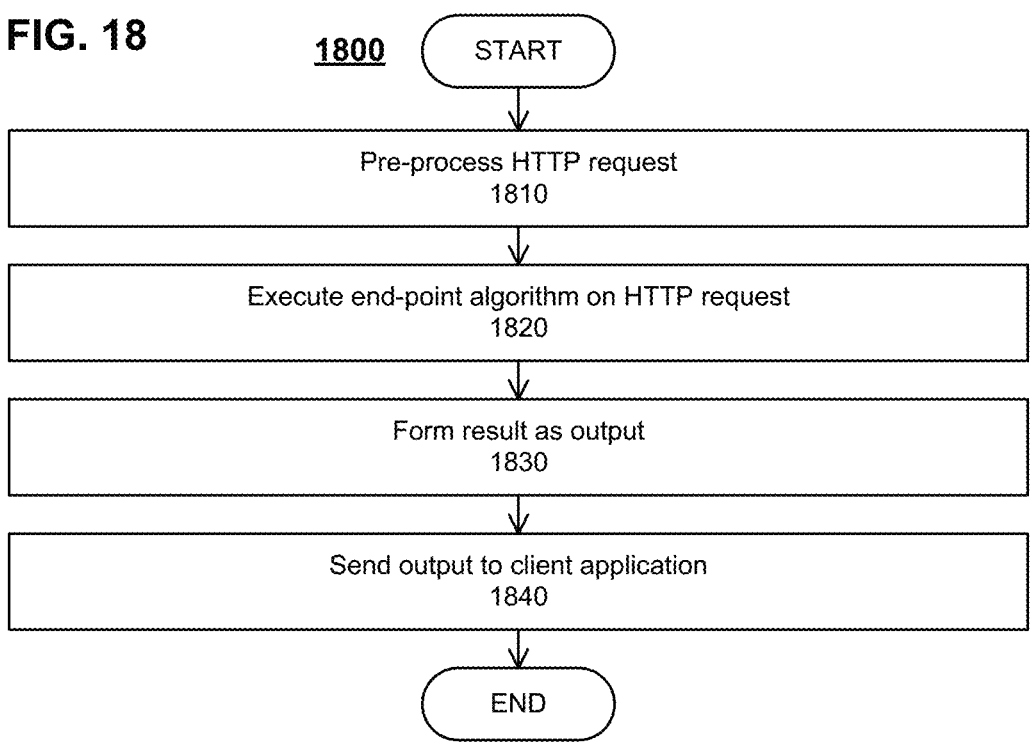
FIG. 18 illustrates an example process for handling HTTP requests by a server application, according to an embodiment.

FIG. 18 illustrates an example process 1800 for handling HTTP requests by server application 112, according to an embodiment. In step 1810, the HTTP request is pre-processed (e.g., as a Clojure™ persistent map). In step 1820, the end-point algorithm is executed on the HTTP request, pre-processed in step 1810. In step 1830, the result of the end-point algorithm is formed as a data structure for output (e.g., a JSON output using the Cheshire™ library). In step 1840, the output (e.g., JSON output) is sent to client application 132 (e.g., using the Ring™ and Compojure™ libraries with an output type of "app/json").

4.10. Routing

Figure 19:
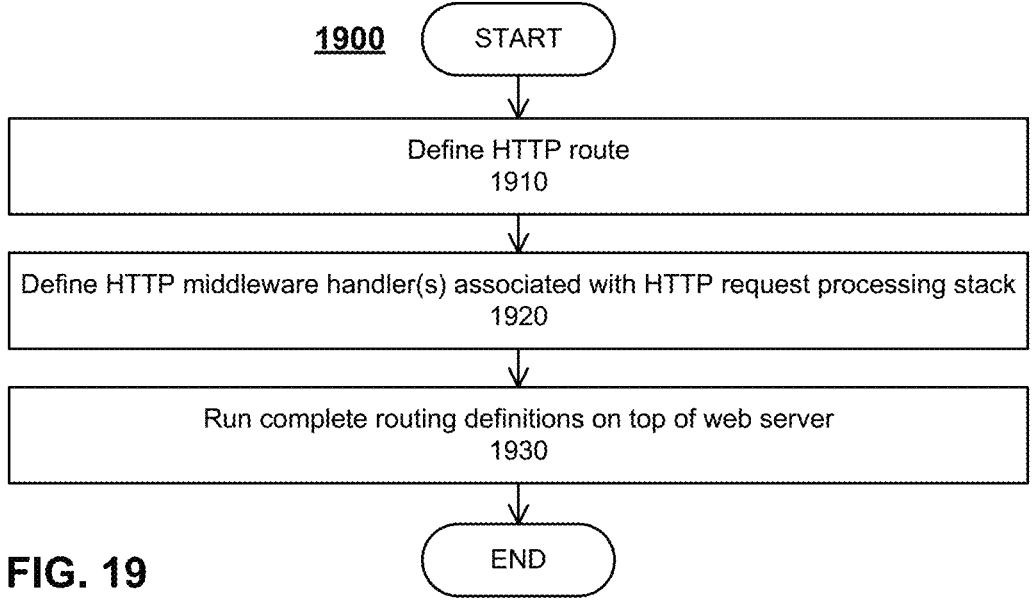
FIG. 19 illustrates an example process for routing HTTP requests by a server application, according to an embodiment

FIG. 19 illustrates a process 1900 for routing HTTP requests by server application 112, according to an embodiment. In step 1910, the HTTP route is defined (e.g., using the Ring™ and Compojure™ libraries). In step 1920, one or more middleware handlers, associated with the whole HTTP request processing stack, are defined. In step 1930, the complete routing definitions are run on top of the web server (e.g., the Jetty™ Java web server).

4.11. General Parameter Selection

Figure 20:
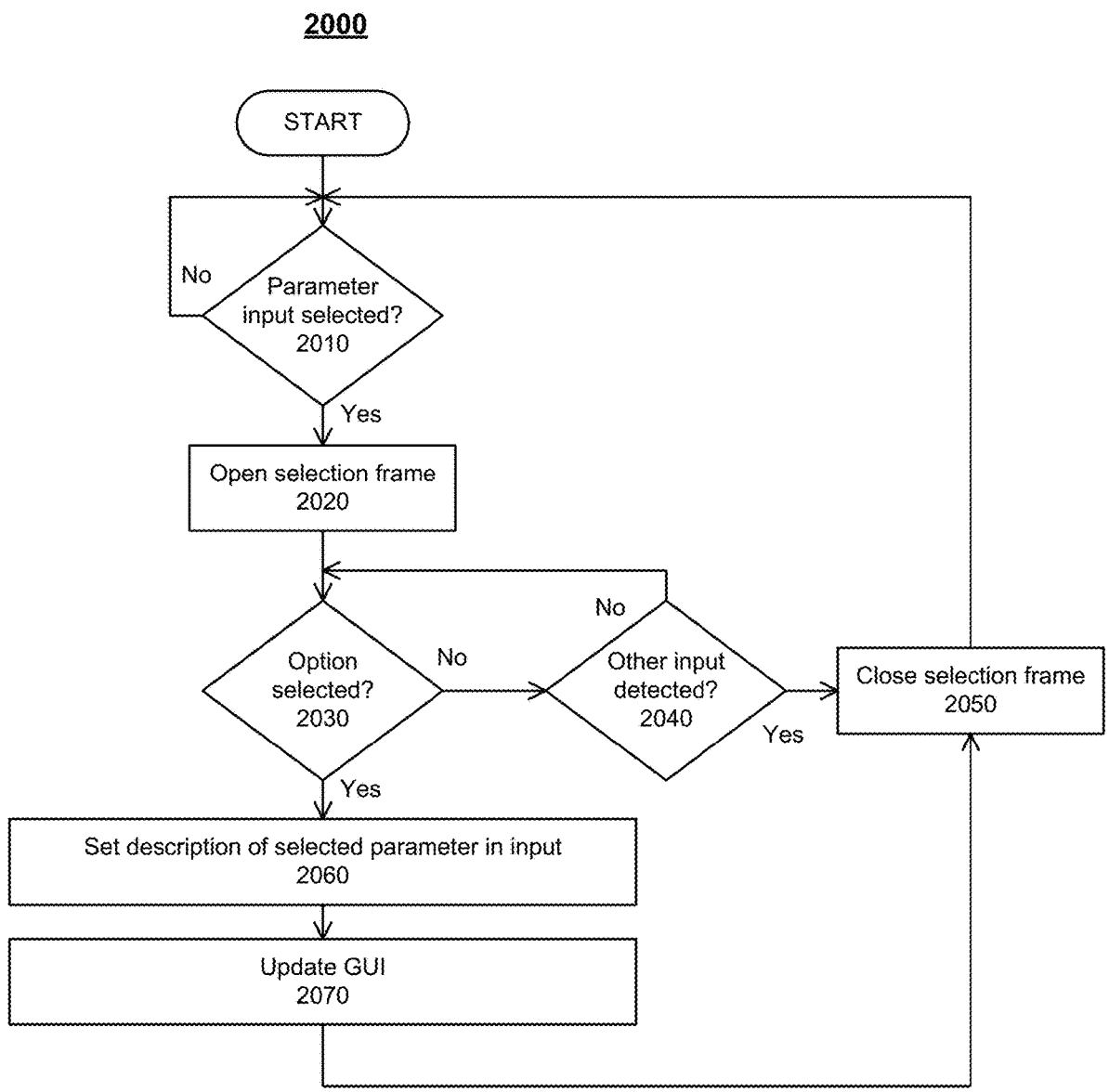
FIG. 20 illustrates an example process for selecting parameters to configure a music scale within a graphical user interface, according to an embodiment.

FIG. 20 illustrates an example process 2000 for selecting parameters to configure a music scale within graphical user interface 150, according to an embodiment.

In step 2010, the application determines when the user has selected an input for a parameter. As discussed elsewhere herein, the parameter may comprise the music scale to be learned, a number of octaves, a starting note, a starting octave, a rhythm, a tempo, whether or not to repeat the top note of the selected music scale, whether or not to play a metronome, whether or not to repeat the scale, any other parameter discussed herein, and/or the like. The user may select the input for the parameter by touching or clicking a position within graphical user interface 150 that corresponds to the input. If no selection is detected (i.e., "No" in step 2010), the application continues to wait for a selection. Otherwise, if a selection is detected (i.e., "Yes" in step 2010), process 2000 proceeds to step 2020 for the selected parameter.

In step 2020, the application opens a selection frame for the parameter, selected in step 2010, in graphical user interface 150. Step 2020 may comprise process 1000, illustrated in and described with respect to FIG. 10. As discussed elsewhere herein, the selection frame may be a drop-down menu with a list of available options for the selected parameter. Each available option in the list may comprise a selectable representation of that option. However, it should be understood that other mechanisms for selecting an option from a plurality of available options may be used.

In step 2030, the application determines when one of the available options has been selected from the selection frame. The user may select one of the available options by touching or clicking a position within the selection frame (e.g., drop-down menu), opened in step 2020, that corresponds to the option. If no selection is detected (i.e., "No" in step 2030), process 2000 proceeds to step 2040. Otherwise, if a selection is detected (i.e., "Yes" in step 2030), process 2000 proceeds to step 2060 for the selected option.

In step 2040, the application determines when another input is detected. For example, the user may change his or her mind about changing the parameter, selected in step 2010, and navigate away from the selection frame by touching or clicking on a position outside of the selection frame in graphical user interface 150. If such an input is detected (i.e., "Yes" in step 2040), the application closes the selection frame in step 2050. Otherwise, if no such an input is detected (i.e., "No" in step 2040), the application continues to wait for the selection of an available option.

In step 2060, the application sets the description, representing the option selected in step 2030, for the parameter selected in step 2010, within the data structure (e.g., Reagent™ atom) representing the input (e.g., button) for the parameter selected in step 2010. Then, in step 2070, the application updates graphical user interface 150 (e.g., by repainting the HTML5 canvas) to reflect the set description. Step 2070 may comprise updating staff canvas 174, keyboard canvas 176, and/or fingering canvas 178.

4.12. Fingering Management

Figure 21:
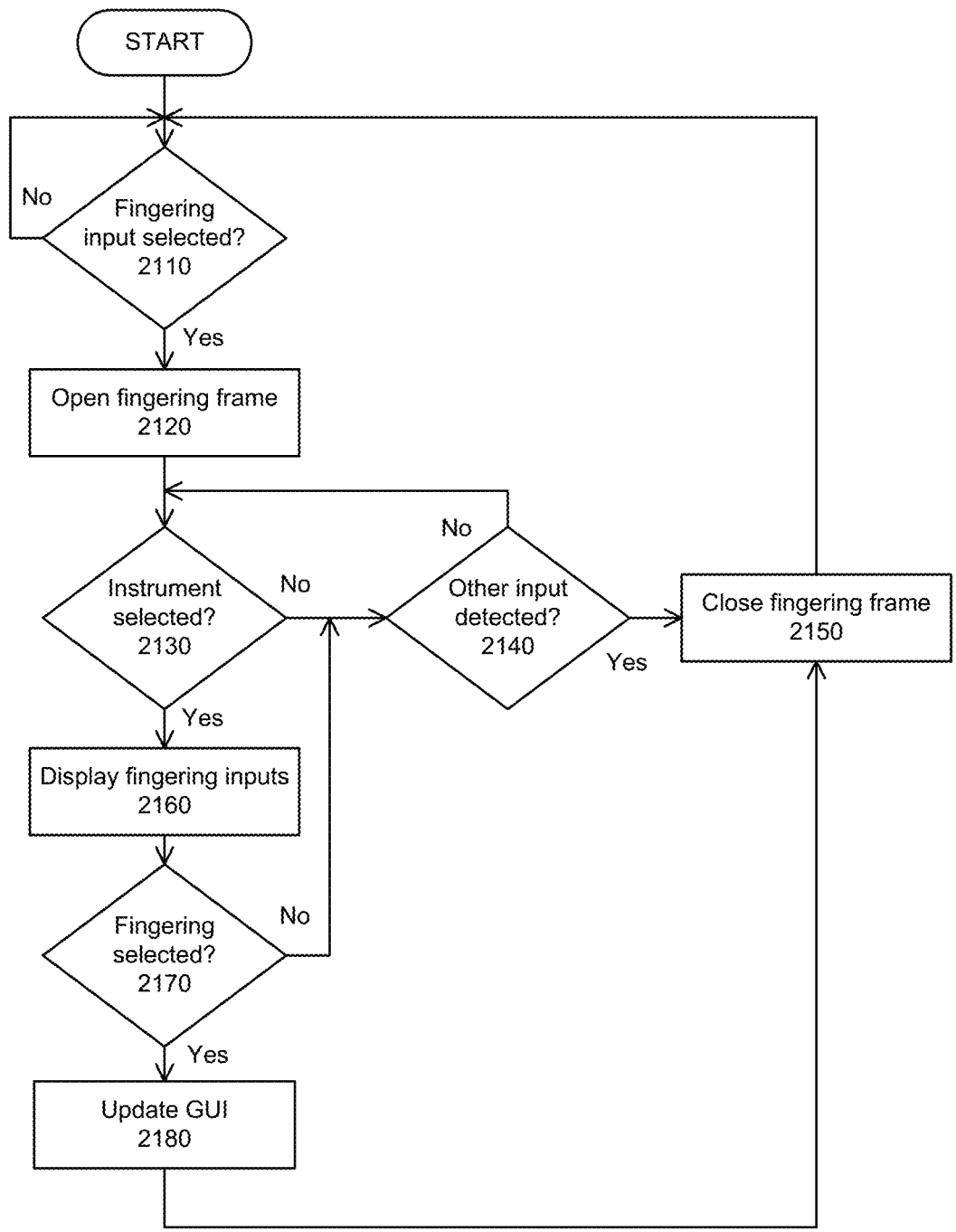
FIG. 21 illustrates an example process for selecting fingerings within a graphical user interface, according to an embodiment.

FIG. 21 illustrates an example process 2100 for selecting fingerings within graphical user interface 150, according to an embodiment. Process 2100 is simply a fingering-specific embodiment of process 2000 for general parameter selection.

In step 2110, the application determines when the user has selected fingering-setting input 360. The user may select fingering-setting input 360 by touching or clicking a position within graphical user interface 150 that corresponds to fingering-setting input 360. If no selection is detected (i.e., "No" in step 2110), the application continues to wait for a selection. Otherwise, if a selection is detected (i.e., "Yes" in step 2110), the application opens a fingering frame (e.g., fingering frame 365) in step 2120 (e.g., according to process 1000 in FIG. 10). The fingering frame may comprise a drop-down menu of available instruments.

In step 2130, the application determines when the user has selected an instrument from the fingering frame. The user may select one of the available instruments by touching or clicking a position within the fingering frame (e.g., drop-down menu), opened in step 2120, that corresponds to the instrument. If no selection is detected (i.e., "No" in step 2130), process 2100 proceeds to step 2140. Otherwise, if a selection is detected (i.e., "Yes" in step 2130), process 2100 proceeds to step 2160 for the selected instrument.

In step 2140, the application determines when another input is detected. For example, the user may change his or her mind about changing the fingerings, and navigate away from the fingering frame by touching or clicking on a position outside of the fingering frame in graphical user interface 150. If such an input is detected (i.e., "Yes" in step 2140), the application closes the selection frame in step 2150. Otherwise, if no such an input is detected (i.e., "No" in step 2140), the application continues to wait for the selection of an available instrument.

In step 2160, the application displays an input in the fingering frame for each fingering option that is available for the instrument selected in step 2130. Fingering options may include the default fingering option for the selected instrument, as well as any alternative fingering options, if any, including customized fingering options (e.g., that the user previously created and saved), for the selected instrument.

In step 2170, the application determines when the user selects one of the available fingering options displayed in step 2160. If no selection is detected (i.e., "No" in step 2170), the application continues to wait for a selection or another input. Otherwise, if a selection is detected (i.e., "Yes" in step 2170), the application updates graphical user interface 150 (e.g., by repainting the HTML5 canvas) to reflect the selected fingering option in step 2180. Step 2180 may comprise updating fingering canvas 178.

Figure 22:
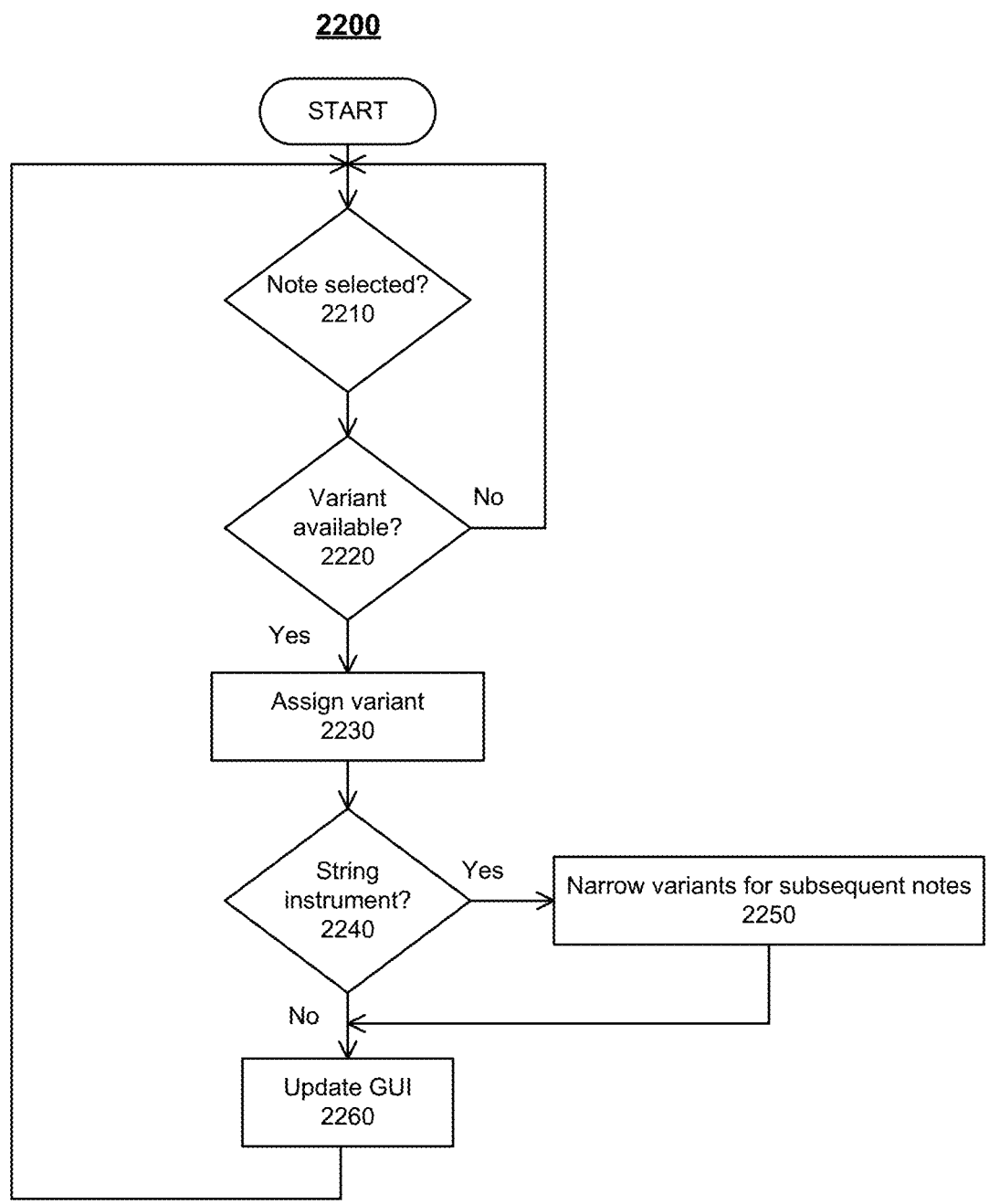
FIG. 22 illustrates an example process for changing fingerings within a graphical user interface, according to an embodiment.

FIG. 22 illustrates an example process 2200 for changing fingerings within graphical user interface 150, according to an embodiment.

In step 2210, the application determines when a note is selected. For example, step 2210 may comprise a user selecting a note on staff canvas 174 or a fingering representation within fingering canvas 178. If no selection is detected (i.e., "No" in step 2210), the application continues to wait for a selection. Otherwise, if a selection is detected (i.e., "Yes" in step 2210), process 2200 proceeds to step 2220.

In step 2220, the application determines whether or not any fingering variants are available for the selected note. The available fingering variants for a particular note may be limited by rules or attributes of the note, such as the note's pitch class, octave placement, whether the note is being played by the right hand or left hand (e.g., if the selected instrument is a piano), whether the note is in an ascending or descending portion of its music scale, and/or the like. If no fingering variants are available (i.e., "No" in step 2220), the application continues to wait for a selection (e.g., of a note with fingering variants). Otherwise, if fingering variants are available for the selected note (i.e., "Yes" in step 2220), process 2200 proceeds to step 2230.

In step 2230, a fingering variant is assigned to the selected note. For example, the application may retrieve the set of fingering variants available for the selected instrument (e.g., from local database 134 and/or remote database 114), and cycle through the available fingering variants for the selected note, such that a new fingering variant is shown each time the user selects the note. Thus, the user may cycle to the desired fingering variant by continually selecting the note in step 2210.

In step 2240, the application determines whether or not the selected instrument is a string instrument (e.g., violin, viola, cello, double bass, guitar, etc.). If the selected instrument is not a string instrument (i.e., "No" in step 2240), the application updates graphical user interface 150 (e.g., by repainting the HTML5 canvas) to reflect the selected fingering variant in step 2260. Step 2260 may comprise updating fingering canvas 178. On the other hand, if the selected instrument is a string instrument (i.e., "Yes" in step 2240), process 2200 proceeds to step 2250.

In step 2250, the application narrows or constrains the fingering variants that are available for the notes following the selected note (i.e., selected in step 2210) within the selected music scale. The application may constrain the fingering variants according to one or more rules. For example, a first rule may be that, if the selected note is located in an ascending portion of the music scale, every note located after the selected note within the music scale must only have fingering variants whose positions are no smaller than the positions of all preceding notes. A second rule may be that, if the selected note is located in a descending portion of the music scale, every note located after the selected note within the music scale must only have fingering variants whose positions are no greater than the positions of all preceding notes.

Figure 23:
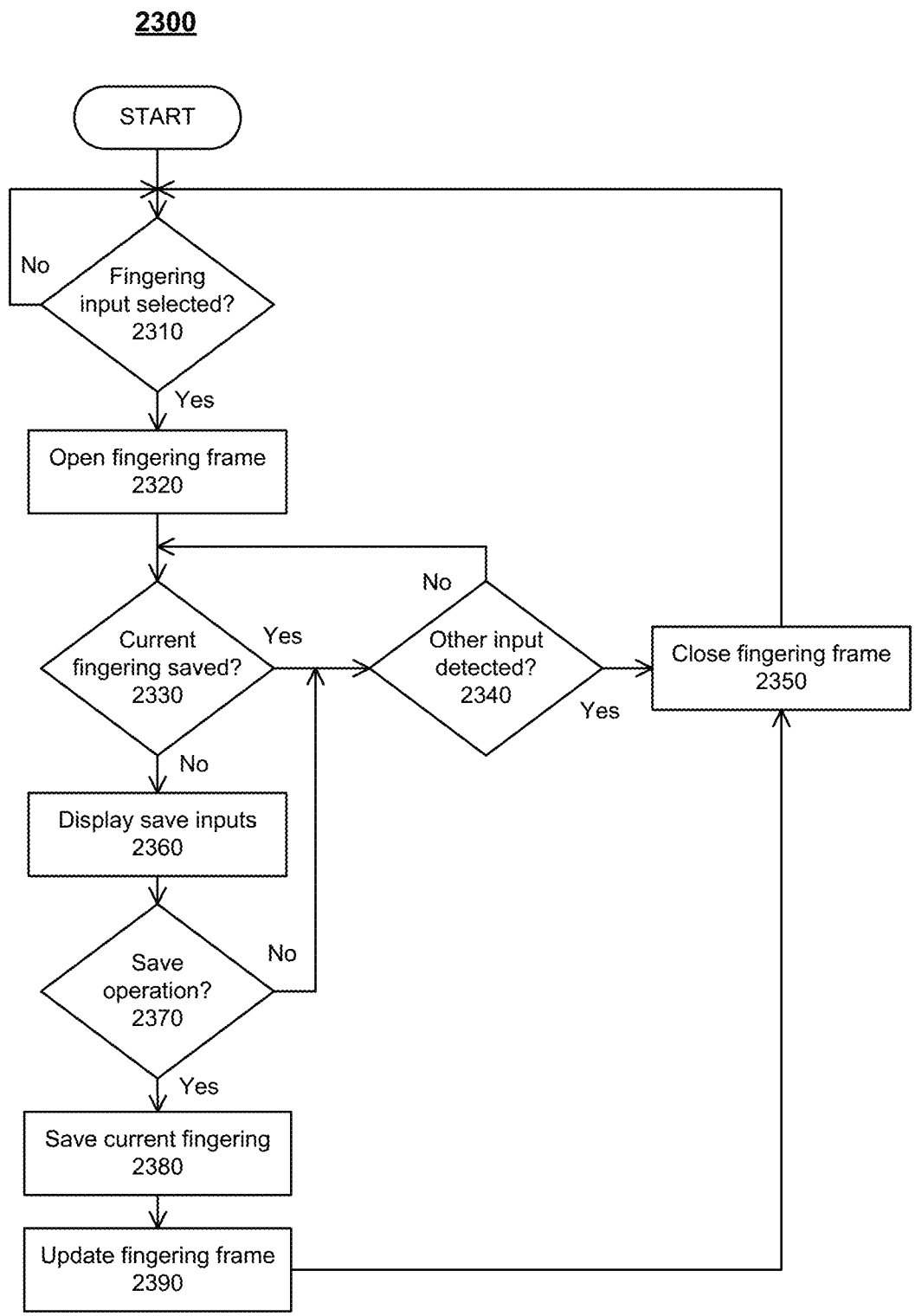
FIG. 23 illustrates an example process for saving a customized fingering variant, according to an embodiment.

FIG. 23 illustrates an example process 2300 for saving a customized fingering variant, according to an embodiment.

In step 2310, the application determines when the user has selected fingering-setting input 360. The user may select fingering-setting input 360 by touching or clicking a position within graphical user interface 150 that corresponds to fingering-setting input 360. If no selection is detected (i.e., "No" in step 2310), the application continues to wait for a selection. Otherwise, if a selection is detected (i.e., "Yes" in step 2310), the application opens a fingering frame (e.g., fingering frame 365) in step 2320 (e.g., according to process 1000 in FIG. 10). The fingering frame may comprise a drop-down menu of available instruments and/or fingerings.

In step 2330, the application determines whether the current fingering variant (e.g., as modified by the user using process 2200, for example, within fingering canvas 178), has been saved. If the current fingering variant has been saved (i.e., "Yes" in step 2330), process 2300 proceeds to step 2340. Otherwise, if the current fingering variant has not been saved (i.e., "No" in step 2330), process 2300 proceeds to step 2360.

In step 2340, the application determines when another input is detected. For example, the user may navigate away from the fingering frame by touching or clicking on a position outside of the fingering frame in graphical user interface 150. If such an input is detected (i.e., "Yes" in step 2340), the application closes the selection frame in step 2350. Otherwise, if no such input is detected (i.e., "No" in step 2340), the application continues to wait for a user input.

In step 2360, the application displays one or more save inputs within the fingering frame. The save input(s) may comprise a text box for specifying the name of the current unsaved fingering variant.

In step 2370, the application determines when the user performs an operation, using the save input(s), to save the current fingering variant. For example, when the user navigates away from the text box after specifying a name, selects a button (e.g., icon) for saving the specified name, or performs some other save operation (i.e., "Yes" in step 2370), the application may save the current fingering variant (e.g., within local database 134 and/or remote database 114) as a new customized fingering variant, in step 2380, for future retrieval. Then, in step 2390, the fingering frame may be updated to reflect that the fingering variant has been saved. If the current fingering variant is not saved (i.e., "No" in step 2370), the application may continue to wait for user input.

4.13. Performance

Figure 24:
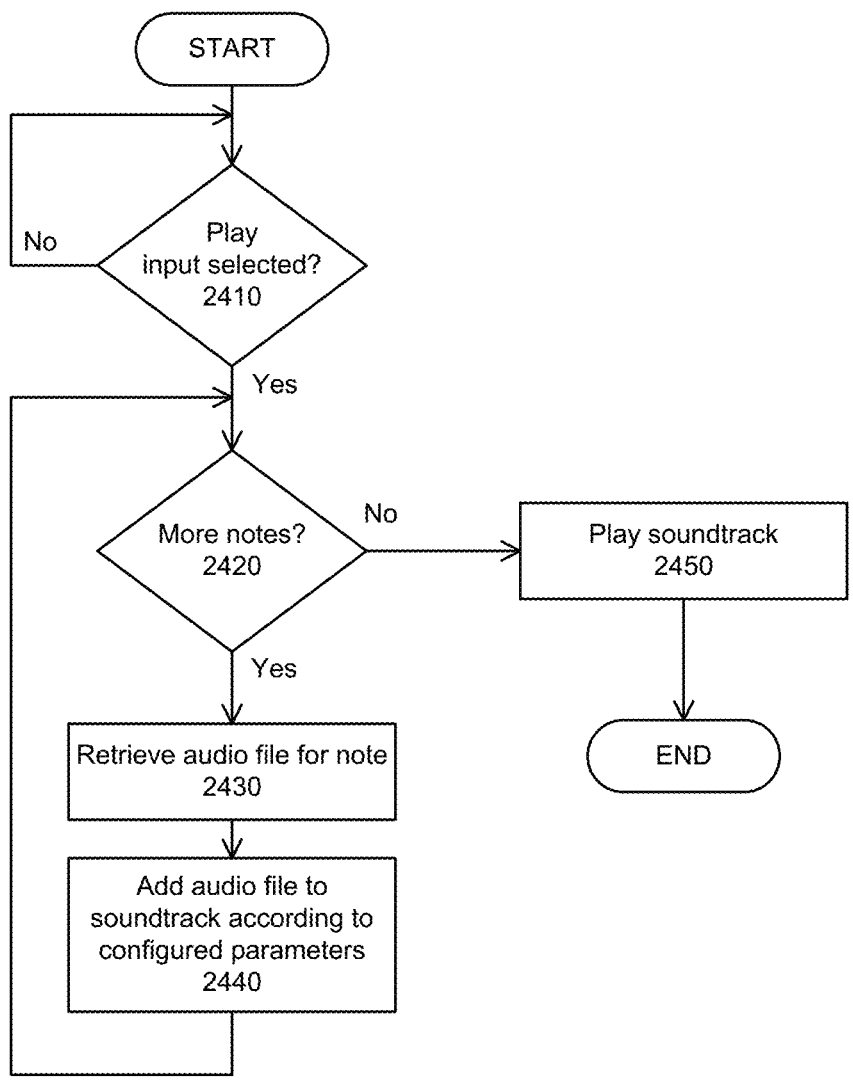
FIG. 24 illustrates an example process for performing a music scale by the application, according to an embodiment.

FIG. 24 illustrates an example process 2400 for performing a music scale by the application, according to an embodiment.

In step 2410, the application determines when the user has selected play input 350. The user may select play input 350 by touching or clicking a position within graphical user interface 150 that corresponds to play input 350. If no selection is detected (i.e., "No" in step 2410), the application continues to wait for a selection. Otherwise, if a selection is detected (i.e., "Yes" in step 2410), process 2400 proceeds to step 2420.

In step 2420, the application begins generating a soundtrack of the selected music scale. For example, the application determines whether or not any more notes need to be added to the soundtrack, based on the arrangement of notes within the music scale that has been selected for performance (e.g., using scale input 305) and the configured parameters (e.g., representing octave, tempo, rhythm, etc.). If at least one more note needs to be added to the soundtrack (i.e., "Yes" in step 2420), process 2400 proceeds to step 2430.

In step 2430, the application retrieves the audio file for the next note (e.g., from local database 134 and/or remote database 114) in the music scale. Each audio file may comprise a recording of a live performance of the note by a musician (e.g., music teacher or other expert). Then, in step 2440, the application adds the retrieved audio file, representing the note, to the soundtrack, in accordance with the configured parameters.

Once no more notes need to be added to the soundtrack (i.e., "No" in step 2420), the application plays the completed soundtrack in step 2450. Notably, in an embodiment in which the audio files comprise recordings of live performances of the music notes, the soundtrack will essentially comprise a recording of a live performance of the music scale (e.g., performed by a music teacher or other expert). Specifically, the application may interface with the speakers of user system 130 to play the soundtrack. If the metronome has been toggled on (e.g., via metronome input 340), the application may add the metronome sound to the soundtrack or play a separate metronome soundtrack in parallel with the soundtrack of the music scale. As discussed elsewhere herein, as the soundtrack is played in step 2450, the application may also highlight each note on staff canvas 174 as that note is played, as well as highlight a key on keyboard canvas 176 that corresponds to the current note being played.

4.14. Artificial Intelligence

Figure 25:
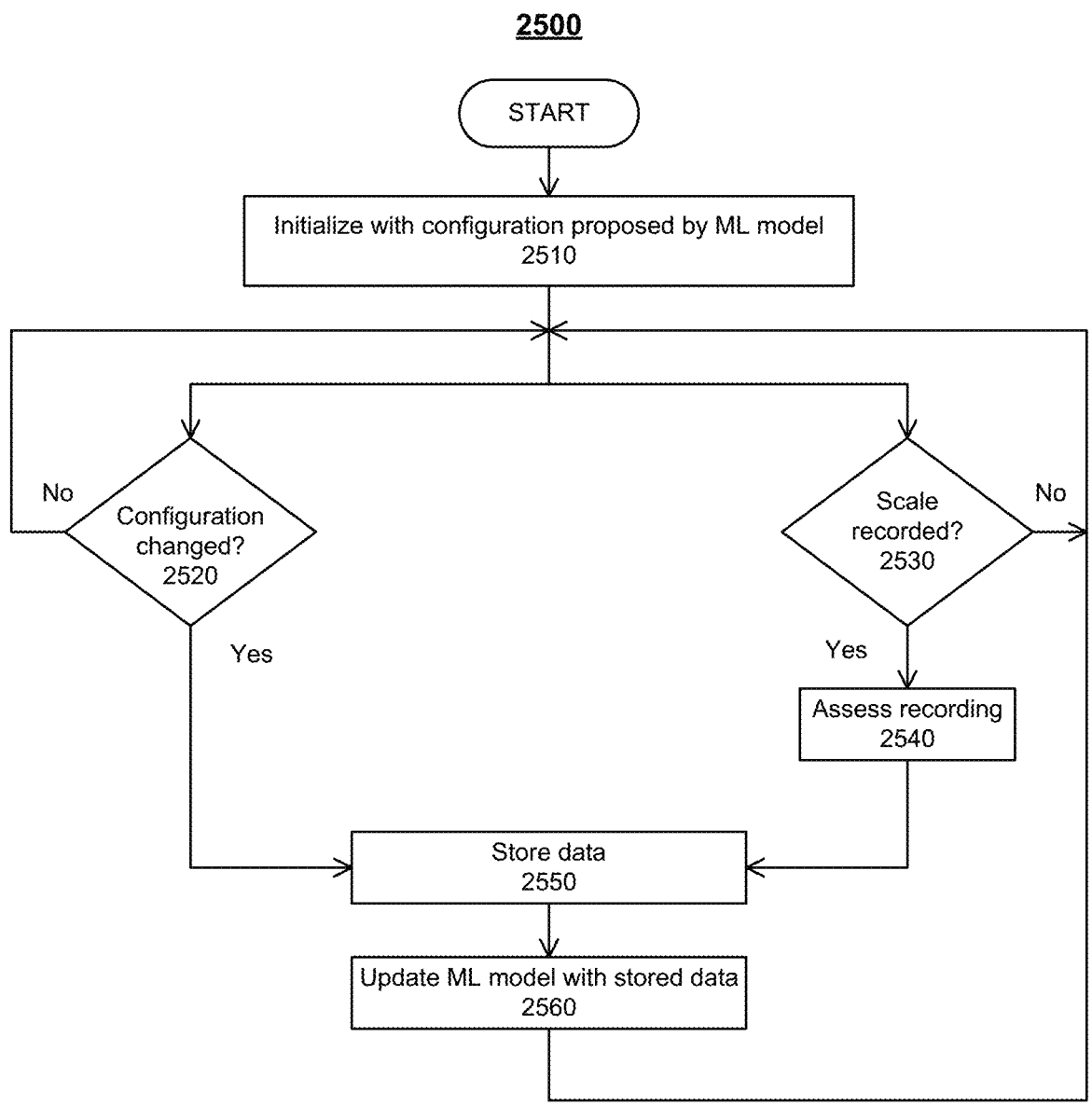
FIG. 25 illustrates an example process for utilizing a machine-learning model within the application, according to an embodiment.

FIG. 25 illustrates an example process 2500 for utilizing a machine-learning model within the application, according to an embodiment. Process 2500 may begin each time the application is started by a user.

In step 2510, the application initializes the configuration of graphical user interface 150, in accordance with the output of a machine-learning (ML) model. The machine-learning model may comprise one or more machine-learning algorithms (e.g., deep learning neural network, XGBoost™, random forest, etc.) that have been trained on the current user's data and/or other users' data, and may be stored in local database 134 and/or remote database 114. The machine-learning model may be trained to output the most effective configuration (e.g., music scale and associated parameters, such as number of octaves, starting octave, starting note, tempo, rhythm, fingering variant, whether to disable or enable the metronome, view settings, etc.) based on the current user's data (e.g., prior configuration, software assessments, demographics, etc.). The application will configure graphical user interface 150 in accordance with the configuration recommended by the machine-learning model (e.g., to reflect all of the parameters recommended by the machine-learning model).

In an embodiment, the machine-learning model is trained on a dataset of prior usage data. The prior usage data may be annotated with expert assessments as to what the next configuration and/or lesson should be, given the prior usage data. Prior to training, the dataset may be cleaned using established statistical methods for data engineering. The cleaned dataset may be partitioned (e.g., using stratified random sampling) into a training dataset and a validation dataset. The machine-learning model is created and trained using the training dataset, and then validated using the validation dataset. This partitioning, training, and validation may be performed over a plurality of iterations (e.g., using different partitions of the dataset).

In step 2510, the application may retrieve the user's prior usage data (e.g., representing the user's learning history) from memory (e.g., local database 134 and/or remote database 114). The application may then convert the user's prior usage data into an input vector, and feed the input vector as an input into the machine-learning model. The machine-learning model may output a recommended configuration, and the application may use the recommend configuration to configure graphical user interface 150.

In steps 2520 and 2530, the application determines whenever the user changes the configuration (e.g., by altering parameters using toolbar 300) and whenever the user records a scale (e.g., using record input 370), respectively. When the configuration is changed (i.e., "Yes" in step 2520), data representing the change (e.g., identifying the starting option and ending option for each changed parameter) is stored (e.g., in local database 134 and/or remote database 114) in step 2550. When a scale is recorded (i.e., "Yes" in step 2530), the recording is assessed by the application (e.g., the software assessment module, described elsewhere herein) in step 2540, and the result of the assessment from step 2540 is stored (e.g., in local database 134 and/or remote database 114) in step 2550.

In an embodiment, the assessment in step 2540 may comprise a comparison between the recorded scale, as performed by the user, and an ideal scale generated by the application. For example, the recorded scale may be retrieved from memory (e.g., local database 134 and/or remote database 114), the ideal scale may be generated (e.g., using process 2400 in FIG. 24), and the two audio streams may be compared using a data-processing algorithm to generate a score (e.g., similar or identical to the percentage score representing mastery of the scale, as described elsewhere herein). This score may be stored as at least a portion of the data, representing the assessment, in step 2550.

In step 2550, the data may be stored in association with the user for which the data were generated. For example, the data, representing a change in configuration and/or assessment of a recorded performance of a scale, may be stored in a database (e.g., database 114) in associated with the user's HTTP session identifier or other identifier.

In step 2560, the machine-learning model may be updated with data stored in step 2550. For example, the machine-learning model may be updated in real time as the data is generated, periodically (e.g., on a schedule) using all data that has been stored since the last update, or on demand (e.g., in response to a manual operation by an operator of platform 110). It should be understood that database 114 of platform 110 may store data obtained from a plurality of users (e.g., all users of the application), and that this data may be used to update the machine-learning model by retraining the machine-learning model on this new data, in a similar or identical manner as the machine-learning model was initially trained. Thus, the recommended configurations output by the machine-learning model should improve over time, as the training dataset grows larger and larger from all of the user data stored over a plurality of iterations of step 2550.

5. Example Session

Figure 26A:
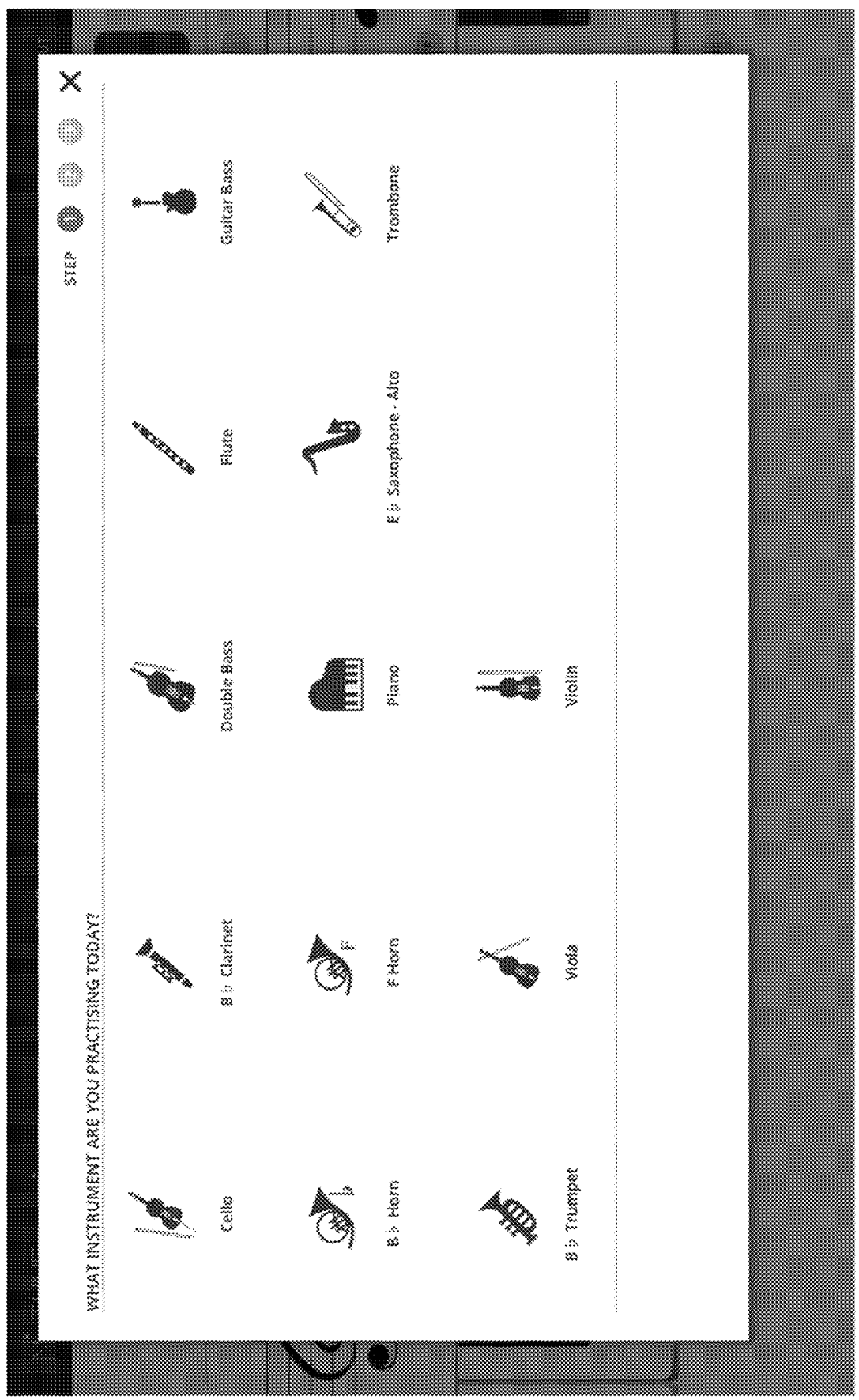
FIGS. 26A-26P illustrate an example of a user session, according to an embodiment.
Figure 26B:
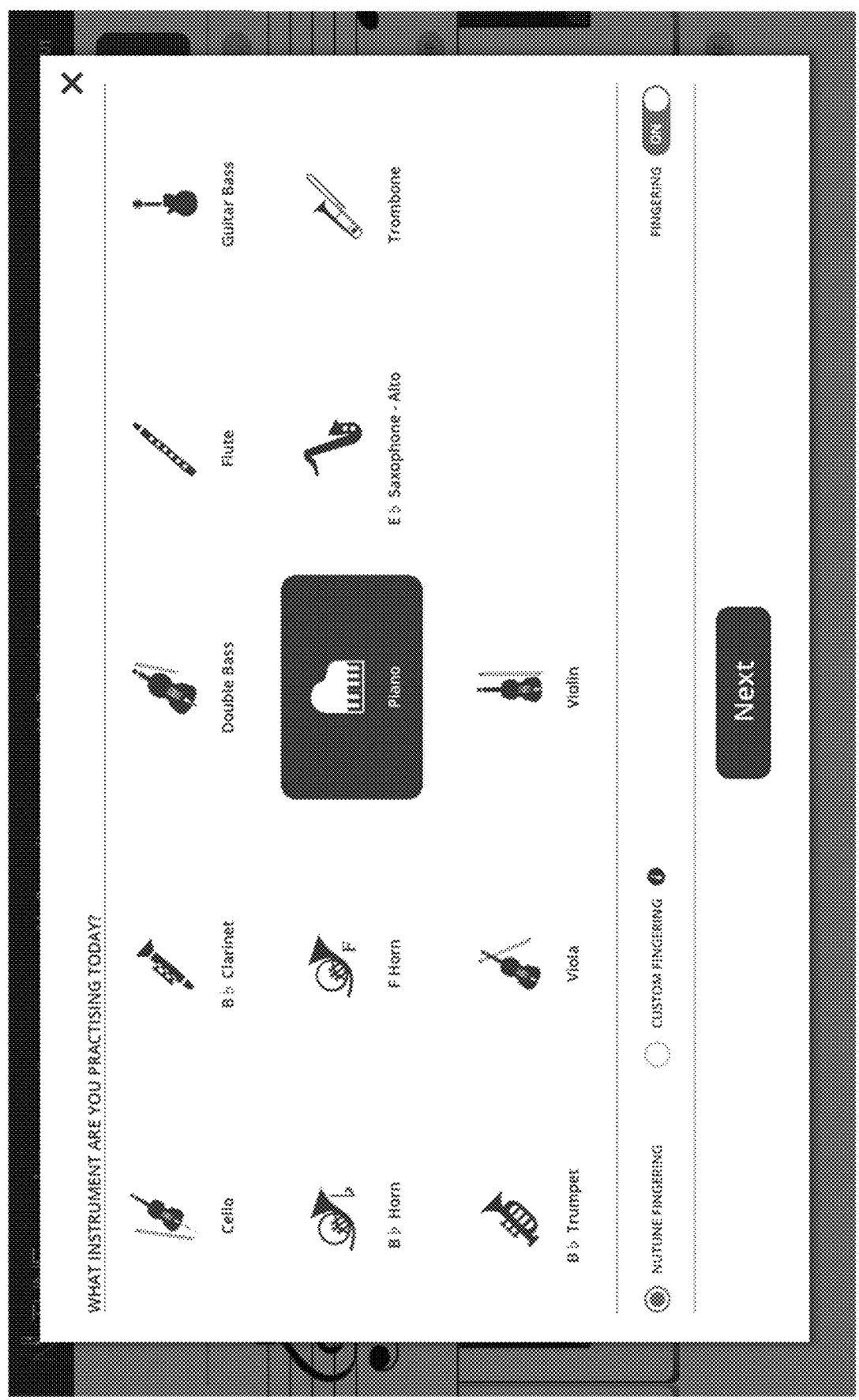
Figure 26C:
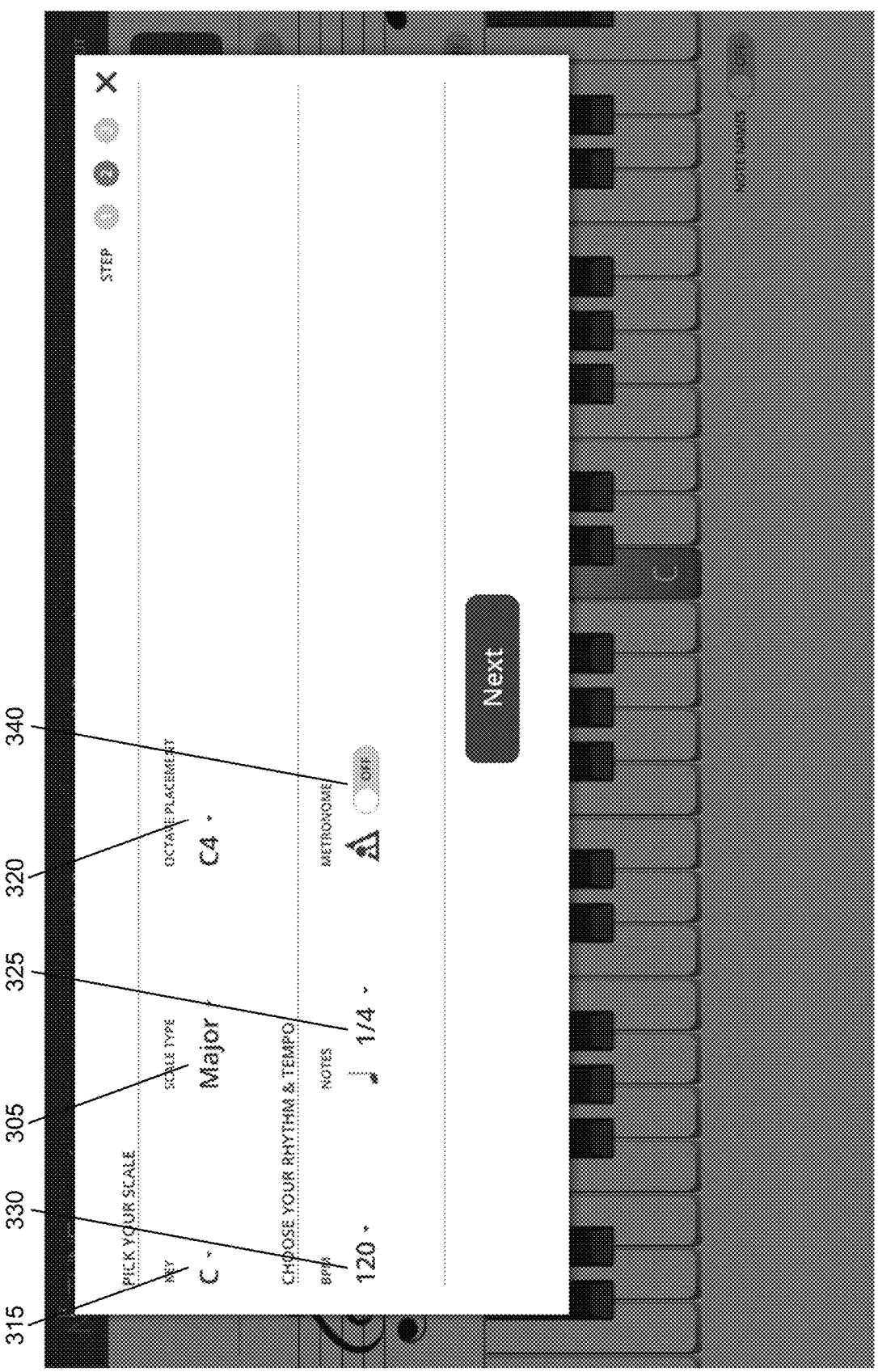
Figure 26D:
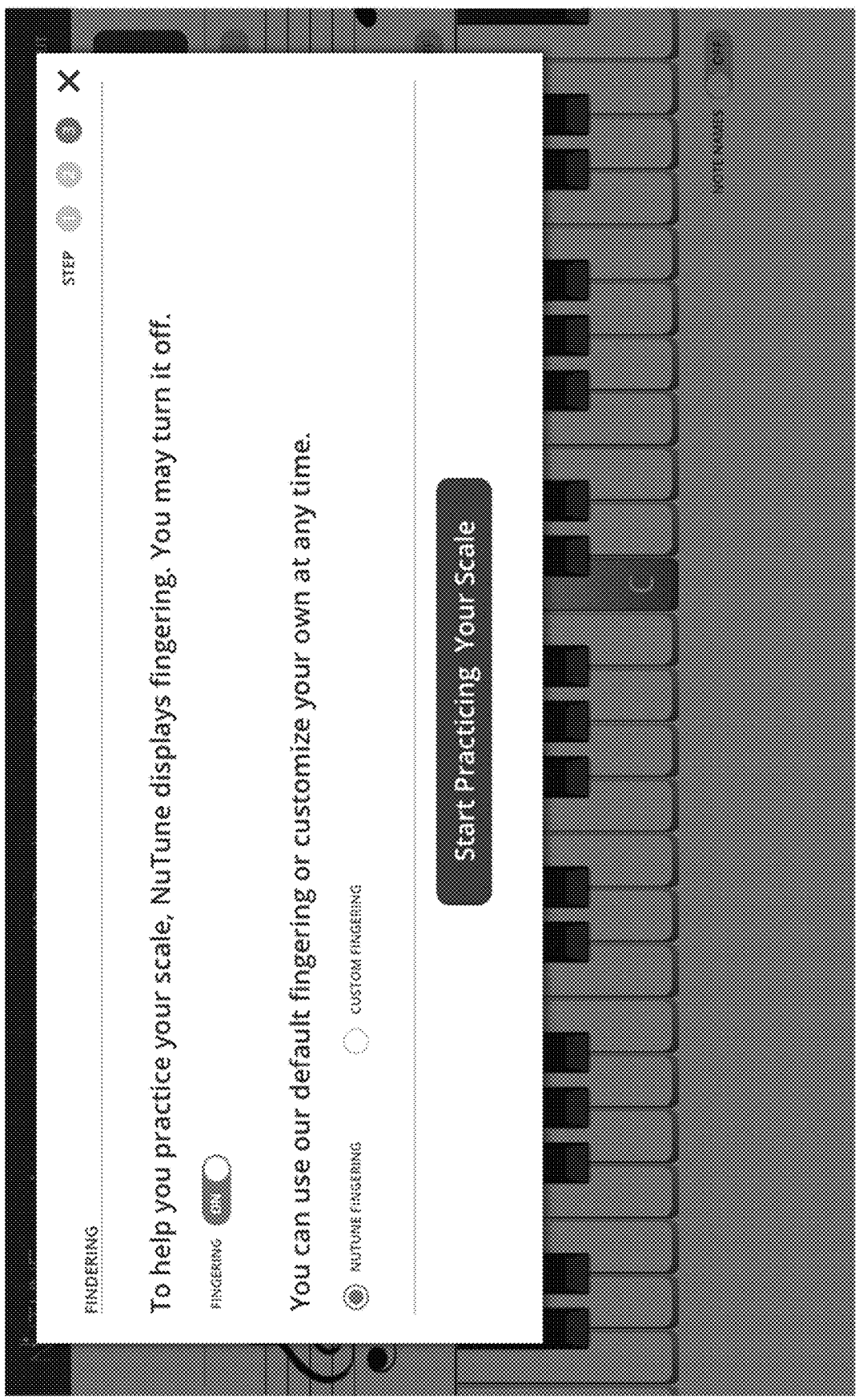
Figure 26E:
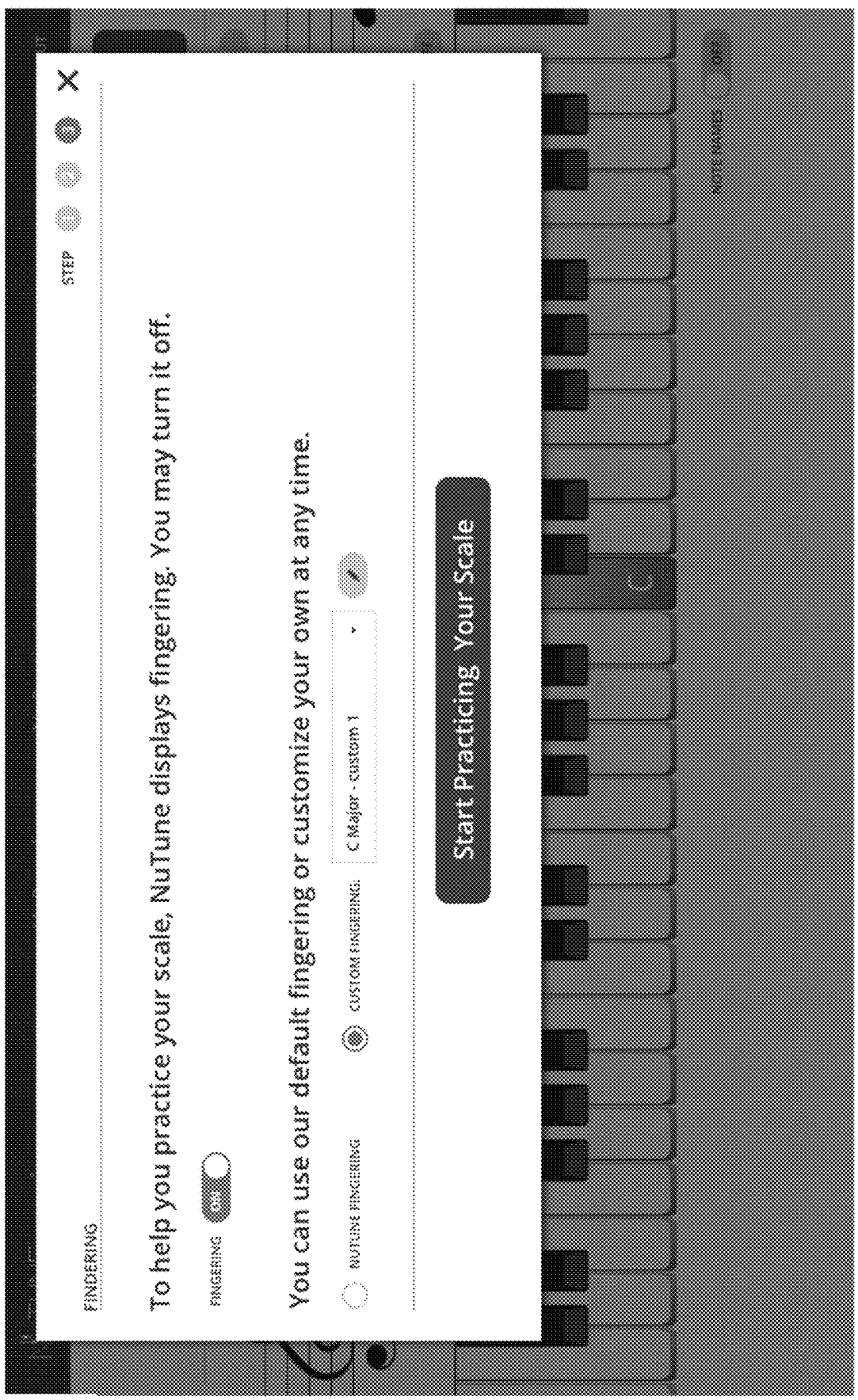
Figure 26F:
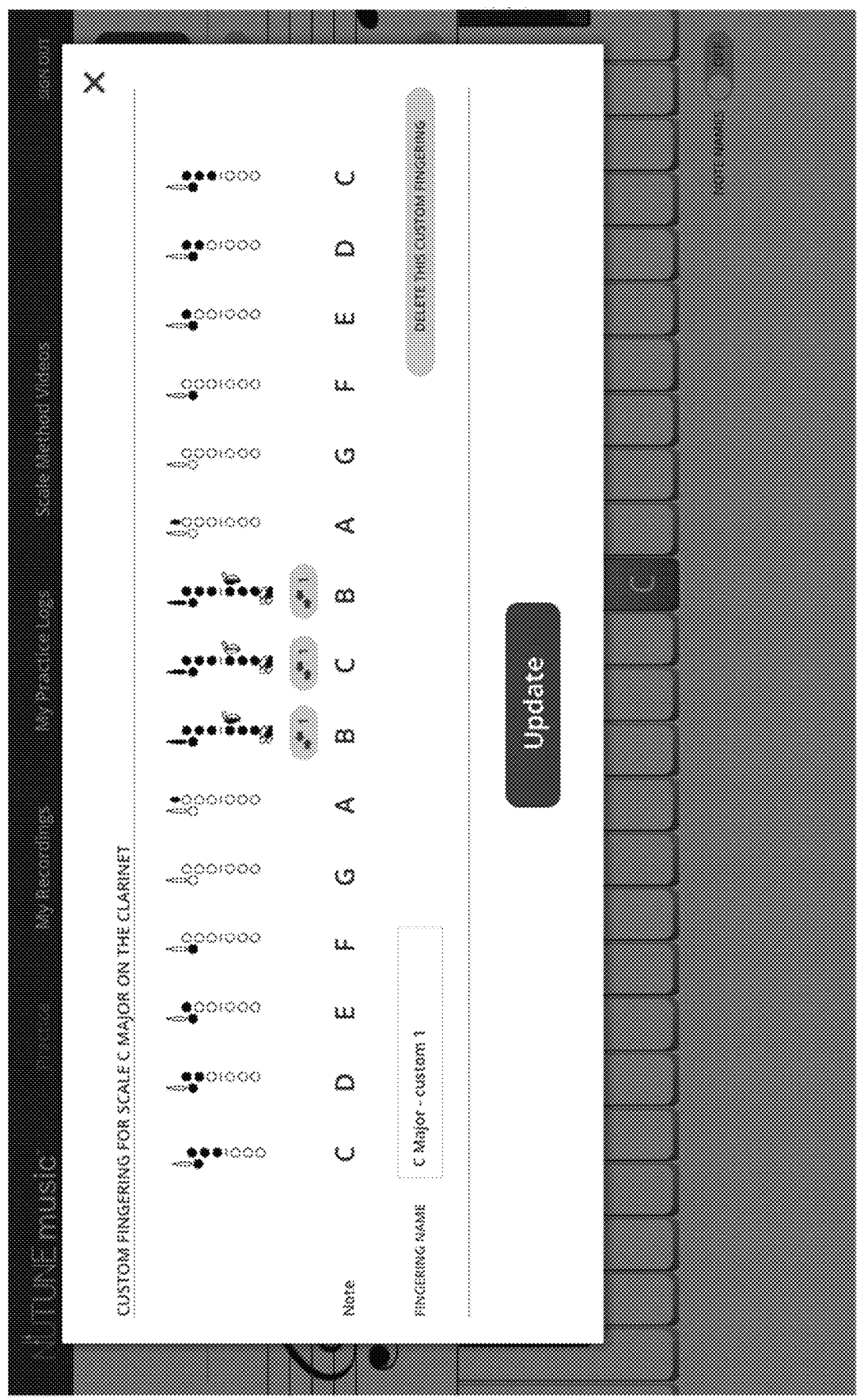
Figure 26G:
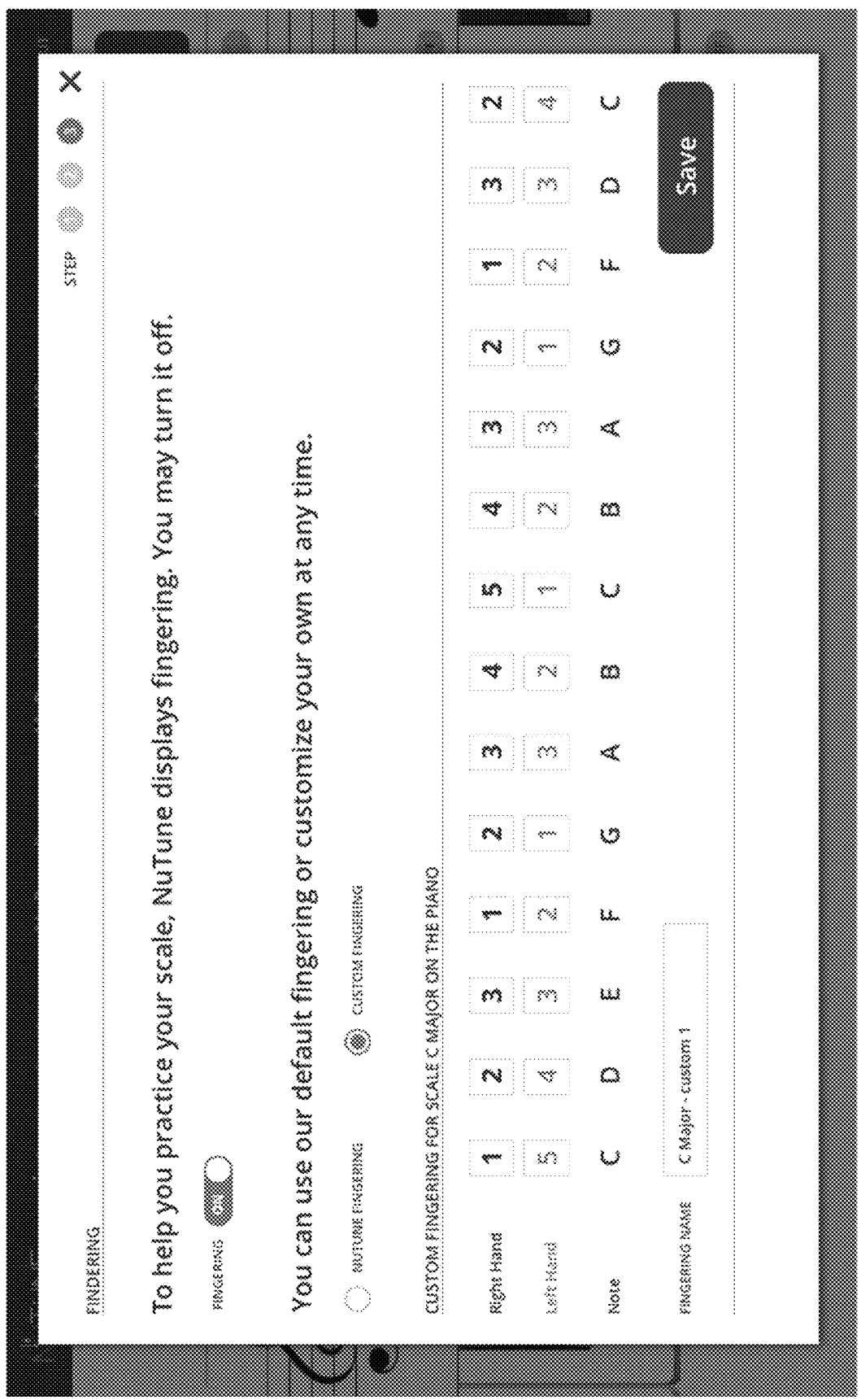
Figure 26H:
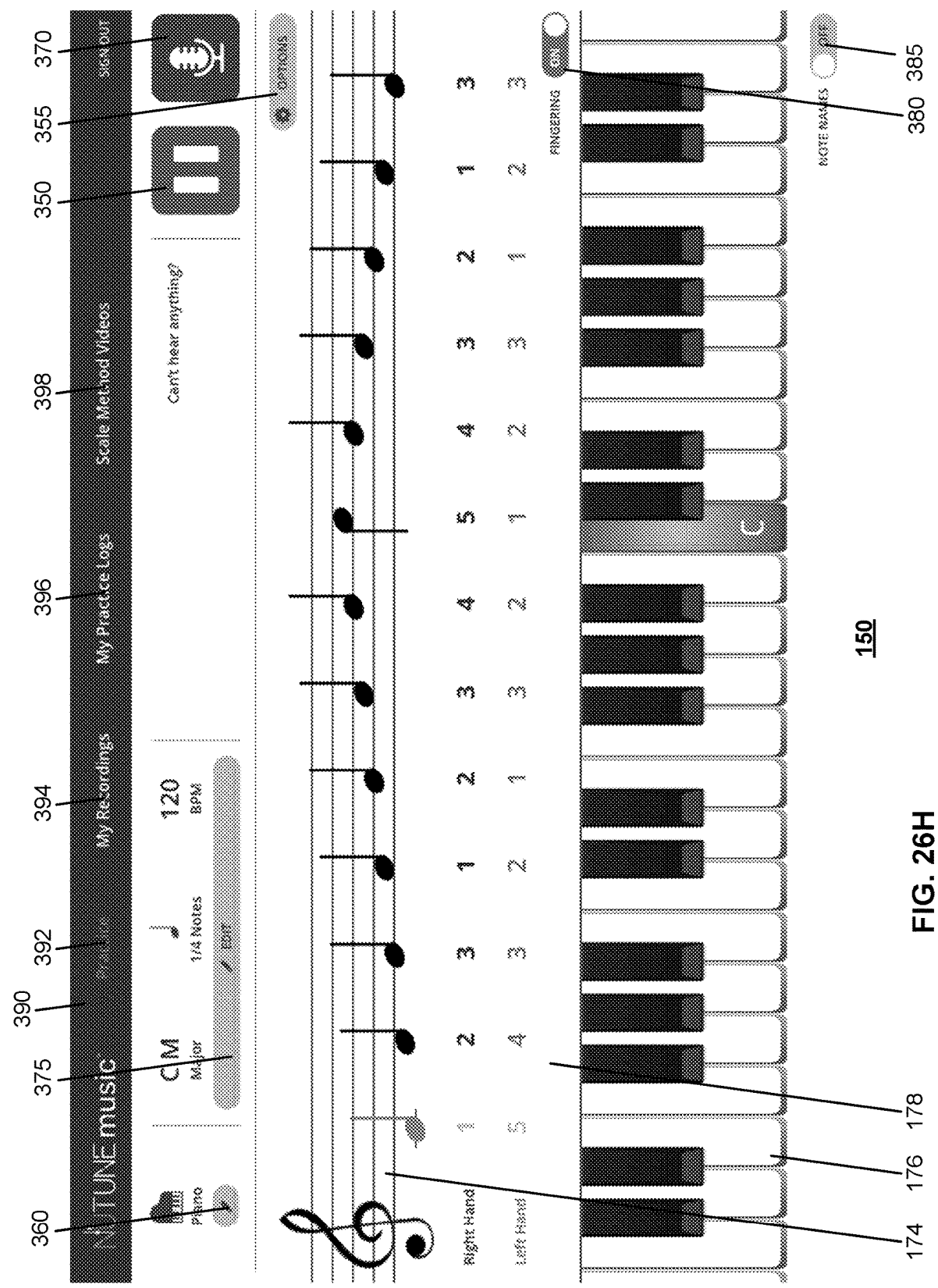
Figure 26I:
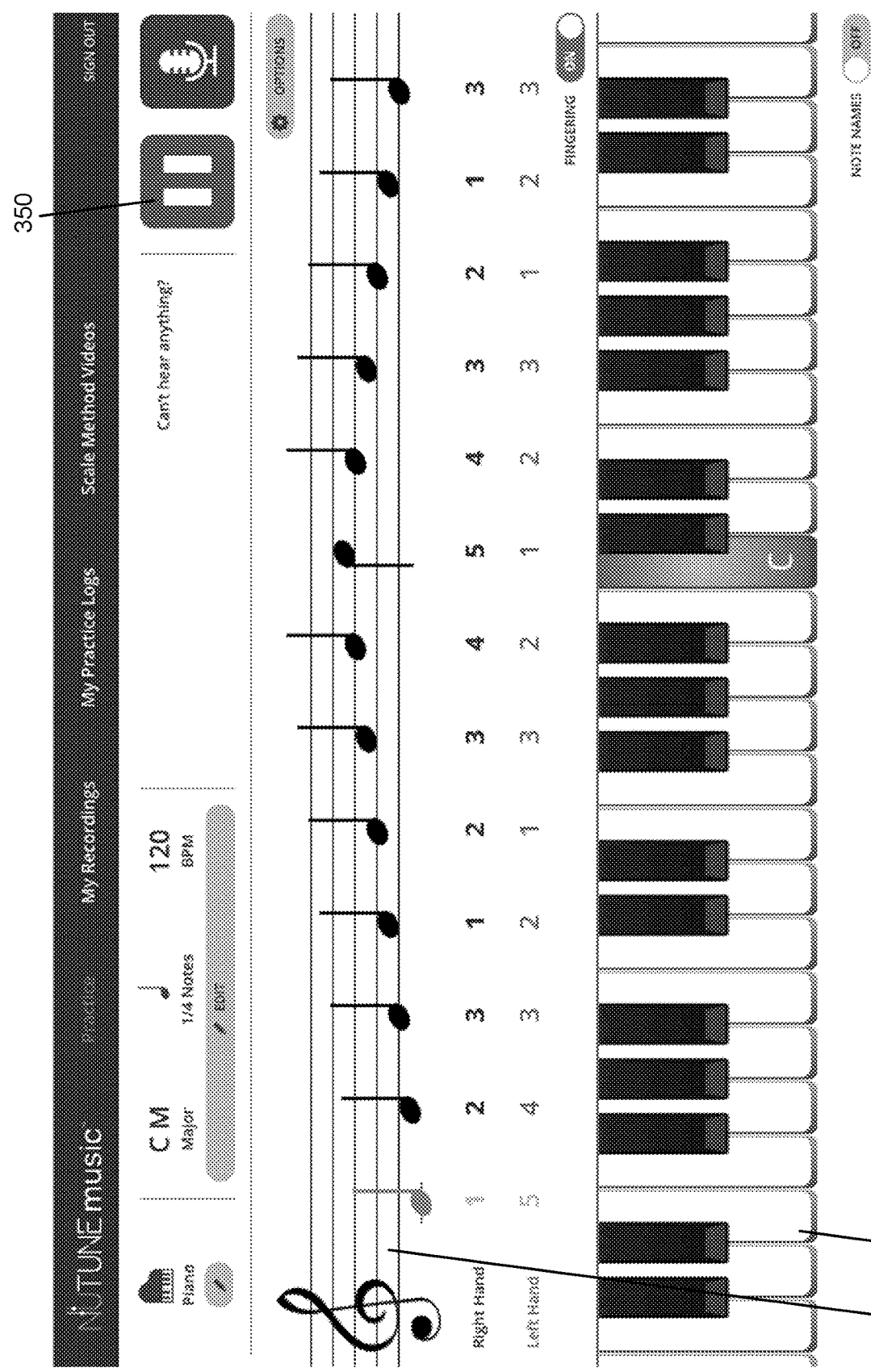
Figure 26J:
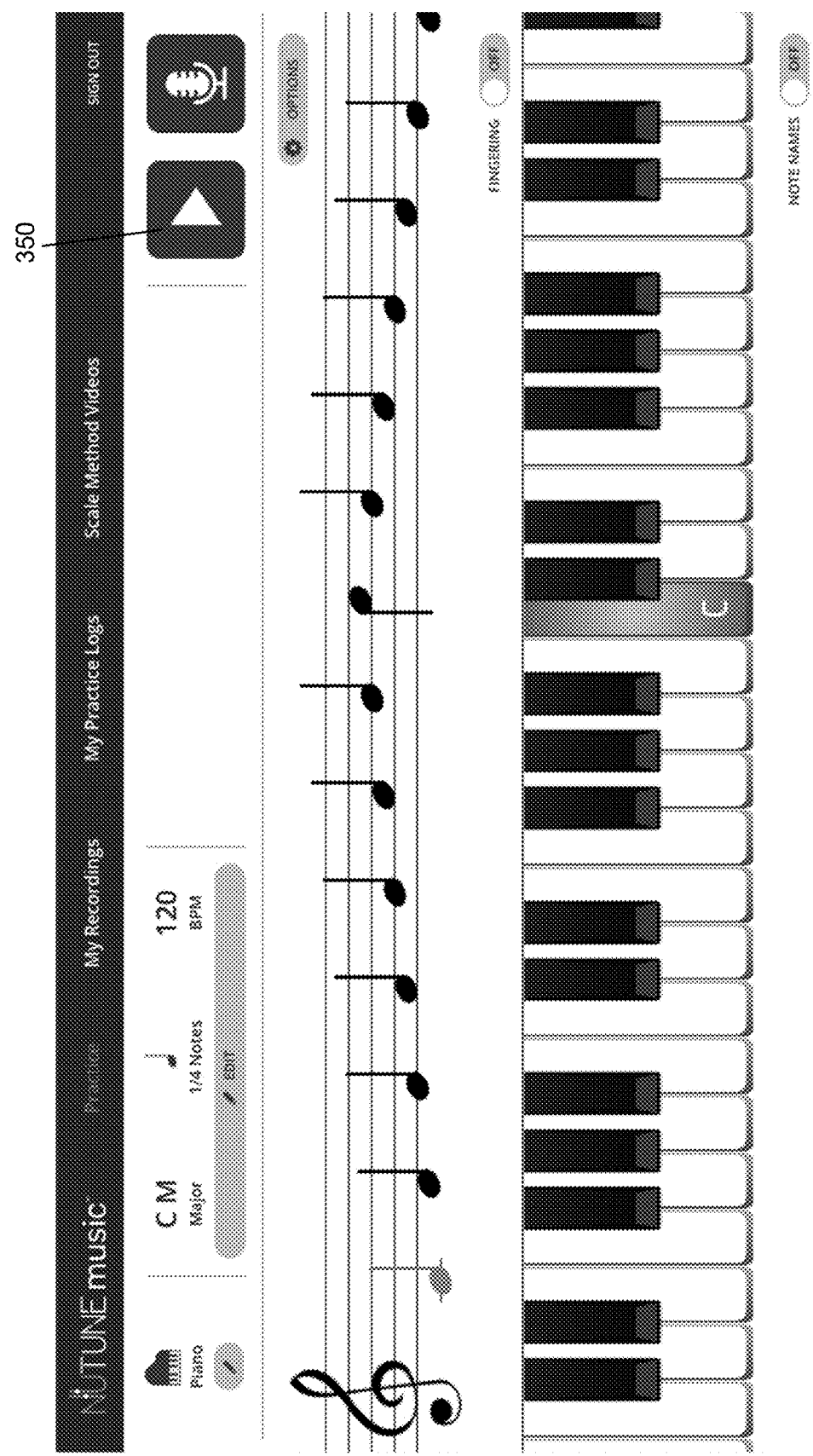
Figure 26K:
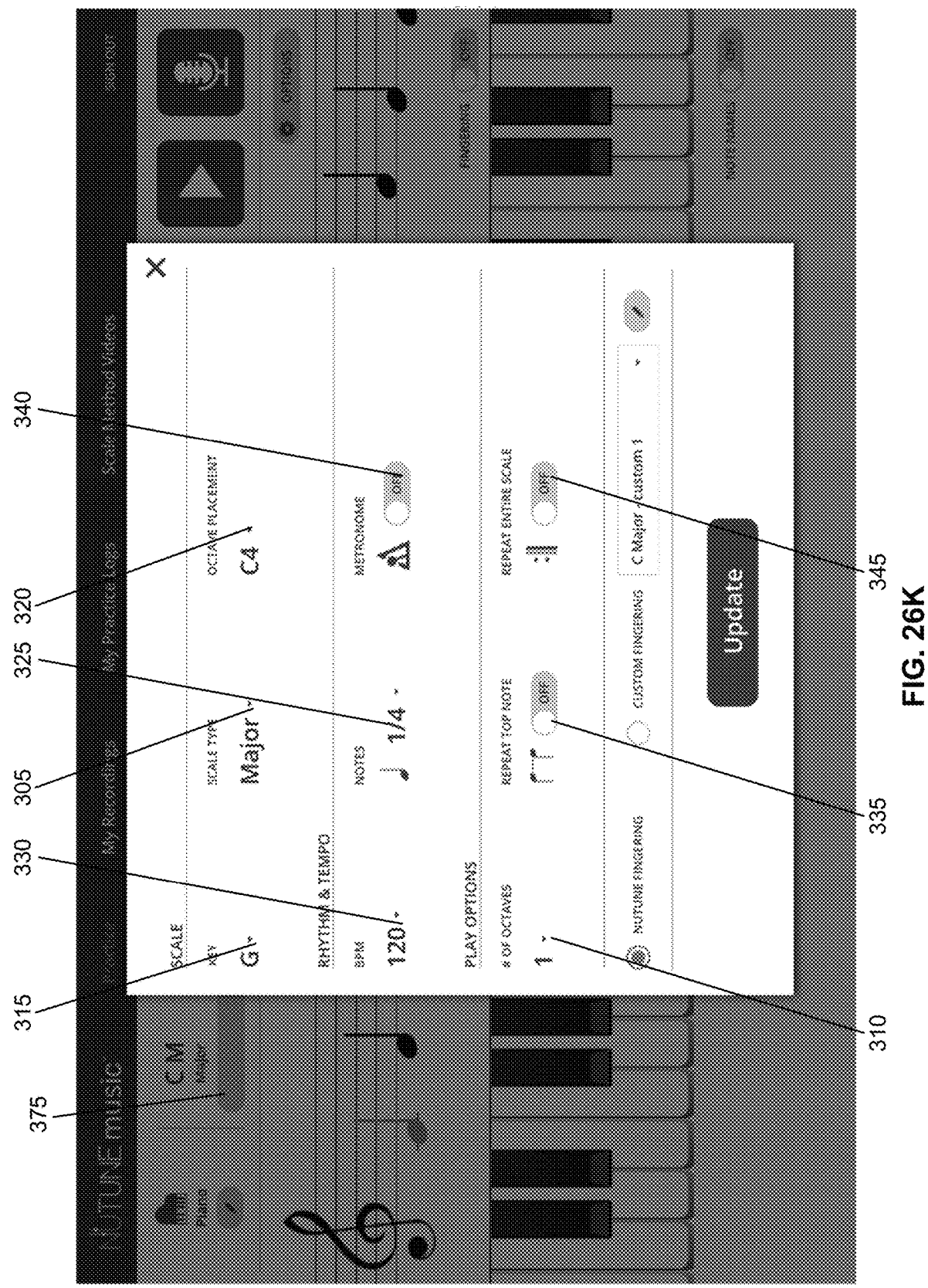
Figure 26L:
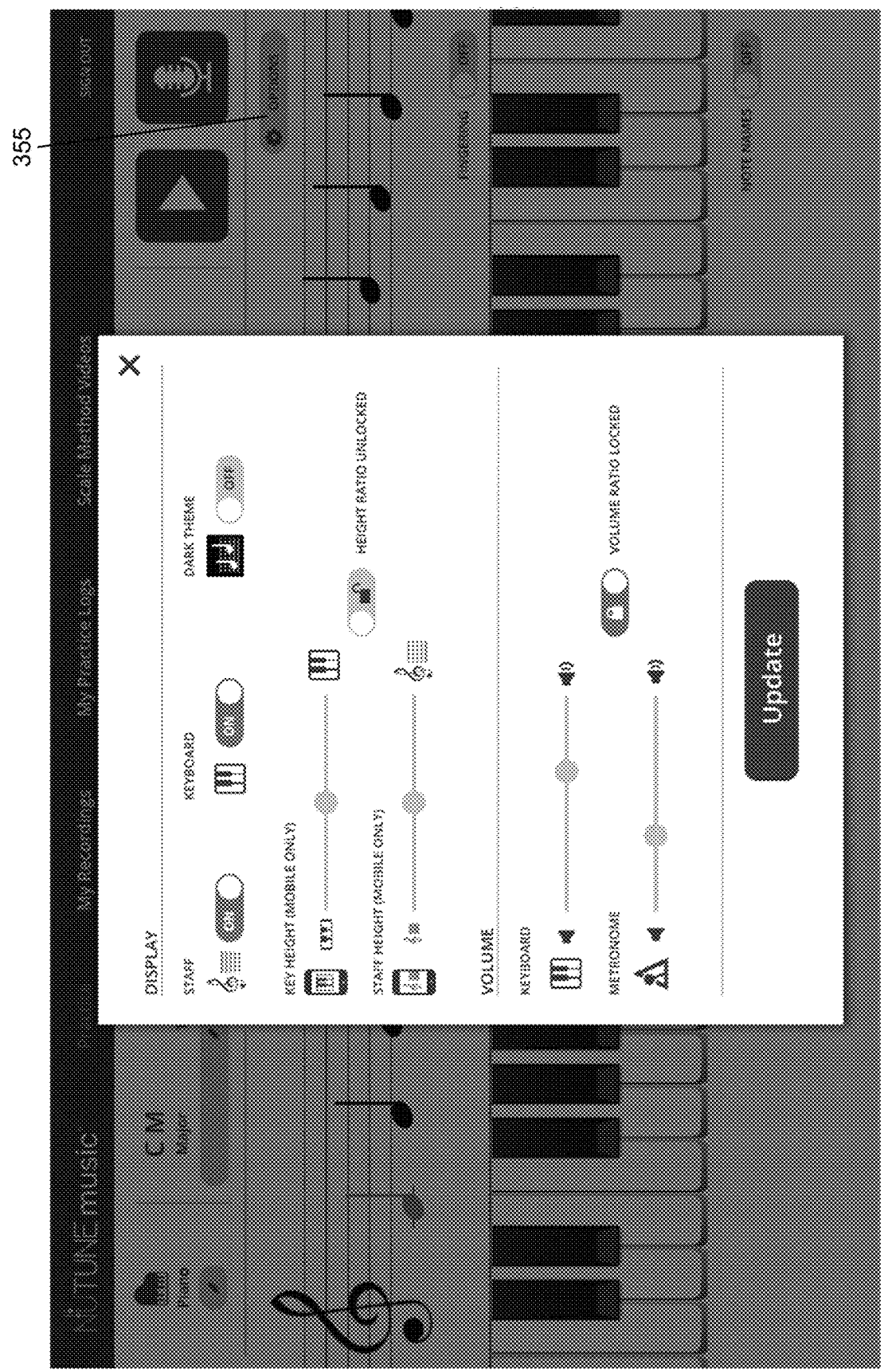
Figure 26M:
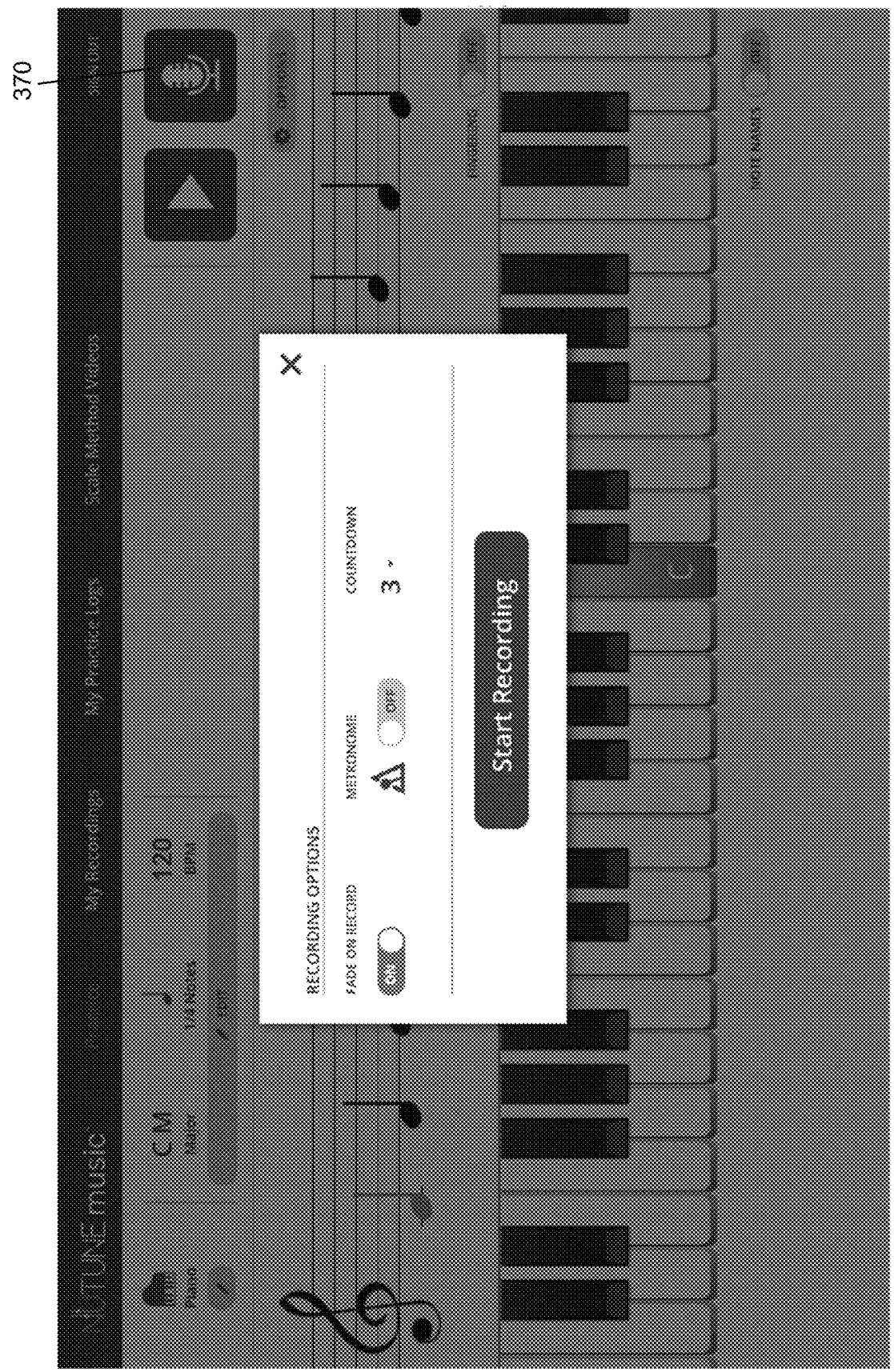
Figure 26N:
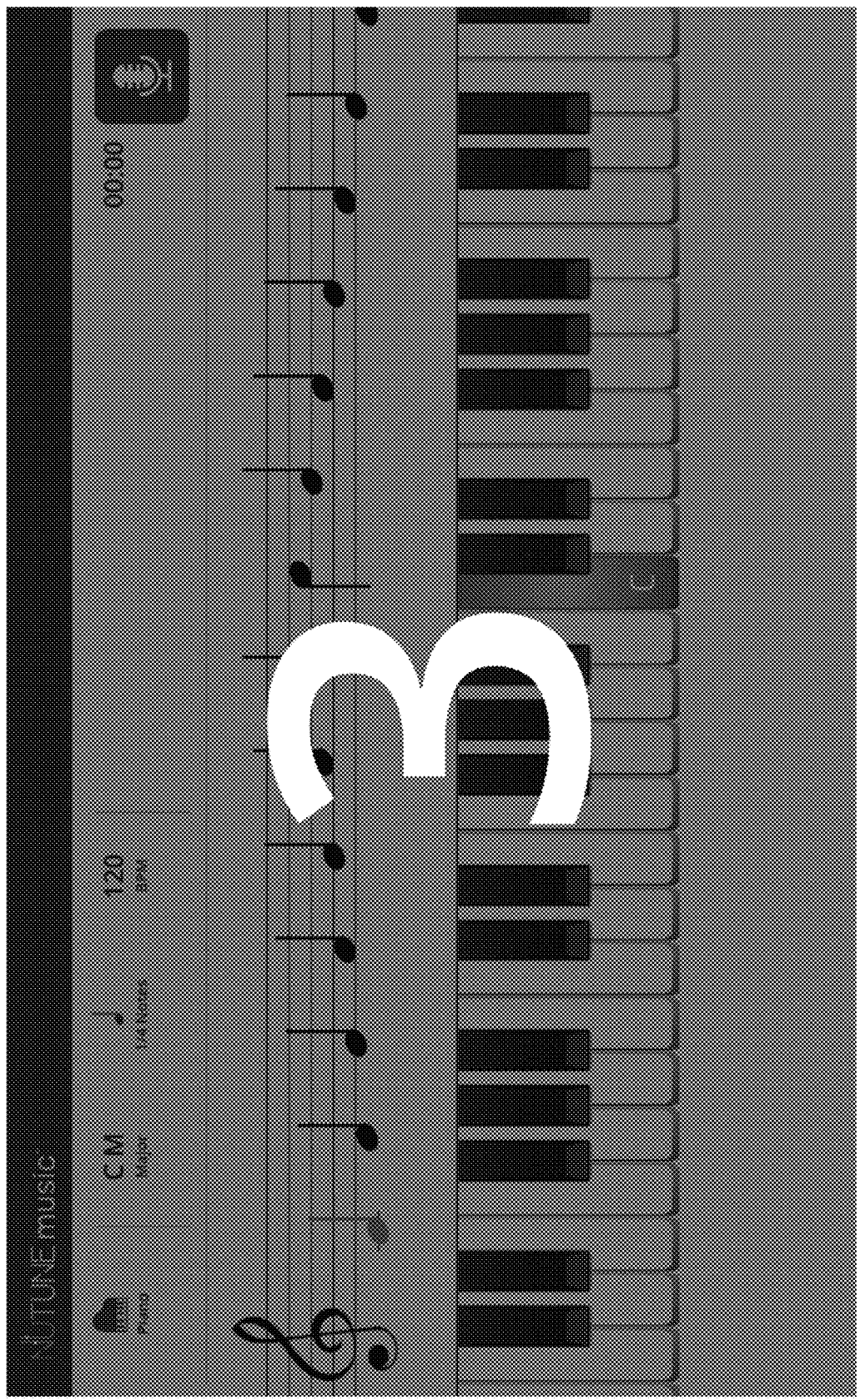
Figure 26O:
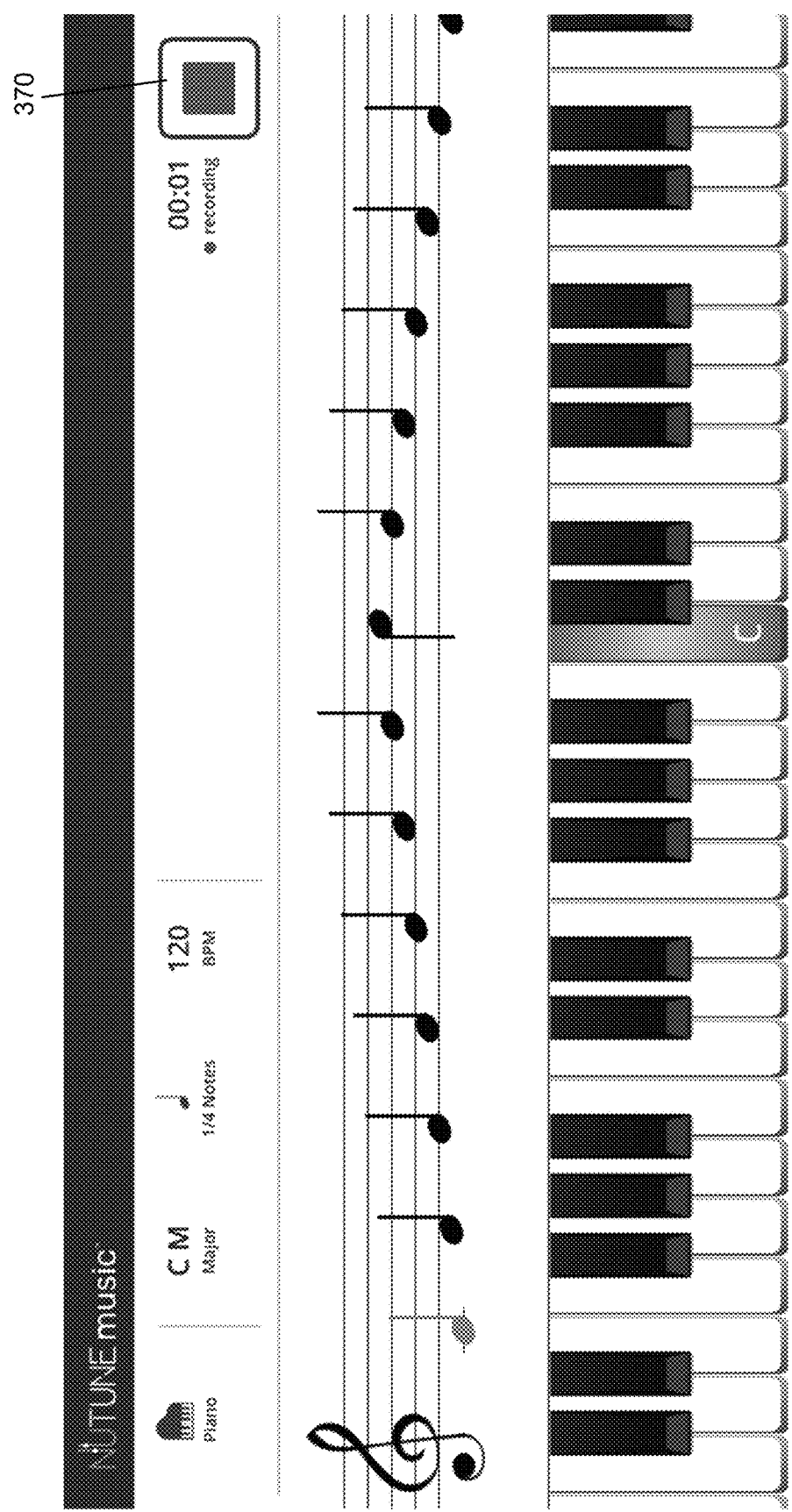
Figure 26P:
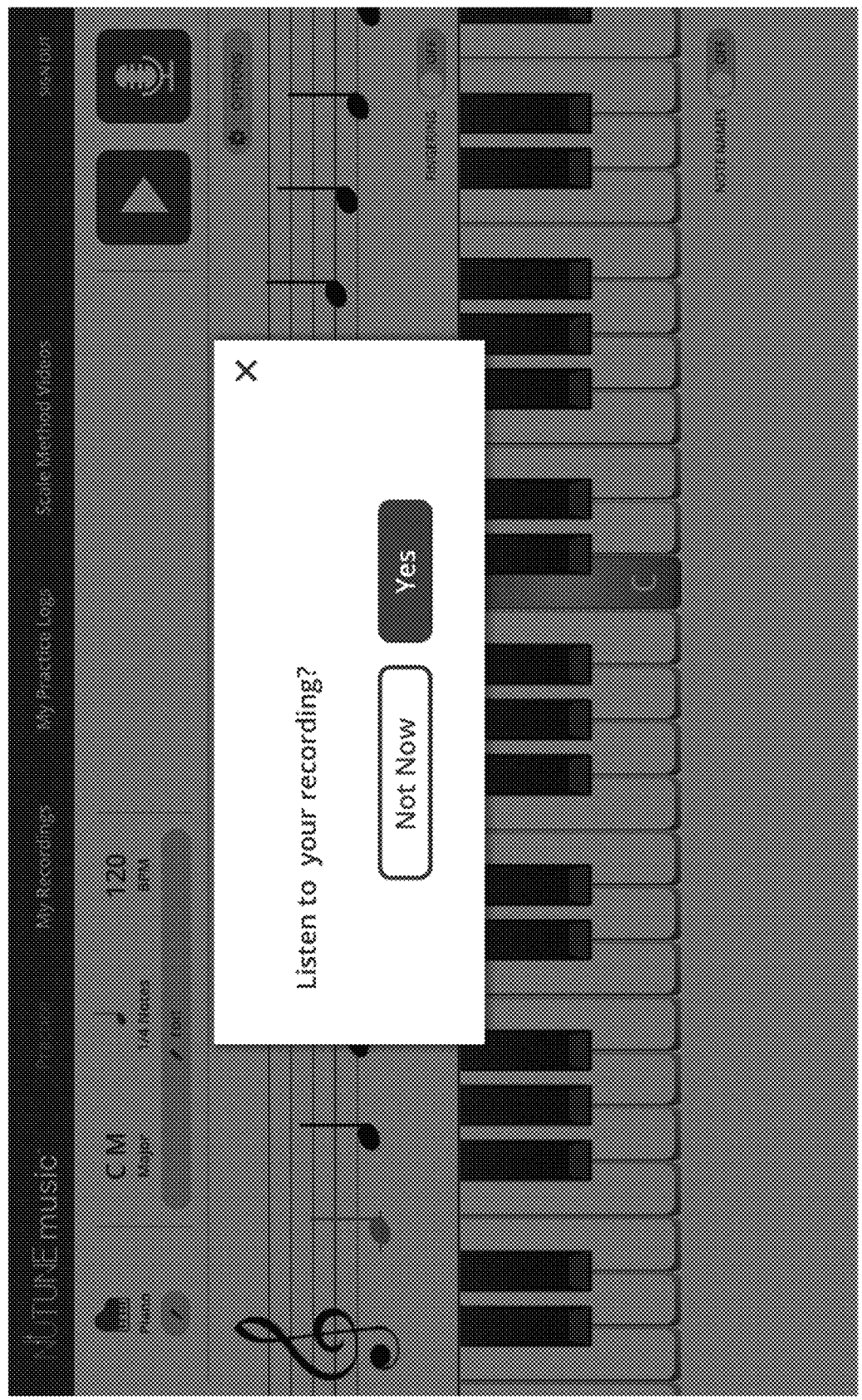

FIGS. 26A-26P illustrate an example of a user session, according to an embodiment. The illustrated session begins with a wizard that guides the user through parameter selection in two or more screens (e.g., three screens in the illustrated embodiment). The application may automatically present the wizard to the user when the application is started.

As illustrated in FIG. 26A, the first screen of the wizard prompts the user to select an instrument to practice. This first screen is similar to, and may contain the same set of instruments as, fingerings frame 365. The available instruments comprise a cello, clarinet, double bass, flute, guitar bass, $B^b$ horn, F horn, piano, alto saxophone, trombone, trumpet, viola, and violin. However, it should be understood that more, fewer, or a different set of instruments may be available through the application.

As illustrated in FIG. 26B, the user has selected the piano from the first screen of the wizard. Accordingly, the first screen has been updated to include a "next" input for moving to the second screen of the wizard. In addition, the first screen has been updated to include selectable representations (e.g., radio button and description) for each available fingering variant for the piano. The user may select a particular fingering variant to practice by selecting one of these selectable representations (or do nothing to implicitly select the default fingering variant), and select the "next" input to proceed to the second screen of the wizard.

As illustrated in FIG. 26C, the second screen of the wizard prompts the user to select a scale and a number of other parameters. For example, the user may be prompted to select the starting note, scale, starting octave, tempo (beats per minute), rhythm, and whether or not to use the metronome feature. Similarly to the first screen, the second screen includes a "next" input for moving to the third screen of the wizard. The user may select an option for one or more of these parameters (or do nothing to implicitly select default option(s)), and select the "next" input to proceed to the third screen of the wizard.

As illustrated in FIG. 26D, the third screen of the wizard may comprise prompts for setting fingering-related parameters. For example, the wizard may prompt the user with an input for toggling fingering canvas 178 on or off, and an input (e.g., radio buttons) for selecting the default fingering or a customized fingering pattern. If the user utilizes the input to select a customized fingering pattern, the third screen may be updated, as illustrated in FIG. 26E, to display an input (e.g., drop-down menu) for selecting a previously saved customized fingering pattern, and an input (e.g., "edit" icon) for creating a new customized fingering pattern. If the user selects a previously saved customized fingering pattern, the customized fingering pattern may be displayed, as illustrated in FIG. 26F, with inputs for changing and saving the customized fingering pattern. On the other hand, if the user selects the input for creating a new customized fingering pattern, the third screen may be updated, as illustrated in FIG. 26G, to comprise inputs for setting and saving a new customized fingering pattern. In addition, the third screen may comprise a "start" input. When the user selects the "start" input, the wizard is closed, such that the user may begin practicing using the configuration specified via the first and second screens of the wizard. For example, as illustrated in FIG. 26H, once the wizard is closed, the user may clearly view the practice screen with staff canvas 174, keyboard canvas 176, and/or fingering canvas 178.

As illustrated in FIG. 26I, the user may select play input 350. In response to the user's selection of play input 350, the application performs the selected scale, according to the selected parameters. In addition, to playing a soundtrack of the scale (e.g., generated using process 2400 in FIG. 24), the application may highlight the current note being played on staff canvas 174 and the key that is associated with the current note being played on keyboard canvas 176. Each note and its associated key may be highlighted in a different color than the other notes and keys at the time that it is being played by the application. Thus, the soundtrack, staff canvas 174, and keyboard canvas 176 are all synched to each other. As illustrated in FIG. 26J, once the user selects play input 350 again, the application pauses or stops its performance.

As illustrated in FIG. 26K, the user may select edit input 375 to modify parameters. For instance, when the user selects edit input 375, the application may overlay a parameter frame with scale input 305, number-of-octaves input 310, note input 315, octave input 320, rhythm input 325, tempo input 330, note-repeat input 335, metronome input 340, and scale-repeat input 345. Once the user has modified the parameters as desired, using the inputs, the user may select an "update" input to commit the modifications.

As illustrated in FIG. 26L, the user may select settings input 355 to modify other settings. For instance, when the user selects settings input 355, the application may overlay a settings frame with one or more inputs for modifying one or more settings. This settings frame may be similar or identical to the frame discussed with respect to FIG. 4L. For example, the settings frame may comprise inputs for toggling each of staff canvas 174 and keyboard canvas 176 on and off, toggling between a light and dark theme, adjusting the height of each of staff canvas 174 and keyboard canvas 176, toggling on and off a locked aspect ratio between the heights of staff canvas 174 and keyboard canvas 176, adjusting the volume of the application's performance, adjusting the volume of the metronome, and toggling on and off a locked aspect ratio between the volumes of the application's performance and the metronome.

As illustrated in FIG. 26M, the user may select record input 370 to start a recording of the user's performance of a music scale. When the user selects record input 370, the application may overlay a frame with one or more inputs for setting recording options. For example, this frame may comprise an input for toggling on and off a fade for the recording, toggling on and off the metronome, and specifying a countdown (e.g., in seconds). In addition, the frame may comprise a "start" input for starting the recording. If the user has selected a non-zero countdown, the application may overlay a countdown after the user selects the "start" input and before recording begins. The countdown may start by displaying the specified countdown number, as illustrated in FIG. 26N, then subtracting an increment of one each second, and then disappearing immediately before and without displaying zero, as illustrated in FIG. 26O. The countdown provides the user with an opportunity to get ready for the performance with his or her instrument.

As illustrated in FIG. 26O, once the recording begins, the length of the recording may be shown next to record input 370. This recording length may be displayed in place of play input 350. In this case, play input 350 will not be accessible during recording, but will reappear once recording has ceased (e.g., when the user selects record input 370 to stop the recording).

As illustrated in FIG. 26P, once the recording has been completed (e.g., the user ends the recording by selecting record input 370 during recording), a frame may be overlaid in graphical user interface to prompt to the user to listen to the recording. The frame may comprise an input for listening to the recording and an input for dismissing the frame without listening to the recording.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
generate a graphical user interface comprising a staff canvas, a keyboard canvas, a scale input, at least one parameter input, and a play input;
receive via the scale input a selection of one of a plurality of music scales, wherein a music scale comprises a configuration having a plurality of adjustable musical parameters;
in response to the selection of one of the plurality of music scales, update the staff canvas to visually represent a plurality of notes from the selected music scale on the staff;
receive via the at least one parameter input a selection of one of a plurality of options for a musical parameter;
in response to the selection of one of the plurality of options for the musical parameter, update one or both of the staff canvas and the keyboard canvas to reflect the selected option for the musical parameter; and,
receive via the play input a selection of the play input;
in response to selection of the play input, start playback of the selected music scale according to the selected option for the musical parameter, wherein starting playback of the selected music scale comprises, for each note in the music scale, retrieving an audio file of each note in the selected music scale from a database, and constructing a soundtrack from the retrieved audio files and in accordance with the selected option for the at least one of the plurality of adjustable musical parameters.

2. The method of claim 1, wherein the staff canvas comprises a visual representation of a music staff, and wherein playback of the selected music scale comprises, for each note in the soundtrack, simultaneously outputting the note to a speaker and updating the staff canvas to highlight a visual representation of the note on the music staff.

3. The method of claim 2, wherein, highlighting the visual representation of the note comprises changing a color of the visual representation of the note.

4. The method of claim 1, wherein the keyboard canvas comprises a visual representation of at least a portion of a music keyboard, and wherein playback of the selected music scale comprises, for each note in the soundtrack, simultaneously outputting the note to a speaker and updating the keyboard canvas to highlight a key associated with the note within the visual representation of the at least a portion of the music keyboard.

5. The method of claim 4, wherein, highlighting the key comprises changing a color of the key.

6. The method of claim 1, wherein each audio file of each note comprises a recording of a live performance of that note.

7. The method of claim 1, wherein the graphical user interface further comprises a metronome input for toggling a metronome option on and off, and wherein starting playback of the selected music scale further comprises, when the metronome option is toggled on, playing a metronome soundtrack in parallel with the soundtrack of the selected music scale.

8. The method of claim 1, wherein the at least one of the plurality of adjustable musical parameters comprises one of a repeat of a top note in the selected music scale, and a repeat of the selected music scale.

9. The method of claim 1, wherein the at least one parameter input comprises a plurality of parameter inputs, wherein each of the plurality of parameter inputs is configured to receive a selection of one of a plurality of options for one of the plurality of adjustable musical parameters, and wherein playback of the selected music scale is performed according to the selected options for all of the plurality of adjustable musical parameters.

10. The method of claim 9, further comprising, prior to generating the graphical user interface, providing prior usage data for the user to a machine-learning model, and receiving a configuration, comprising a recommended music scale and a recommended option for each of the plurality of adjustable musical parameters, as an output from the machine-learning model, wherein the graphical user interface is generated according to the recommended music scale and the recommended options for all of the plurality of adjustable musical parameters.

11. The method of claim 10, further comprising retraining the machine-learning model on prior usage data from a plurality of users, wherein the prior usage data comprises one or both of user-specified changes in configurations of the graphical user interface and assessments of a user's recorded performance of a music scale.

12. The method of claim 1, wherein the graphical user interface further comprises a record input, and wherein the method further comprises, in response to selection of the record input, recording a live performance of the selected music scale via a microphone.

13. The method of claim 12, further comprising assessing the recorded performance of the selected music scale by:
generating a soundtrack of the selected music scale according to the selected option for the at least one of the plurality of adjustable musical parameters;
comparing the generated soundtrack to the recorded performance; and
generating an accuracy score for the recorded performance based on the comparison of the generated soundtrack to the recorded performance.

14. The method of claim 12, wherein the staff canvas comprises a visual representation of a music staff, and wherein the keyboard canvas comprises a visual representation of at least a portion of a music keyboard, further comprising, in response to the selection of the record input, for each note in the selected music scale, simultaneously, without outputting any audio of the note:
updating the staff canvas to highlight a visual representation of the note on the music staff; and
updating the keyboard canvas to highlight a key, within the visual representation of the at least a portion of the music keyboard, that is associated with the note.

15. The method of claim 12, wherein the staff canvas comprises a visual representation of a music staff, and wherein the keyboard canvas comprises a visual representation of at least a portion of a music keyboard, further comprising, in response to the selection of the play input and the record input, for each note in the selected music scale, simultaneously with outputting the note:
updating the staff canvas to highlight a visual representation of the note on the music staff; and
updating the keyboard canvas to highlight a key, within the visual representation of the at least a portion of the music keyboard, that is associated with the note.

16. The method of claim 1, wherein the plurality of music scales comprise a major scale, a natural minor scale, a harmonic minor scale, a melodic minor scale, a Dorian mode scale, a Phrygian mode scale, a Lydian mode scale, a Mixolydian mode scale, and a Locrian mode scale.

17. The method of claim 1, wherein the plurality of adjustable musical parameters comprises at least one of a sequence of notes, a starting octave, a number of octaves, a pitch, a tempo, and a rhythmic pattern.

18. The method of claim 1, wherein the music scale comprises a plurality of fingerings corresponding to a plurality of musical instruments comprising at least one string instrument, at least one wind instrument, at least one brass instrument, and at least one percussion instrument.

19. A system comprising:
    at least one hardware processor; and
    one or more software modules that, when executed by the at least one hardware processor,
    generate a graphical user interface comprising a staff canvas, a keyboard canvas, a scale input, at least one parameter input, and a play input;
    receive via the scale input a selection of one of a plurality of music scales, wherein a music scale comprises a configuration having a plurality of adjustable musical parameters;
    in response to the selection of one of the plurality of music scales, update the staff canvas to visually represent a plurality of notes from the selected music scale on the staff;
    receive via the at least one parameter input a selection of one of a plurality of options for a musical parameter;
    in response to the selection of one of the plurality of options for the musical parameter, update one or both of the staff canvas and the keyboard canvas to reflect the selected option for the musical parameter; and,
    receive via the play input a selection of the play input;
    in response to selection of the play input, start playback of the selected music scale according to the selected option for the musical parameter, wherein starting playback of the selected music scale comprises, for each note in the music scale, retrieving an audio file of each note in the selected music scale from a database, and constructing a soundtrack from the retrieved audio files and in accordance with the selected option for the at least one of the plurality of adjustable musical parameters.

20. A non-transitory computer-readable medium having instructions stored therein, wherein the instructions, when executed by a processor, cause the processor to:
    generate a graphical user interface comprising a staff canvas, a keyboard canvas, a scale input, at least one parameter input, and a play input;
    receive via the scale input a selection of one of a plurality of music scales, wherein a music scale comprises a configuration having a plurality of adjustable musical parameters;
    in response to the selection of one of the plurality of music scales, update the staff canvas to visually represent a plurality of notes from the selected music scale on the staff;
    receive via the at least one parameter input a selection of one of a plurality of options for a musical parameter;
    in response to the selection of one of the plurality of options for the musical parameter, update one or both of the staff canvas and the keyboard canvas to reflect the selected option for the musical parameter; and,
    receive via the play input a selection of the play input;
    in response to selection of the play input, start playback of the selected music scale according to the selected option for the musical parameter, wherein starting playback of the selected music scale comprises, for each note in the music scale, retrieving an audio file of each note in the selected music scale from a database, and constructing a soundtrack from the retrieved audio files and in accordance with the selected option for the at least one of the plurality of adjustable musical parameters.

* * * * *